US012649661B2

(12) United States Patent
He et al.

(10) Patent No.: US 12,649,661 B2
(45) Date of Patent: Jun. 9, 2026

(54) PREPARATION OF TWO-DIMENSIONAL MOLYBDENUM PHOSPHIDE VIA SURFACE-CONFINED ATOMIC SUBSTITUTION

(71) Applicant: City University of Hong Kong, Hong Kong (CN)

(72) Inventors: Qiyuan He, Hong Kong (CN); Wenbin Wang, Hong Kong (CN); Junlei Qi, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 469 days.

(21) Appl. No.: 18/342,822

(22) Filed: Jun. 28, 2023

(65) Prior Publication Data

US 2025/0002344 A1 Jan. 2, 2025

(51) Int. Cl.
| | |
|---|---|
| *C01B 25/08* | (2006.01) |
| *B82Y 30/00* | (2011.01) |
| *B82Y 40/00* | (2011.01) |

(52) U.S. Cl.
CPC ............... *C01B 25/08* (2013.01); *B82Y 30/00* (2013.01); *B82Y 40/00* (2013.01); *C01P 2002/20* (2013.01)

(58) Field of Classification Search
CPC ......... C01B 25/08; B82Y 30/00; B82Y 40/00; C01P 2002/20
See application file for complete search history.

(56) References Cited

PUBLICATIONS

Kumar et al., FlatChem, (2021), v.27, 100224 (1-40).*
Wang et al., Adv. Mater., (2022), v.34, 2203220(1-11) (Published on Jul. 28, 2022).*

* cited by examiner

*Primary Examiner* — Yong L Chu
(74) *Attorney, Agent, or Firm* — S&F/WEHRW

(57) ABSTRACT

Method for preparing a nonlayered 2D MoP nanosheet, the method including: contacting a multi-layered $MoX_2$ nanosheet with $PH_3$ thereby forming the nonlayered 2D MoP nanosheet, wherein X is S or Se. The nonlayered 2D MoP nanosheet exhibits metallic charge transport and desirable performance in electrocatalytic hydrogen evolution reaction. In contrast to $MoS_2$, which shows edge-dominate HER performance, the edge and basal plane of MoP deliver similar HER performance, which is correlated with theoretical calculation.

20 Claims, 41 Drawing Sheets

PREPARATION OF TWO-DIMENSIONAL MOLYBDENUM PHOSPHIDE VIA SURFACE-CONFINED ATOMIC SUBSTITUTION

TECHNICAL FIELD

The present disclosure relates to a method for preparing a nonlayered 2D MoP nanosheet and products thereof.

BACKGROUND

Two-dimensional (2D) materials have attracted extensive attention across many fundamental and practical frontiers. Emerging nonlayered 2D materials (NL2DMs), referring to the ultrathin materials without intrinsically layered structures, are gaining increasing interest due to their distinctive physicochemical properties and excellent performance in diverse applications. Unlike layered 2D materials (L2DMs), where each crystalline layer is held together by weak van der Waals interaction, NL2DMs are formed by strong covalent bonds in all three dimensions. Owing to the multi-body interactions. NL2DMs have demonstrated amazing physical properties in electronic transport, thermal conductance, heat capacity as well as quasi-particle dynamics, showing great performance in electronics, optoelectronics, and energy storage. Moreover, besides the clear benefit of a large, exposed surface, the introduction of 2D morphology to nonlayered materials could also bring large structural distortion and low-coordinated surface atoms with abundant dangling bonds, which are particularly favored in various catalytic applications.

Transition metal phosphides (TMPs) have emerged as a vital member of the ND2LMS family with novel properties and broad applications. In particular, molybdenum phosphide (MoP), which possesses exotic three-component fermions, is a topological semimetal with distinctive physicochemical properties such as high conductivity, pressure-induced superconductivity, anisotropic lattice thermal conductivity, and excellent catalytic activity. However, the synthesis of 2D MoP using known methods have several disadvantages, such as requiring complicated procedures with low reproductivity, reliability and scalability. More importantly, the resulting MoP is usually polycrystalline nanosheets or nanoparticles, which severely hinders the exploration of their intrinsic properties and true potential. Furthermore, the synthesis of 2D MoP remains a significant challenge, because extra driving force is necessary to overcome the surface energy constraints at MoP/substrate interfaces and stabilize the intrinsically three-dimensional crystal structure.

There thus exists a need for improved methods for preparing MoP ND2LMS that overcomes at least some of the disadvantages described above.

SUMMARY

Provided herein are methods for preparing MoP nanosheets with well-defined 2D morphology using surface-confined atomic substitution of ultrathin molybdenum dichalcogenides (e.g., $MoS_2$/$MoSe_2$) nanosheets. During the synthesis, molybdenum dichalcogenide functions as the host matrix, where each layer of Mo atoms maintains its hexagonal arrangement and forms covalent bonds with P atoms that substitute S atoms, hence forming MoP that retains the original 2D morphology of the host matrix. It was found that the surface confinement from the substrate plays a critical role in stabilizing the 2D morphology, which is evident in the strong correlation between the $MoS_2$ thickness and the MoP crystallinity. Specifically, MoP converted from thin $MoS_2$ nanosheets (<~10 nm) exhibits single crystallinity throughout the entire nanosheet, while those converted from thick nanosheets show lattice distortion. The converted MoP exhibits metallic transport with high transparency. More importantly, MoP nanosheets demonstrate satisfying performance in electrocatalytic hydrogen evolution reaction (HER) across the entire basal plane, in contrast to the well-documented edge-sides dominated performance of layered transition metal dichalcogenides. This work demonstrates a robust synthetic route towards high-quality NL2DMs based on surface-confined atomic substitution and allows facile access to their highly active surface for catalytic applications.

In a first aspect, provided herein is a method of preparing a nonlayered 2D MoP nanosheet, the method comprising: contacting a multi-layered $MoX_2$ nanosheet with $PH_3$ thereby forming the nonlayered 2D MoP nanosheet, wherein X is S or Se.

In certain embodiments, the nonlayered 2D MoP nanosheet is substantially crystalline.

In certain embodiments, the nonlayered 2D MoP nanosheet is single-crystalline.

In certain embodiments, the step of contacting the multi-layered $MoX_2$ nanosheet with $PH_3$ is conducted at a temperature greater than 650° C.

In certain embodiments, the step of contacting the multi-layered $MoX_2$ nanosheet with $PH_3$ is conducted at a temperature between 650-700° C.

In certain embodiments, the method further comprises the step of heating $NaH_2PO_2$ thereby generating $PH_3$.

In certain embodiments, the $NaH_2PO_2$ is heated at a temperature of at least 650° C.

In certain embodiments, the $NaH_2PO_2$ is heated in the presence of the multi-layered $MoX_2$ nanosheet in a sealed container at a temperature between 650-700° C.

In certain embodiments, the method further comprises the step of depositing $MoX_2$ on a substrate by chemical vapor deposition or mechanical exfoliation thereby forming the multi-layered $MoX_2$ nanosheet.

In certain embodiments, the multi-layered $MoX_2$ nanosheet is at least 3 nm thick.

In certain embodiments, the multi-layered $MoX_2$ nanosheet is about 3 to about 10 nm thick.

In certain embodiments, the multi-layered $MoX_2$ nanosheet comprises at least four layers.

In certain embodiments, the multi-layered $MoX_2$ nanosheet consists of 4-15 layers.

In certain embodiments, the method comprises contacting a multi-layered $MoX_2$ nanosheet having a thickness between about 3 nm to about 10 nm with $PH_3$ thereby forming the nonlayered 2D MoP nanosheet, wherein the nonlayered 2D MoP nanosheet is single-crystalline.

In certain embodiments, the step of contacting the multi-layered $MoX_2$ nanosheet with $PH_3$ is conducted at a temperature between 650-700° C.

In certain embodiments, the method further comprises the step of heating $NaH_2PO_2$ at a temperature between 650-700° C. thereby generating $PH_3$.

In certain embodiments, the method further comprises the step of depositing $MoX_2$ on a substrate by chemical vapor deposition or mechanical exfoliation thereby forming the multi-layered $MoX_2$ nanosheet.

In certain embodiments, X is S.

In a second aspect, provided herein is a method of preparing a nonlayered 2D MoP nanosheet, wherein the method comprises: depositing $MoX_2$ on a substrate by chemical vapor deposition or mechanical exfoliation thereby forming a multi-layered $MoX_2$ nanosheet, wherein X is S or Se; heating $NaH_2PO_2$ at a temperature between 650-700° C. thereby generating $PH_3$; and contacting the multi-layered $MoX_2$ nanosheet having a thickness between about 3 nm to about 10 nm with $PH_3$ at a temperature between 650-700° C. thereby forming the nonlayered 2D MoP nanosheet, wherein the nonlayered 2D MoP nanosheet is single-crystalline.

In certain embodiments, X is S.

DETAILED DESCRIPTION

Definitions

Figure 1:
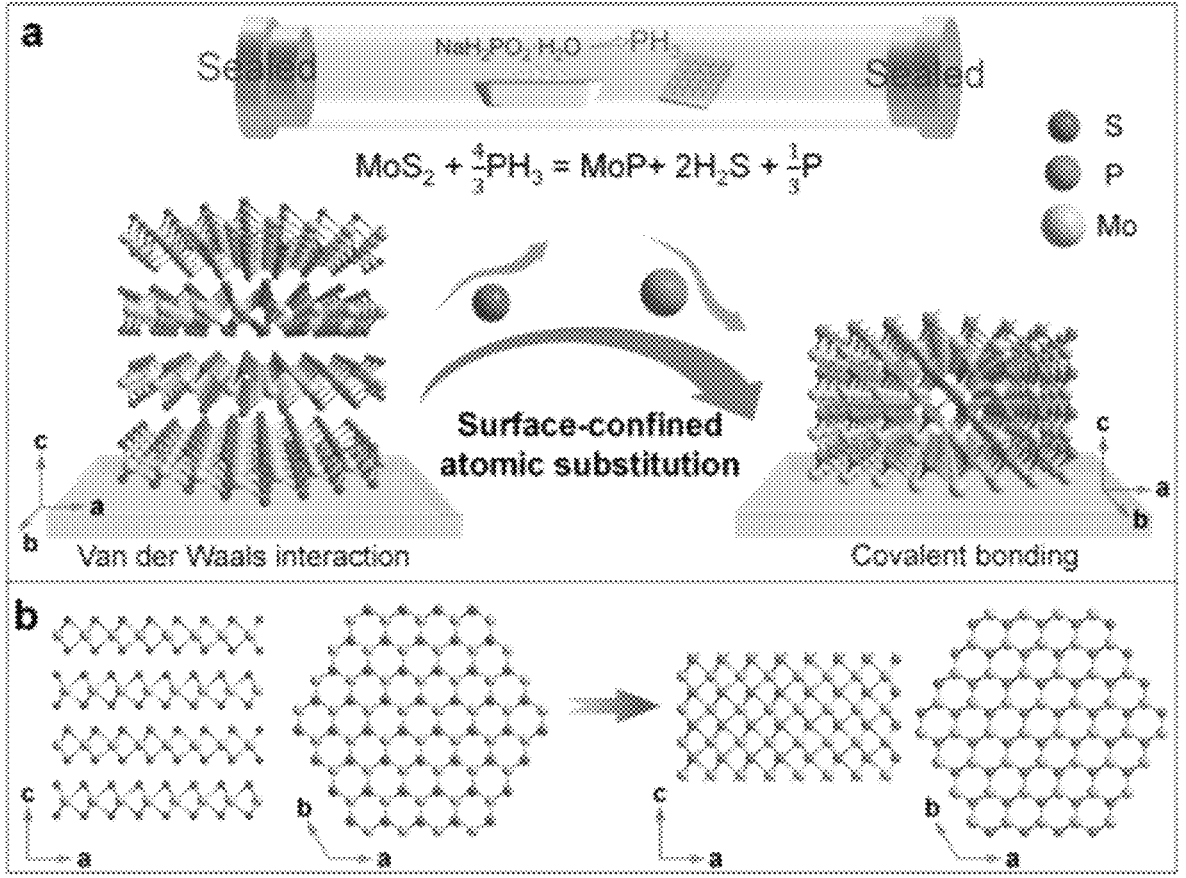
FIG. 1 depicts a schematic illustration of the surface-confined atomic substitution. (a) Schematic of the chemical conversion process from $MoS_2$ to MoP. (b) Crystal structure transformation from $MoS_2$ to MoP along the view directions of [010] and [001].

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The present disclosure provides a method of preparing a nonlayered 2D MoP nanosheet, the method comprising: contacting a multi-layered $MoX_2$ nanosheet with $PH_3$ thereby forming the nonlayered 2D MoP nanosheet, wherein X is S or Se.

Advantageously, the method provided herein can produce a substantially crystalline nonlayered 2D MoP nanosheet. In certain embodiments the method produces a single-crystal nonlayered 2D MoP. The single-crystal can account for 90% by volume of the nanosheet, in certain embodiments. In certain embodiments, the single-crystal may account for greater than 92%, 95%, 97%, 98%, 99%, 99.1%, 99.2%, 99.2%, 99.3%, 99.4%, 99.5%, 99.6%, 99.7%, 99.8%, 99.9%, or 100% of the volume of the nanosheet. In certain embodiments, the single-crystal may account for, 90% to 100%, 95% to 100%, 96% to 100%, 97% to 100%, 98% to 100%, 99% to 100%, 99% to 99.9%, 99.9 to 100%, of the volume of the nanosheet, or any value or range of values within those ranges.

The nonlayered 2D MoP nanosheet can have substantially no lattice distortion, e.g., less than 5%, less than 4%, less than 3%, less than 1%, less than 0.5%, less than 0.1%, or undetectable lattice distortion. In certain embodiments, the nonlayered 2D MoP nanosheet can have 0.01-5%. 0.01-4%, 0.01-3%, 0.01-2%, 0.01-1.5%, 0.01-1%, 0.01-0.5%, 0.01-0.25%, 0.01-0.1%. 0.01-0.05%, 0.01-0.04%, 0.01-0.03%, or 0.01-0.02% lattice distortion.

The nonlayered 2D MoP nanosheet can have a visible light transmittance of 90-97%, 91-97%, 92-97%. 93-97%, 94-97%, 95-97%, 96-97%, 96.5-97%, 96.6-97%, 96.7-97%, 96.8-97%, or 96.9-97%.

In certain embodiments, the multi-layered $MoX_2$ nanosheet is $MoS_2$ or $MoSe_2$.

The multi-layered $MoX_2$ nanosheet can have a thickness between 3-60 nm, 3-33 nm, 3-25 nm. 3-20 nm, 3-11 nm, 3-10 nm, 4-10 nm, 5-10 nm, 6-10 nm, 7-10 nm, 9-10 nm, 3-9 nm, 3-8 nm. 3-7 nm. 3-6 nm, 3-5 nm, 3-4 nm, 4-9 nm, 5-8 nm, 6-7 nm, or 3-4.8 nm.

The multi-layered $MoX_2$ nanosheet can comprise at least four layers. In certain embodiments, the multi-layered $MoX_2$ nanosheet comprises 4-90 layers, 4-50 layers, 4-38 layers, 4-30 layers, 4-17 layers, 4-15 layers, 4-12 layers, or 4-7 layers.

$PH_3$ can be reacted with the multi-layered $MoX_2$ nanosheet at 650° C. or greater. In certain embodiments, the $PH_3$ is reacted with the multi-layered $MoX_2$ nanosheet at 650-1,000° C., 650-950° C., 650-900° C., 650-850° C., 650-800° C., 650-750° C., or 650-700° C.

$PH_3$ used in the methods described herein is available commercially or can be prepared using any method known in the art. In certain embodiments, the $PH_3$ is prepared in situ by thermal decomposition of $NaH_2PO_2$ or a hydrate thereof (e.g., $NaH_2PO_2 \cdot H_2O$) in the presence of the multi-layered $MoX_2$ nanosheet. In certain embodiments, $NaH_2PO_2$ or a hydrate thereof is heated at a temperature of 650° C. or greater. In certain embodiments, the $NaH_2PO_2$ or a hydrate thereof is heated at a temperature of 650-1,000° C., 650-950° C., 650-900° C., 650-850° C., 650-800° C., 650-750° C., or 650-700° C.

The method of preparing the multi-layered $MoX_2$ nanosheet is not particularly limited and any method known in the art can be used for its preparation. In certain embodiments, the multi-layered $MoX_2$ nanosheet is prepared by chemical vapor deposition or mechanical exfoliation of thicker multi-layered $MoX_2$ nanosheets.

The present disclosure also provides a nonlayered 2D MoP nanosheet prepared in accordance with the methods described herein. In certain embodiments, the nonlayered 2D MoP nanosheet is a single-crystal nonlayered 2D MoP. The single-crystal can account for 90% by volume of the nanosheet, in certain embodiments. In certain embodiments, the single-crystal may account for greater than 92%, 95%, 97%, 98%, 99%, 99.1%, 99.2%, 99.2%, 99.3%, 99.4%, 99.5%. 99.6%, 99.7%, 99.8%, 99.9%, or 100% of the volume of the nanosheet. In certain embodiments, the single-crystal may account for, 90% to 100%, 95% to 100%, 96% to 100%, 97% to 100%, 98% to 100%, 99% to 100%, 99% to 99.9%, 99.9 to 100%, of the volume of the nanosheet, or any value or range of values within those ranges.

The nonlayered 2D MoP nanosheet prepared in accordance with the methods described herein can have substantially no lattice distortion, e.g., less than 5%, less than 4%, less than 3%, less than 1%, less than 0.5%, less than 0.1%, or undetectable lattice distortion. In certain embodiments, the nonlayered 2D MoP nanosheet prepared in accordance with the methods described herein can have 0.01-5%, 0.01-4%, 0.01-3%, 0.01-2%, 0.01-1.5%, 0.01-1%, 0.01-0.5%. 0.01-0.25%, 0.01-0.1%, 0.01-0.05%, 0.01-0.04%, 0.01-0.03%, or 0.01-0.02% lattice distortion.

The nonlayered 2D MoP nanosheet prepared in accordance with the methods described herein can have a visible light transmittance of 90-97%, 91-97%, 92-97%, 93-97%, 94-97%, 95-97%, 96-97%, 96.5-97%, 96.6-97%, 96.7-97%, 96.8-97%, or 96.9-97%.

Mechanically exfoliated $MoS_2$ nanosheets on $SiO_2$/Si or quartz substrates were used as the precursors to synthesize MoP via surface-confined atomic substitution, as illustrated in FIG. 1a. $NaH_2PO_2 \cdot H_2O$ was used to produce $PH_3$ gas (Example 1), which converts $MoS_2$ to MoP under elevated temperatures following the reaction:

$$MoS_2 + \frac{4}{3}PH_3 = MoP + 2H_2S + \frac{1}{3}P$$

(see Example 2). The synthesis was conducted in a sealed quartz tube in a tube furnace (see Example 2). The quartz tube was sealed to ensure a complete conversion (see Example 2). At a temperature above 650° C. S in $MoS_2$ can be substituted with P under the saturated $PH_3$ atmosphere while Mo retains the initial hexagonal arrangement due to the small lattice mismatch between $MoS_2$ and MoP in the ab plane (<3%, FIG. 6). Consequently, layered $MoS_2$ was converted to nonlayered MoP, which maintains the original 2D morphology of the $MoS_2$. FIG. 1b illustrates the structural changes from layered $MoS_2$ to nonlayered MoP along the view directions of and [001]. MoP inherits the hexagonal framework of Mo in $MoS_2$ in the ab plane, while covalent bonds in MoP replace the van der Waals gaps in $MoS_2$ along the c direction.

Figure 2:
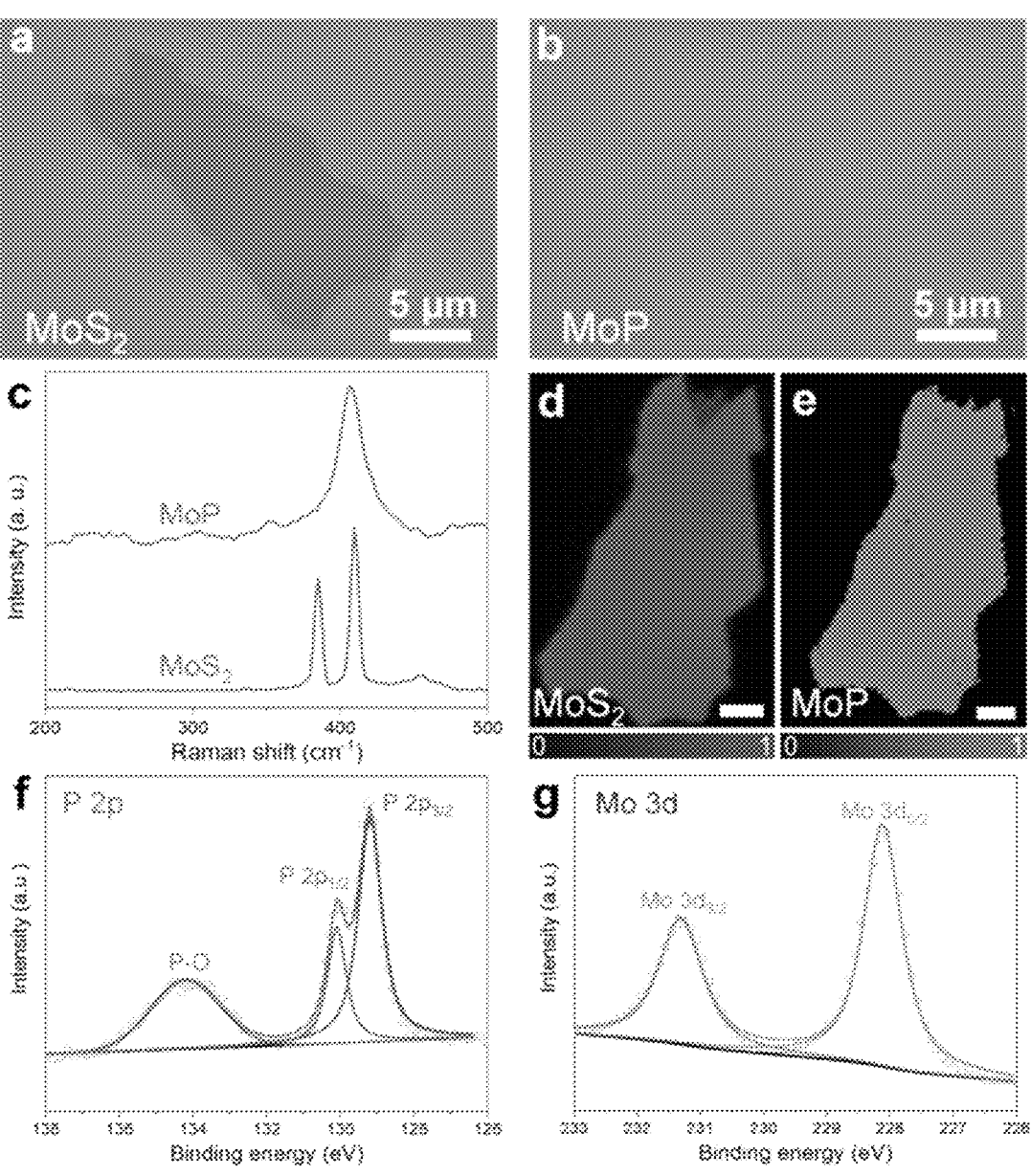
FIG. 2 depicts optical characterization of MoP. (a) Optical image of a $MoS_2$ nanosheet. (b) Optical image of MoP nanosheet converted from the $MoS_2$ nanosheet in (a). (c) Raman spectra of $MoS_2$ and converted MoP. (d,e) Raman mapping images of the $A_{1g}$ mode of $MoS_2$ (d) and the 406 $cm^{-1}$ mode of converted MoP (e), corresponding to the $MoS_2$ and MoP nanosheets in (a) and (b), respectively. Scale bar: 4 µm. (f,g) High-resolution XPS spectra of MoP in P 2p region (f) and Mo 3d region (g).
Figure 7:
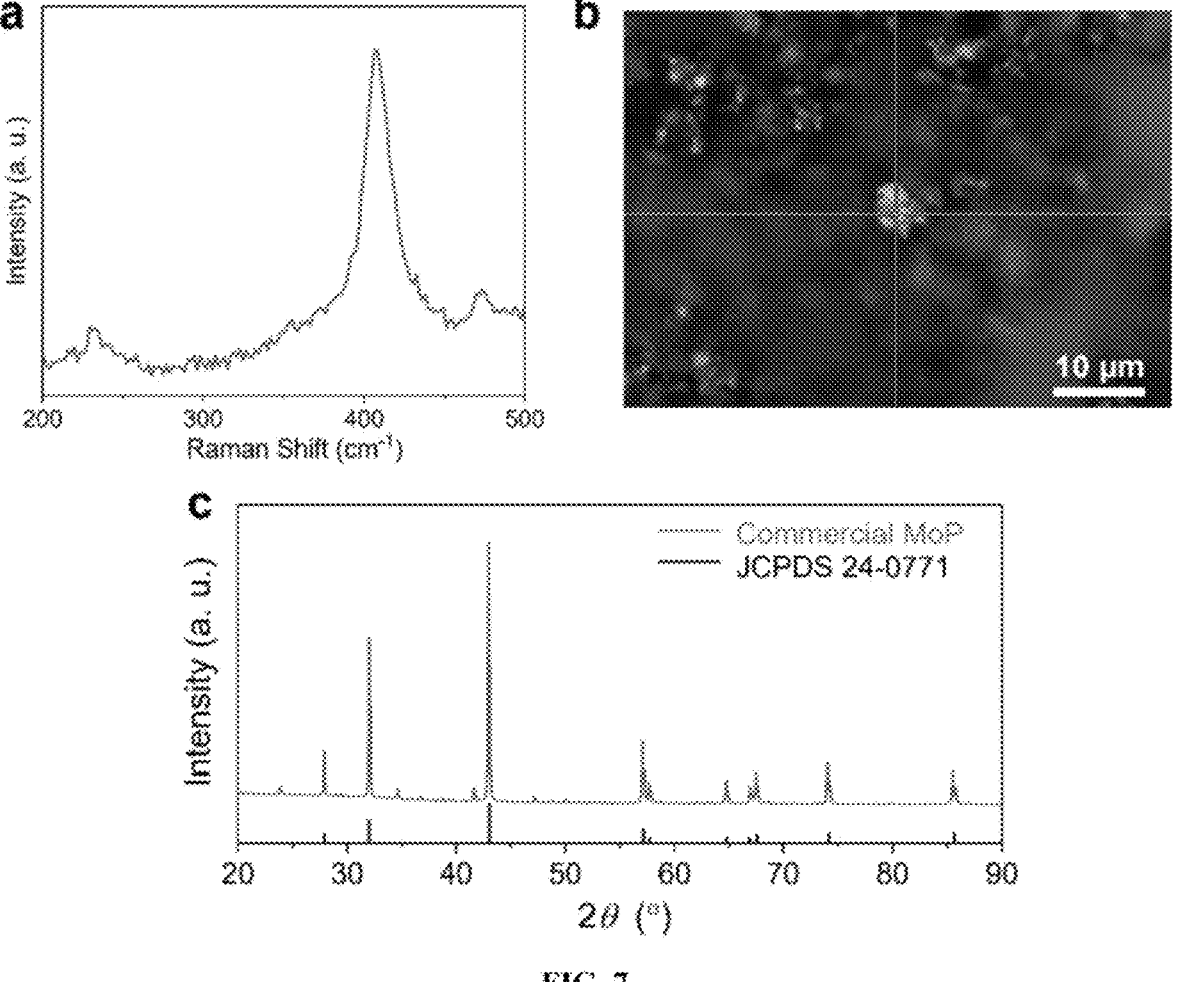
FIG. 7 depicts (a,b) Raman spectrum (a) and corresponding optical image (b) of commercial MoP crystals. The Raman peak observed at 406 $cm^{-1}$ is consistent with the as-prepared MoP nanosheets. (c) X-ray diffraction spectrum of commercial MoP, which is consistent with literature. The small peaks inconsistent with JCPDS 24-0771 correspond to the impurities of $MoP_2$ in commercial MoP.
Figure 8:
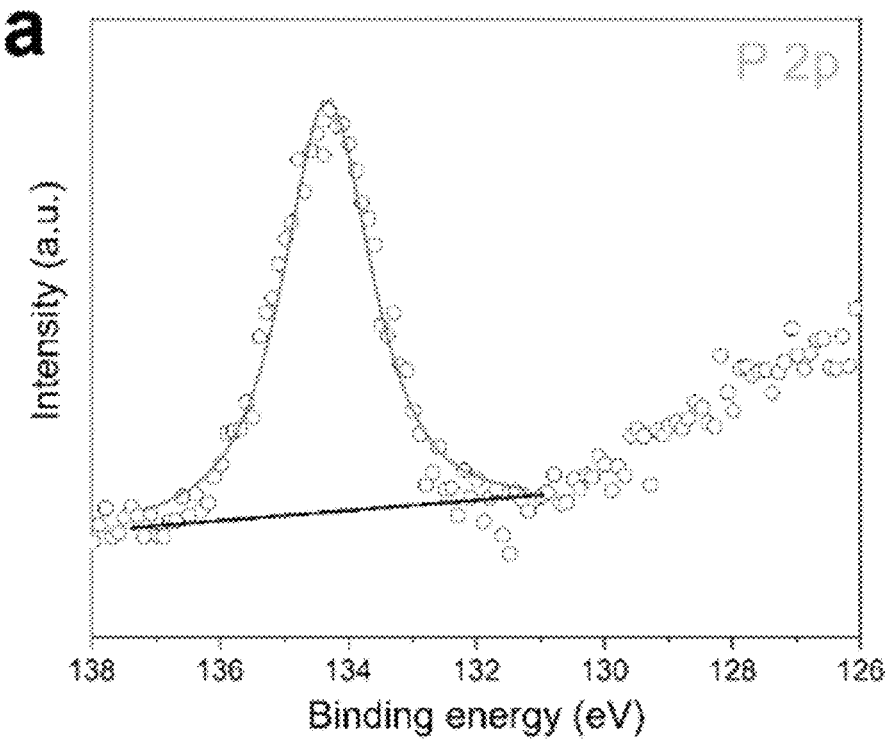
FIG. 8 depicts (a) High-resolution X-ray photoelectron spectroscopy (XPS) profiles of P 2p of a bare silicon wafer after the same synthetic conditions as the MoP. The peak located at 134.2 eV is attributed to the oxidation of P. (b,c) High-resolution XPS spectra of $MoS_2$ in Mo 3d region (a) and S 2p region (b). The high-resolution XPS spectrum of Mo 3d in $MoS_2$ consists of two peaks located around 229 and 232 eV, corresponding to $Mo^{4+}3d_{5/2}$ and $Mo^{4+}3d_{3/2}$ of $MoS_2$. The S 2p region in FIG. 8*b* shows the doublet peaks of S $2p_{1/2}$ and S $2p_{3/2}$, which locate at 162.1 and 163.2 eV, respectively. (d) High-resolution XPS profiles of S in MoP converted from $MoS_2$. No S peak was observed in MoP, confirming the full conversion from $MoS_2$ to MoP.
Figure 8:
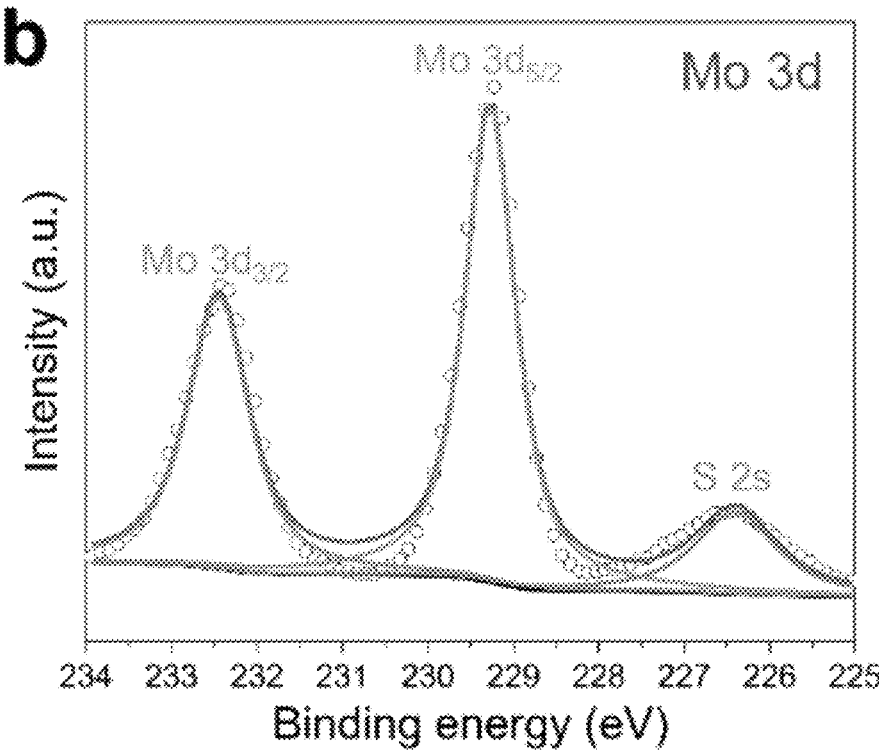
Figure 8:
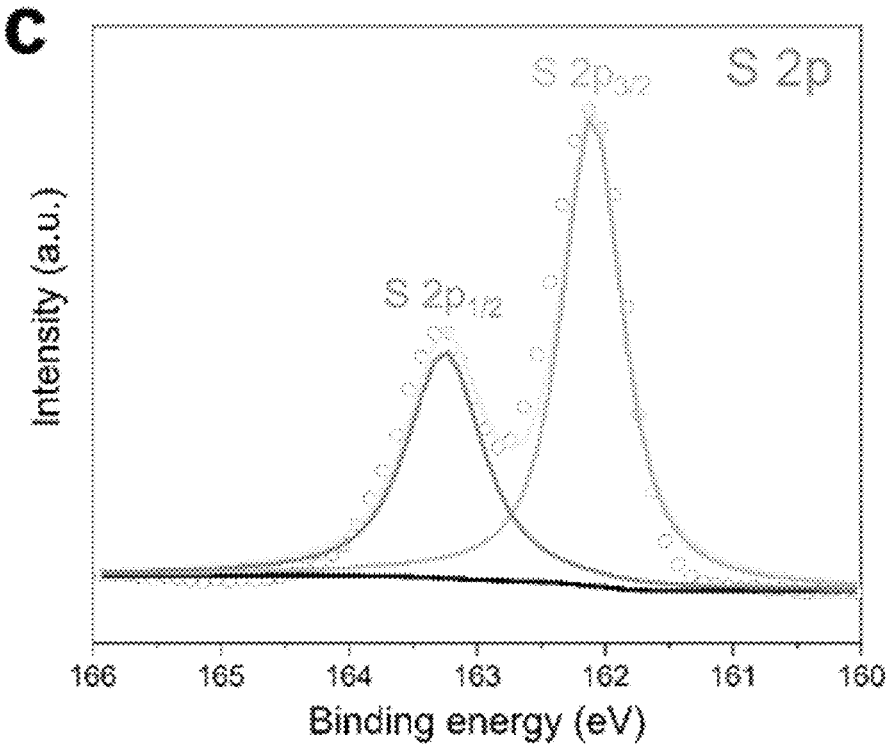
Figure 8:
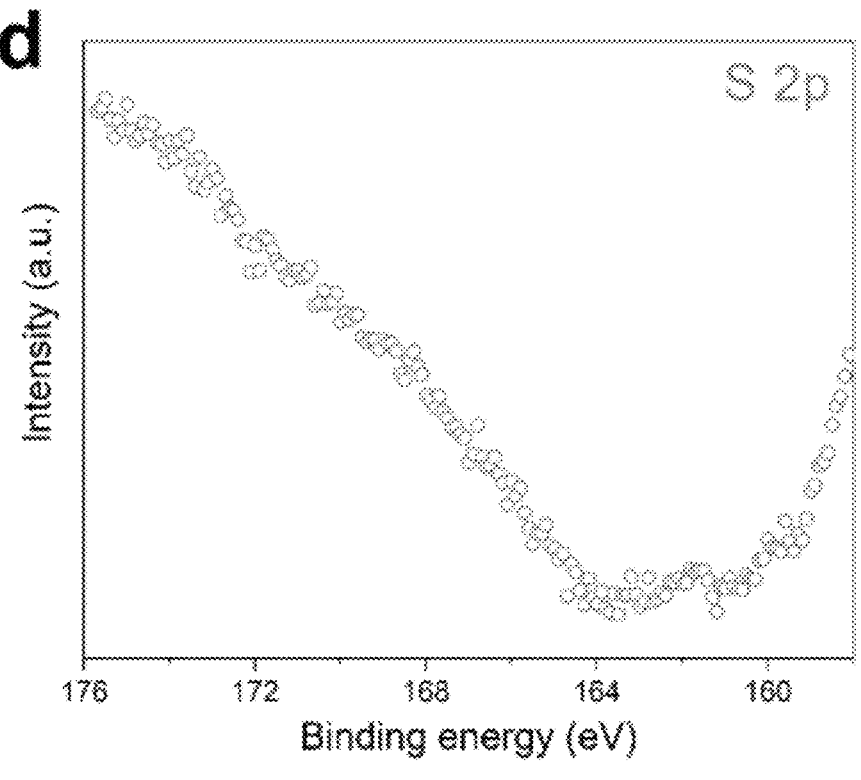

The morphologies of the $MoS_2$ nanosheets are maintained after the surface-confined atomic substitution, as demonstrated in optical images of an exfoliated $MoS_2$ nanosheet before and after the conversion (FIG. 2a,b). Concurrently, the optical contrast of the nanosheet significantly changed, resulting from the changes in both electronic band structures from semiconducting $MoS_2$ to semi-metallic MoP and the reduction in thickness. FIG. 2c shows the Raman spectra of the $MoS_2$ and the converted MoP. Before the conversion, the $$E^1_{2g}$$

and $A_{1g}$ peaks of $MoS_2$ can be clearly identified at 385 and 410 $cm^{-1}$, respectively. After the conversion to MoP, the two Raman peaks corresponding to $MoS_2$ disappeared. Instead, one peak at ~406 $cm^{-1}$ emerged, which is consistent with reported MoP in the literature and commercial MoP (see FIG. 7 and Example 3). In addition, no Raman peak corresponding to oxidation products of Mo ($MoO_2$ and $MoO_3$) is detected. FIG. 2d,e show the corresponding Raman mapping images of the $MoS_2$ and converted MoP at $A_{1g}$ mode and 406 $cm^{-1}$, respectively, which demonstrate the complete and uniform chemical conversion throughout the entire nanosheet. X-ray photoelectron spectroscopy (XPS) was utilized to further confirm the chemical composition and oxidation states of the elements in converted MoP. FIG. 2f,g show the high-resolution XPS profiles of P 2p and Mo 3d in the converted MoP, respectively. Two P 2p peaks located at binding energy of 129.2 and 130.1 eV are assigned to the low valence P (P $2p_{3/2}$ and P $2p_{1/2}$) in MoP. The peak at 134.2 eV, corresponding to the oxidation of P, is likely from the substrate because it is also detected with similar intensity in a clean silicon wafer under the same reaction conditions (FIG. 8a). In Mo 3d profile, the peaks at 228.1 and 231.3 eV are assigned to the binding energies of Mo $3d_{5/2}$ and Mo $3d_{3/2}$ with a spin-orbital splitting of 3.2 eV. The shifting to lower binding energies of Mo compared with $MoS_2$ (FIG. 8b,c) is consistent with the $Mo^{3+}$ oxidation state and the formation of chemical bonds between Mo and P in MoP. Besides, no S signal is observed after the conversion (FIG. 8d), demonstrating the complete chemical conversion from $MoS_2$ to MoP.

Figure 9:
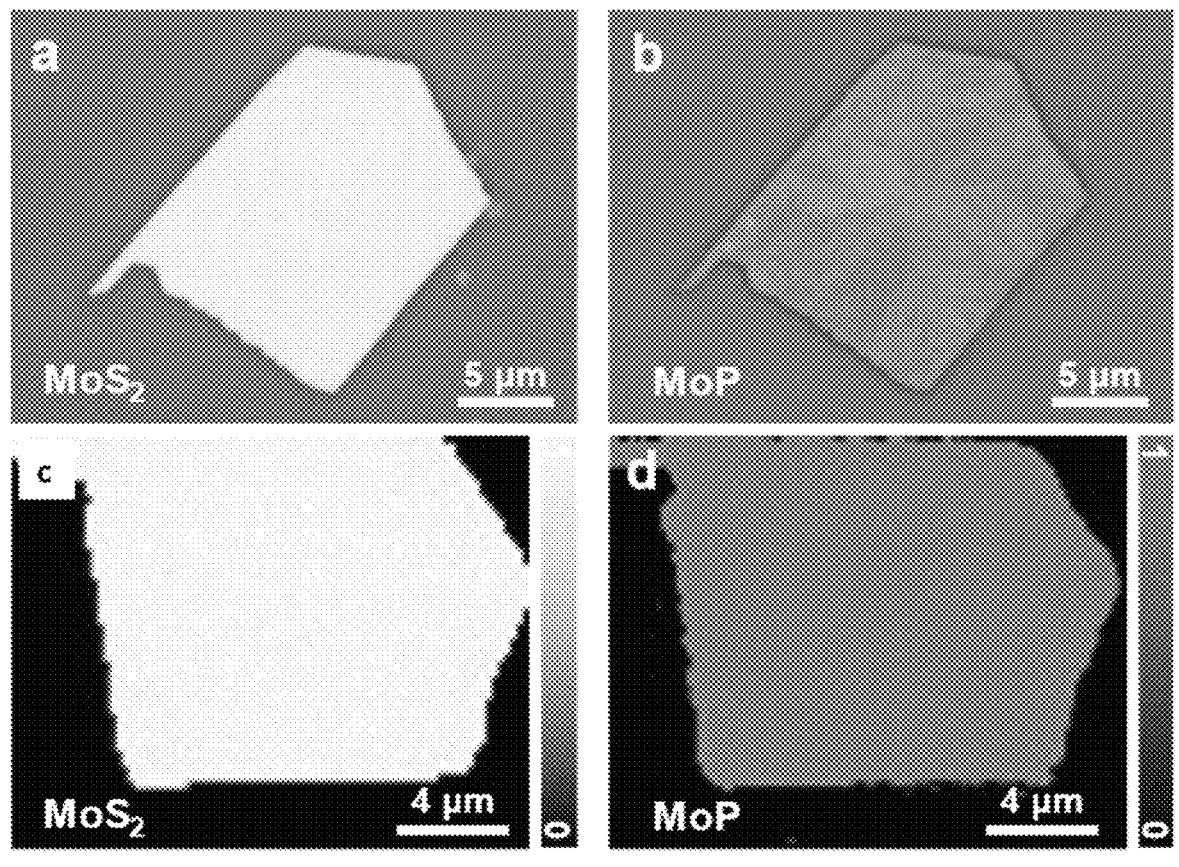
FIG. 9 depicts (a) Optical image of a $MoS_2$ nanosheet (≈20 nm). (b) Optical image of the MoP nanosheet converted from the $MoS_2$ nanosheet in (a). (c,d) Raman intensity maps of the $A_{1g}$ mode of $MoS_2$ (c) and the 406 $cm^{-1}$ mode of converted MoP (d), corresponding to the $MoS_2$ and MoP nanosheets in (a) and (b). The surface of the MoP nanosheet is full of textures, which could be ascribed to the lattice distortions, which is confirmed by TEM. The Raman intensity maps indicate the successful conversion from $MoS_2$ to MoP.
Figure 10:
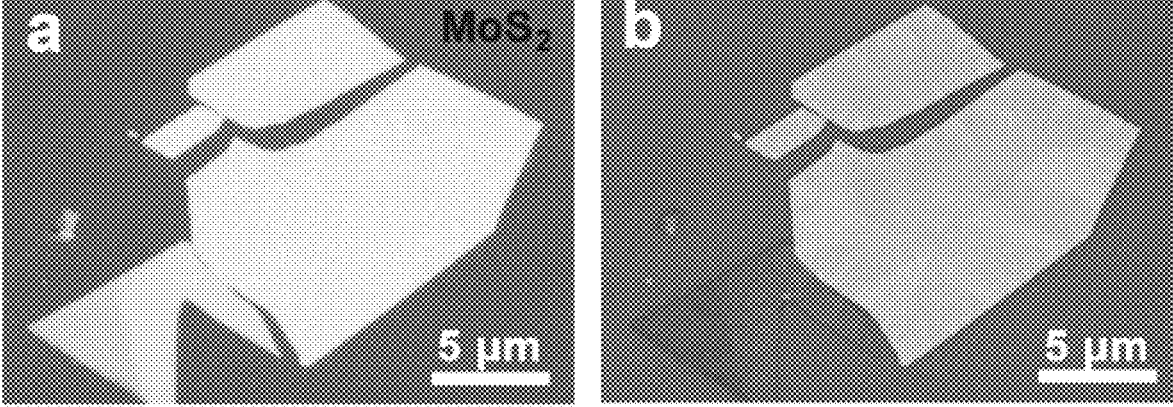
FIG. 10 depicts (a,b) Optical images of a thick $MoS_2$ nanosheet (~35 nm) before (a) and after (b) the surface-confined atomic substitution. Some cracks appear on the MoP nanosheet.
Figure 11:
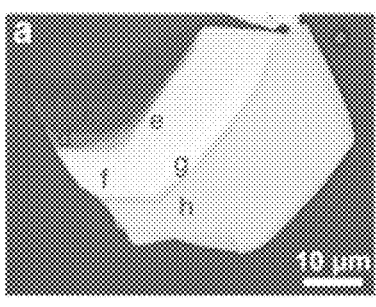
FIG. 11 depicts study of the effect of $MoS_2$ thickness on the crystallinity of the converted MoP. (a) The optical image of the $MoS_2$ nanosheet with edges of various thickness. (b,c) The optical image (b) and dark-field optical image (c) of the MoP nanosheet converted from (a). (d) The AFM image and thicknesses of 8 different areas on the $MoS_2$ nanosheet in (a). (e) The Raman spectra of the same 8 areas on the MoP nanosheet in (b). (f) The correlation between the $MoS_2$ thickness and the crystallinity of converted MoP. The grey dots are for visual guidance, with 1 nm interval for 0~10 nm and 5 nm for >10 nm.
Figure 11:
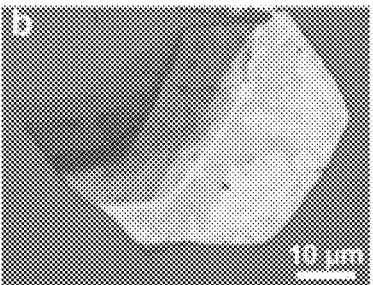
Figure 11:
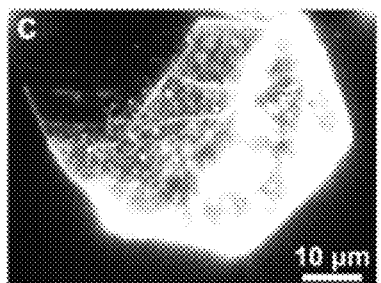
Figure 11:
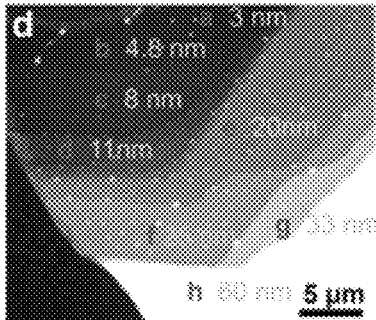
Figure 11:
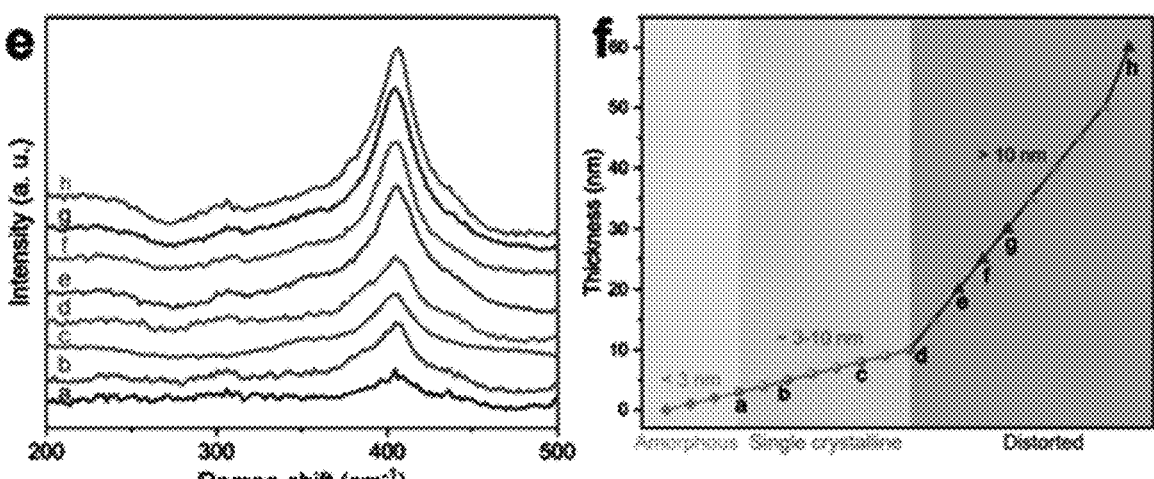
Figure 12:
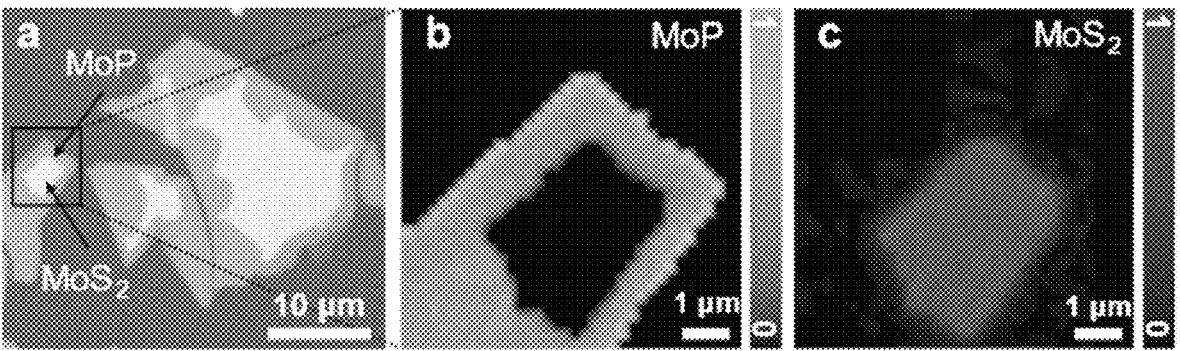
FIG. 12 depicts (a) Optical image of a partially converted $MoS_2$ nanosheet. (b,c) Raman intensity maps of the 406 $cm^{-1}$ mode of converted MoP (b) and the $A_{1g}$ mode of $MoS_2$ (c). The edge of the $MoS_2$ nanosheets is converted to MoP while the center of these flakes remains unchanged.
Figure 13:
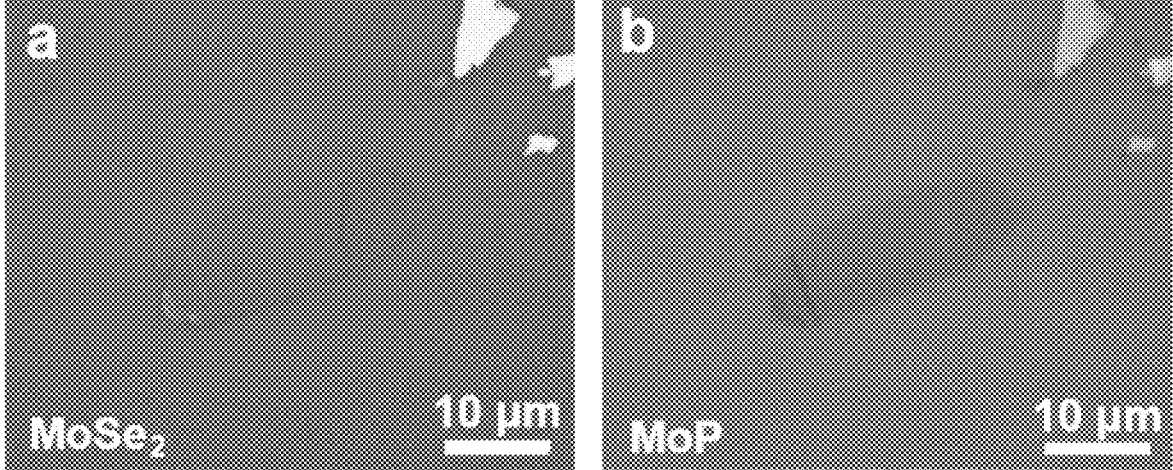
FIG. 13 depicts (a,b) The optical images of a mechanically exfoliated $MoSe_2$ nanosheet (≈5 nm in thickness) before (a) and after (b) the surface-confined atomic substitution. MoP nanosheets appear more transparent than $MoSe_2$, which is consistent with the change of $MoS_2$ to MoP. (c) The image of converted MoP (b) under darkfield, where the MoP nanosheet possesses sharp edges under darkfield, showing minimal lattice distortion.
Figure 13:
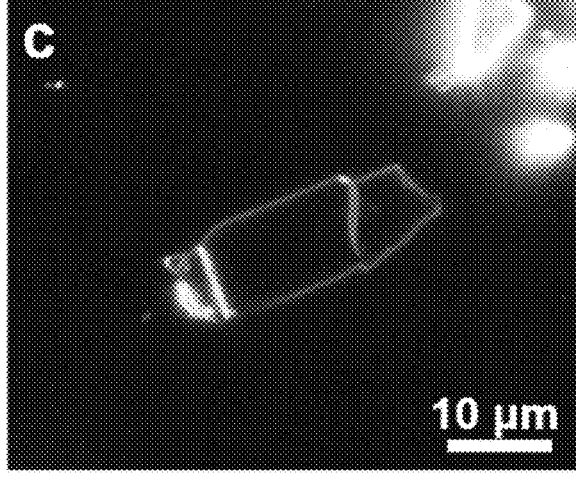
Figure 14:
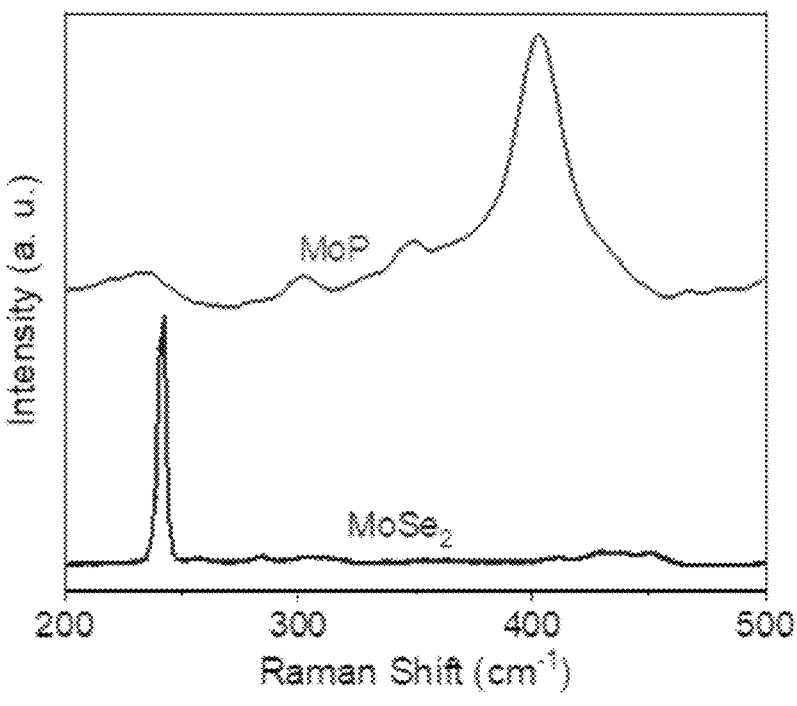
FIG. 14 depicts Raman spectra of $MoSe_2$ and converted MoP.
Figure 15:
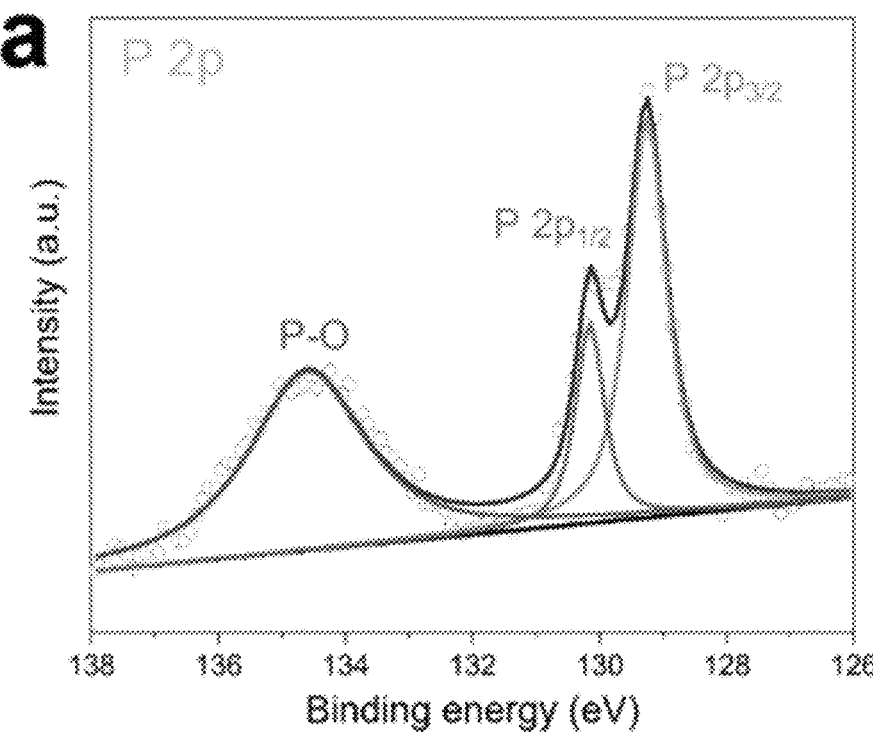
FIG. 15 depicts (a) high-resolution XPS profiles of P 2p of MoP converted from $MoSe_2$. The peaks at 129.2 and 130.1 eV are assigned to the P—Mo bond in MoP. (b) High-resolution XPS profiles of Mo 3d of MoP converted from $MoSe_2$. The peaks at 228.1 and 231.2 eV are assigned to the chemical bond between Mo and P in MoP, consistent with MoP converted from $MoS_2$. (c) High-resolution XPS profiles of Se in MoP converted from $MoSe_2$. No Se peak appears in MoP converted from $MoSe_2$, confirming the complete conversion from $MoSe_2$ to MoP.
Figure 15:
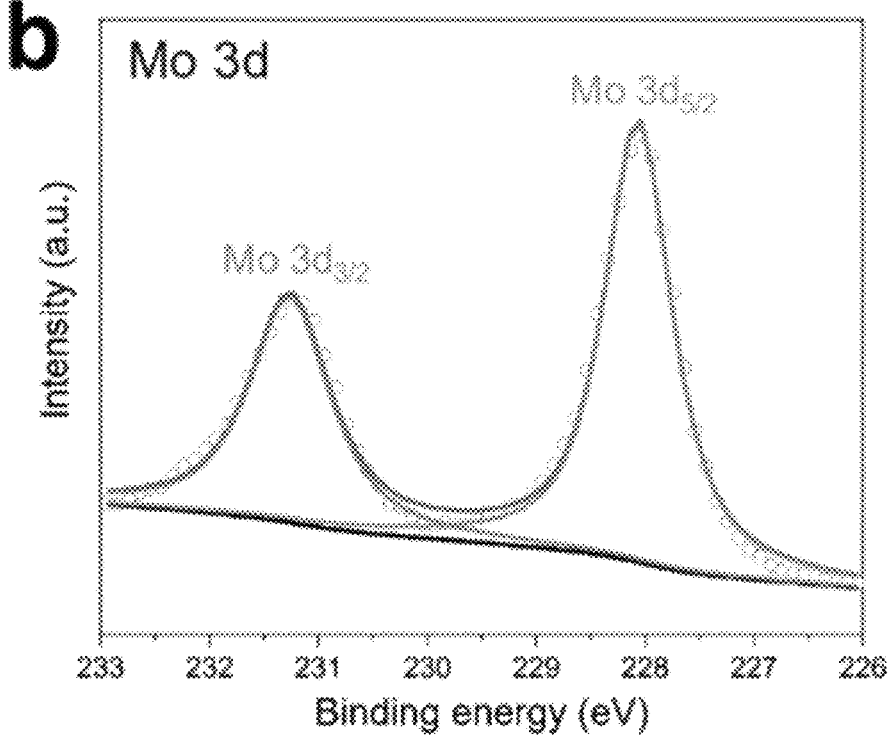
Figure 15:
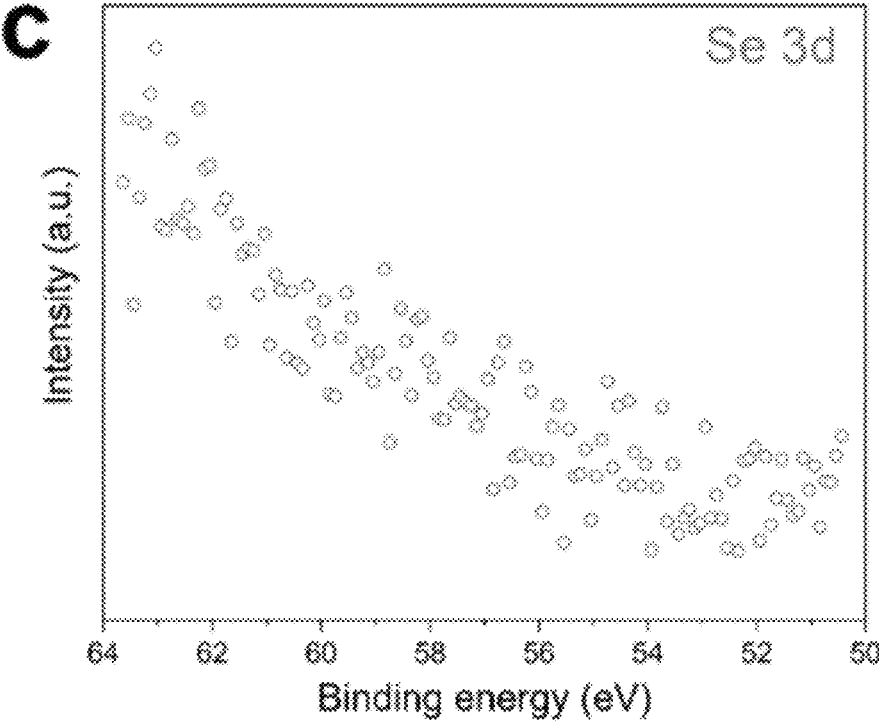
Figure 16:
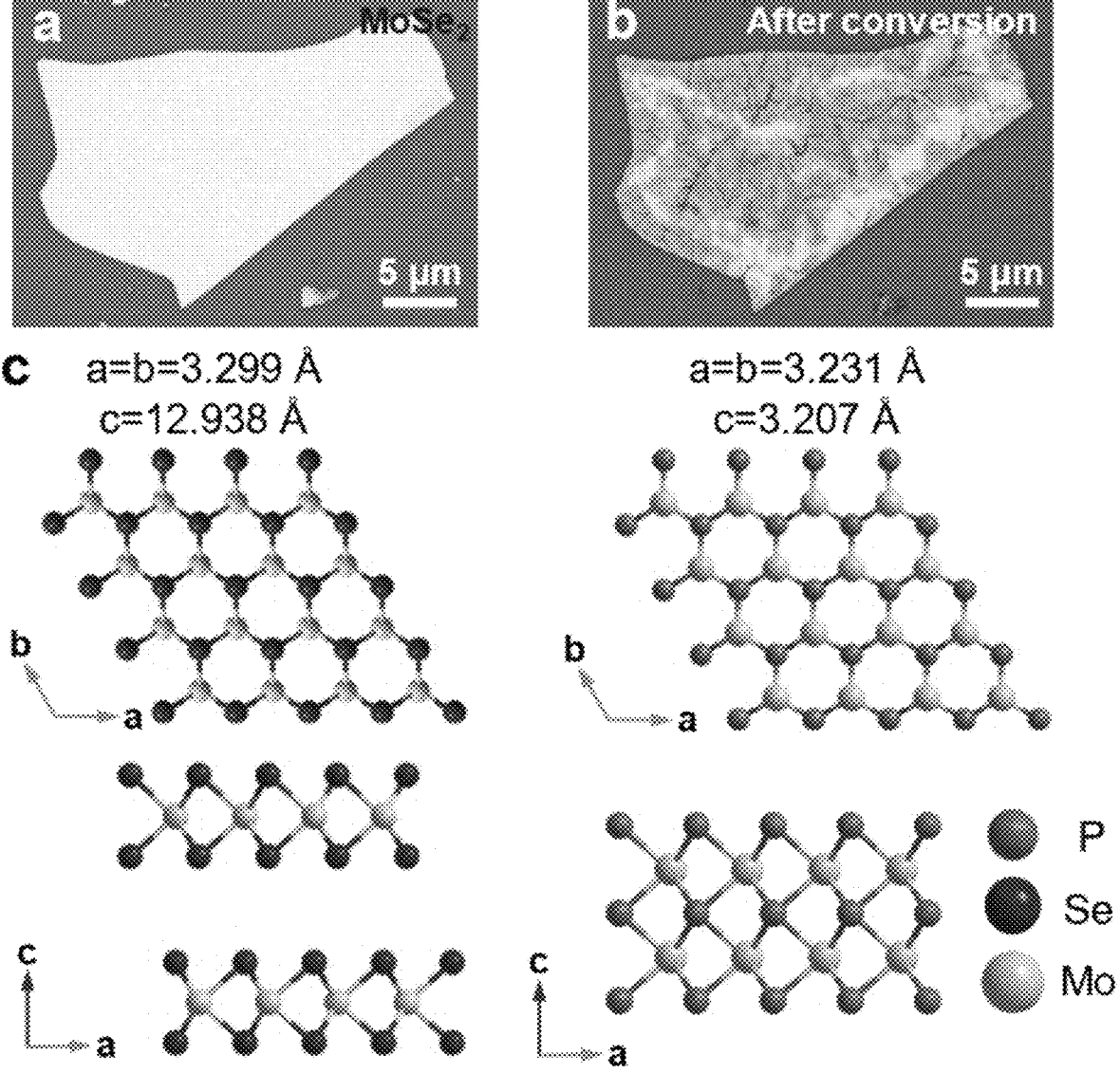
FIG. 16 depicts (a,b) Optical images of a thick $MoSe_2$ nanosheet (~30 nm) before (a) and after (b) the surface-confined atomic substitution. The MoP nanosheets converted from $MoSe_2$ generally show more lattice distortion and defects than that from $MoS_2$. (c) The top view, side view and the lattice constants of $MoSe_2$ and MoP crystals. From the perspective of lattice constant, the lattice mismatch between $MoSe_2$ and MoP in lattice constant a and b is similar to that between $MoS_2$ and MoP, which could explain that thin $MoSe_2$ nanosheets can be converted to MoP single crystal. MoP converted from $MoSe_2$ has more severe lattice distortion than from $MoS_2$. The larger difference in lattice constant c could lead to the weaker surface-confinement effect. Besides, Se has one more electron shell than S and P. Crystal lattice distortion could form during the outflow of Se atoms.
Figure 17:
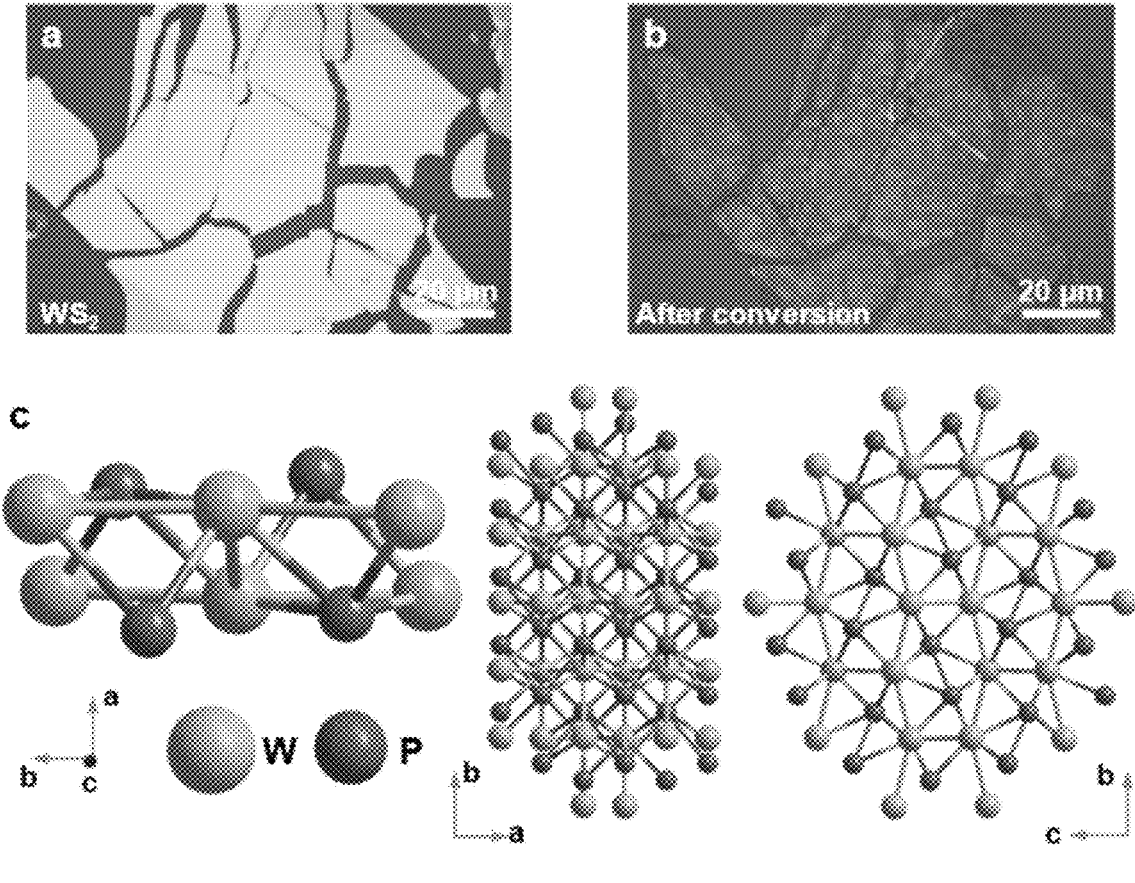
FIG. 17 depicts (a) optical image of exfoliated $WS_2$ nanosheets. (b) Optical images of the $WS_2$ nanosheets in (a) after the same conversion process. (c) Crystal structure of WP, showing orthorhombic structure. We cannot confirm the product(s) after the chemical conversion. The unsuccessful conversion is ascribed to the unmatched crystal structure of $WS_2$ (hexagonal) and WP (orthorhombic).

The nearly identical hexagonal structure and small lattice mismatch (<3%, see FIG. 6) between $MoS_2$ and MoP in the ab plane are the main reason behind the complete and uniform conversion from ultrathin $MoS_2$ nanosheet to non-layered MoP without lattice distortion, which is confirmed by transmission electron microscopy (TEM) later. However, when similar conversion process was performed on a thicker $MoS_2$ nanosheet with a thickness of ~20 nm (FIG. 9a,b), despite the complete chemical conversion from $MoS_2$ to MoP (confirmed by Raman characterization in FIG. 9c,d), the converted MoP nanosheet shows clear surface textures (FIG. 9b), suggesting distortion in the crystal lattice. Upon further increasing the thickness of $MoS_2$ (FIG. 10a), cracks can be observed in the optical image of the converted MoP nanosheet (FIG. 10b). These lattice distortions in converted MoP (later confirmed by TEM characterization) are attributed to the disparity in lattice constant c and the thermal expansion during conversion at elevated temperature. The dependence of the crystallinity of converted MoP on the thickness of $MoS_2$ indicates the crucial role of the surface confinement provided by the supporting substrate towards the retaining of the 2D morphology during the chemical conversion. Weaker confinement from the substrate surface on thicker $MoS_2$ nanosheets resulted in more significant lattice distortion and worse structural integrity of the converted MoP nanosheet. By performing the conversion on an exfoliated $MoS_2$ nanosheet edged with various thicknesses, we found that the critical thickness of $MoS_2$ precursor to prepare MoP without crystal distortion is ~10 nm (FIG. 11). In addition, we found that the conversion process initiates from the edge of the $MoS_2$ nanosheet and gradually proceeds towards the center, as shown in the optical and Raman mapping images of a partially converted $MoS_2$ nanosheet in FIG. 12$a$-$c$. The edge-to-center conversion progress could be attributed to the existence of dangling bonds and defects at the periphery sites of $MoS_2$ nanosheets, where the P substitution are taking place preferentially. Unsurprisingly, MoP could also be converted from mechanically exfoliated $MoSe_2$, which shares a very similar hexagonal arrangement of Mo with $MoS_2$. As shown in FIG. 13, the optical image of a ~5 nm $MoSe_2$ nanosheet was successfully converted to single-crystalline MoP (confirmed by TEM later). The Raman and XPS spectra confirm the complete conversion from $MoSe_2$ to MoP (FIGS. 14 and 15). Furthermore, thick $MoSe_2$ nanosheet generally resulted in stronger lattice distortion in the crystallinity, possibly due to its larger lattice mismatch in lattice constant c than that of $MoS_2$ (FIG. 16). On the other hand, the chemical conversion from $WS_2$ to WP was unsuccessful (FIG. 17$a$,$b$) because WP is orthorhombic (FIG. 17$c$) instead of hexagonal. Hence, the identical MoP conversion from both $MoS_2$ and $MoSe_2$ further confirms our proposed atomic substitution mechanism based on the hexagonal framework of Mo.

Figure 3:
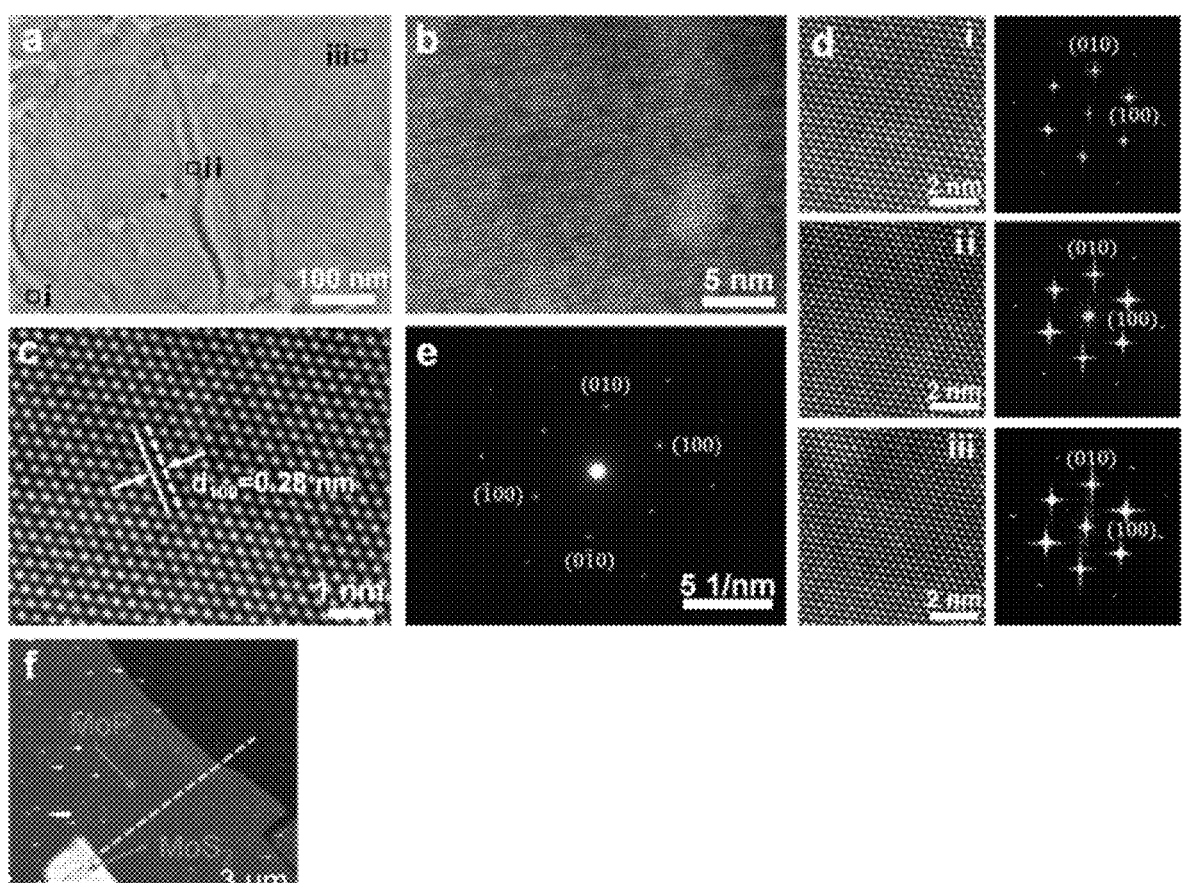
FIG. 3 depicts Transmission electron microscopy (TEM) and atomic force microscopy (AFM) characterization of MoP. (a) Low magnification TEM image of a MoP nanosheet converted from $MoS_2$. Some wrinkles and holes exist in the nanosheets due to the transfer steps used in the preparation of TEM samples. (b) High-resolution TEM (HRTEM) image of MoP nanosheet converted from $MoS_2$, showing uniformity across a large area. (c) The magnified HRTEM image from (b), showing the well-resolved honeycomb structure of MoP. (d) HRTEM images and their fast Fourier transform (FFT) patterns obtained from the corresponding labelled areas in (a). (e) SAED pattern of MoP obtained from (a). (f) AFM image of a partially converted $MoS_2$ nanosheet. (g) AFM height profile corresponding to (f). (h) Side views of $MoS_2$ and MoP crystal structure.
Figure 3:
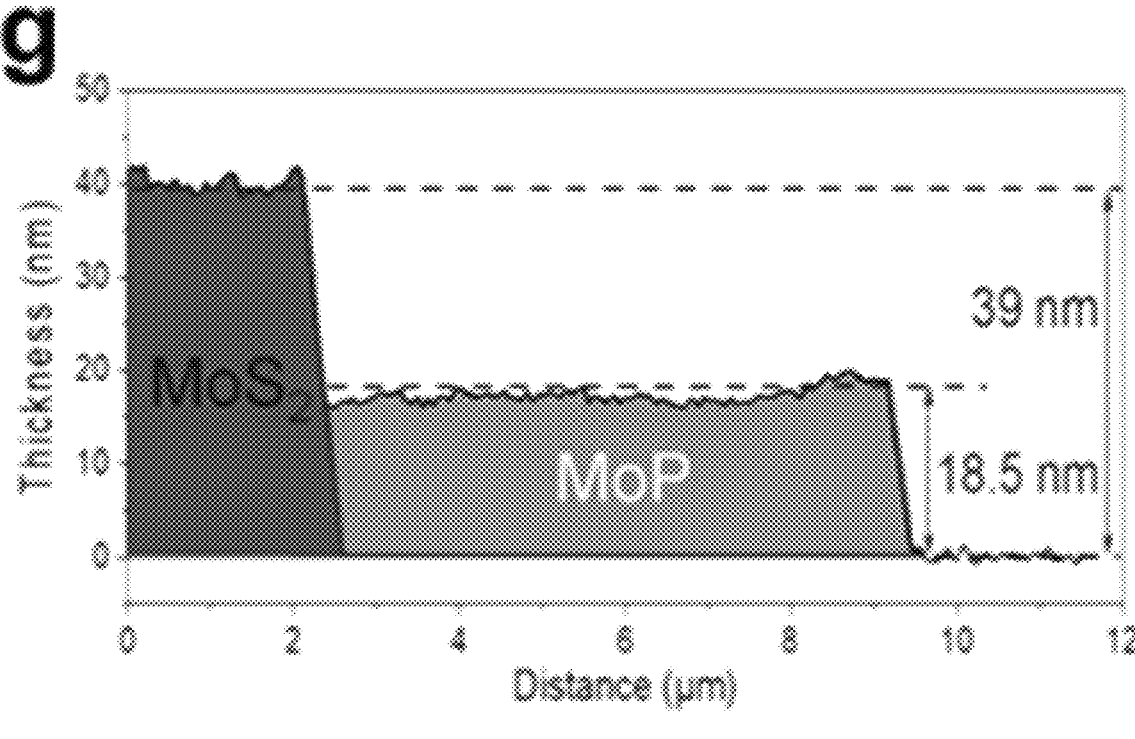
Figure 3:
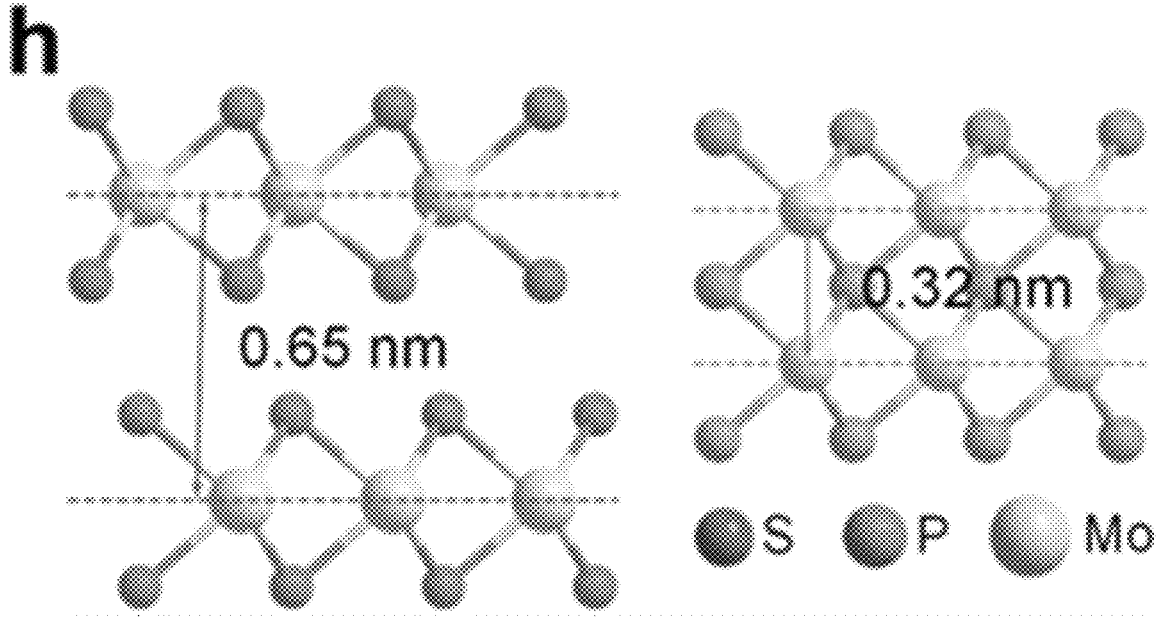
Figure 18:
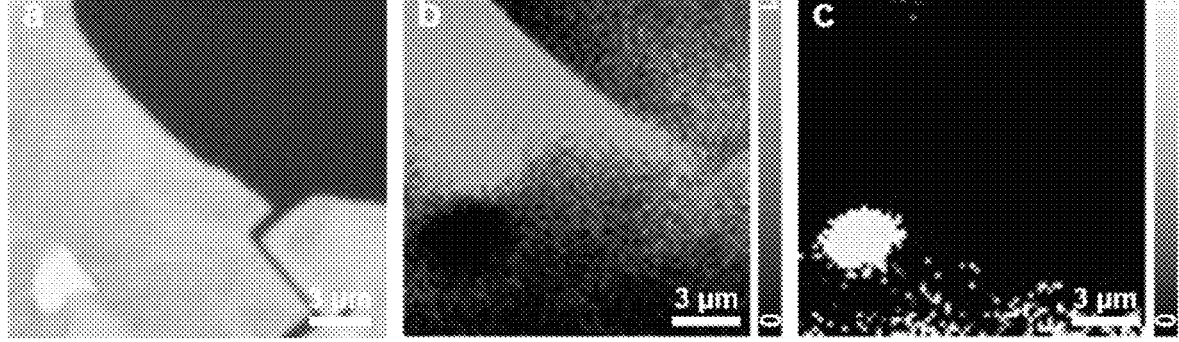
FIG. 18 depicts (a) The optical image of a partially converted $MoS_2$ nanosheet for AFM characterization (FIG. 3*f*). (b,c) Raman intensity maps of the partially converted $MoS_2$ nanosheet at 406 $cm^{-1}$ and the $A_{1g}$ mode of $MoS_2$. The center of the nanosheets is still $MoS_2$, while the rest is converted to MoP during the surface-confined atomic substitution reaction.
Figure 19:
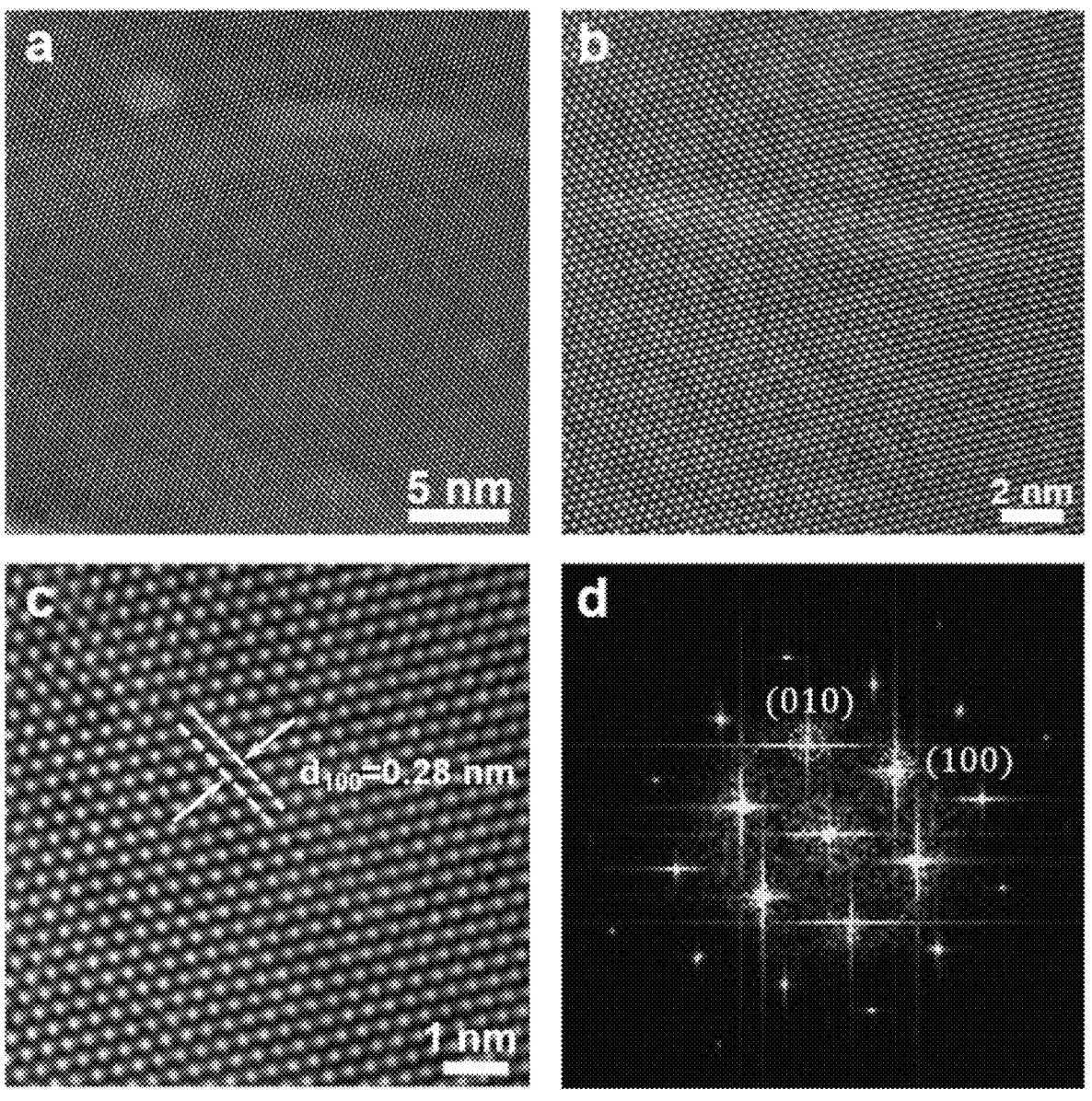
FIG. 19 depicts (a-c) High-resolution transmission electron microscopy (HRTEM) images of MoP converted from $MoSe_2$. MoP converted from $MoSe_2$ shows good crystallinity and a spacing distance of 0.28 nm between two adjacent (100) lattice planes, corresponding with MoP converted from $MoS_2$. (d) Fast Fourier transform (FFT) pattern of MoP from (c), showing sets of diffraction spots in characteristic hexagonal symmetry. The TEM images and FFT pattern show the typical hexagonal structure of MoP.

TEM was employed to further determine the crystal structure of the converted MoP. FIG. 3$a$ displays the low-magnification TEM image of a MoP nanosheet converted from a thin $MoS_2$ nanosheet (~8 nm). The sample shows clear 2D sheet morphology with a smooth surface. The observed wrinkles are generated from the sample transfer process. The corresponding high-magnification TEM (HR-TEM) images are shown in FIG. 3$b$,$c$, where the MoP exhibits a long-range order hexagonal crystal structure and a spacing distance of 0.28 nm between two adjacent (100) lattice planes. FIG. 3$d$ shows the HRTEM images and their corresponding fast Fourier transform (FFT) patterns of three distant areas on the same MoP nanosheet in FIG. 3$a$. The HRTEM images of these three distant areas show identical lattice orientation, and the corresponding FFT patterns consistently display the characteristic hexagonal structure of MoP, indicating the successful preparation of single-crystalline MoP nanosheets. The selected-area electron diffraction (SAED) pattern in FIG. 3$e$ displays sets of diffraction spots in hexagonal symmetry, confirming the high crystallinity of the as-prepared MoP. FIG. 3$f$ shows the atomic force microscopy (AFM) image of a partially converted $MoS_2$ nanosheet, where the majority area was converted to MoP while the center remain $MoS_2$, which was confirmed by the Raman mapping (FIG. 18). The nanosheet thickness was significantly reduced from ~39 nm for $MoS_2$ to ~18.5 nm for MoP (FIG. 3$g$), which is consistent with the change from layered $MoS_2$ with van der Waals gaps nonlayered MoP with isotropic covalent bonds (FIG. 3$h$). Additionally, MoP converted from $MoSe_2$ is also characterized with HRTEM (FIG. 19), showing perfect single crystallinity over the entire nanosheet with a lattice spacing of 0.28 nm corresponding to the (100) plane of MoP, which are identical to those of MoP converted from $MoS_2$.

Figure 20:
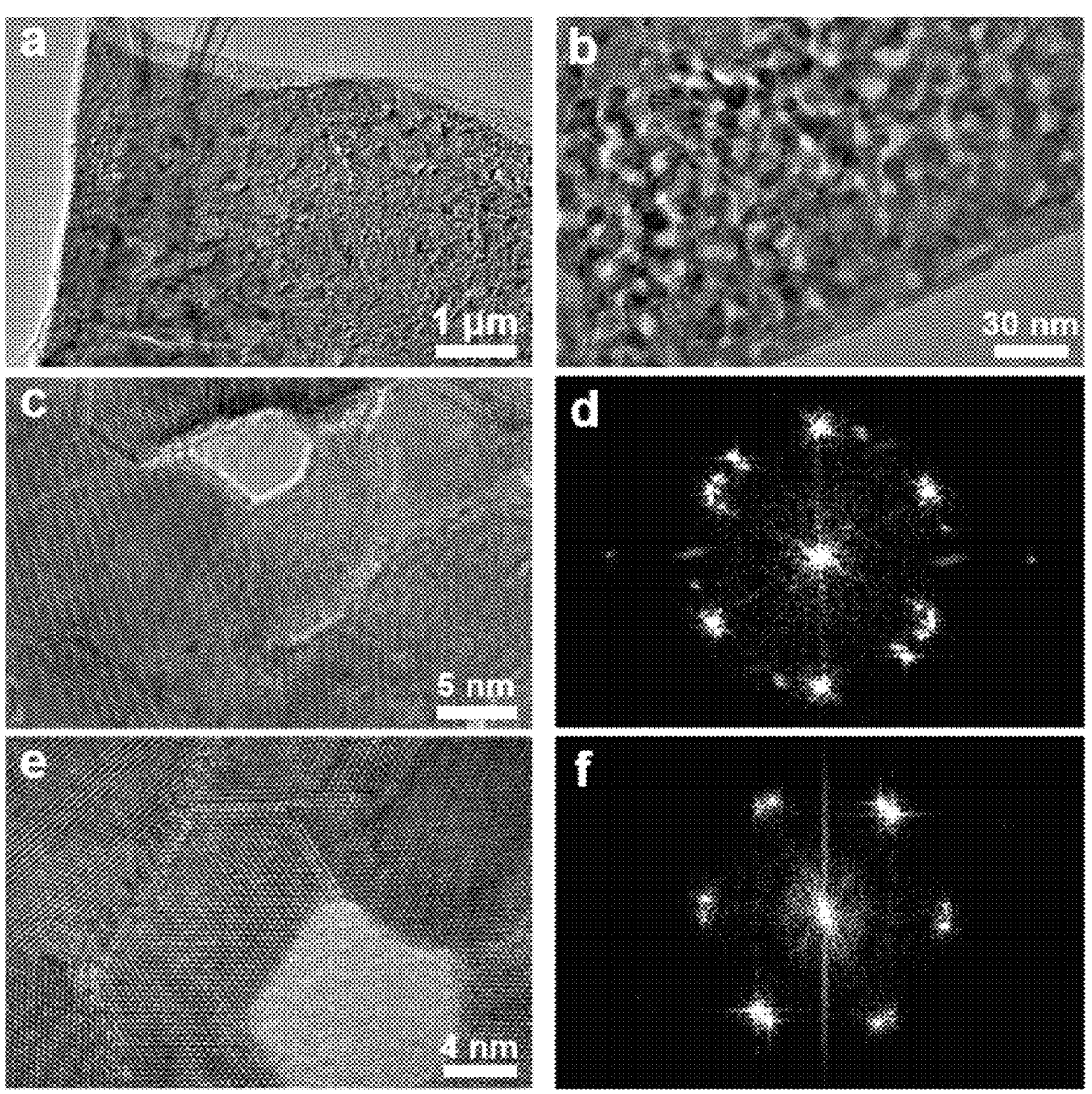
FIG. 20 depicts (a,b) Low magnification TEM images of MoP converted from thick $MoS_2$ (~30 nm). Lattice distortions are easily observed, which is consistent with the optical images such as FIG. 10*b*. (c-f) HRTEM images (c,e) and their corresponding FFT patterns (d,f) of MoP converted from thick $MoS_2$. The distorted crystal domains lead to the sets of twisted hexagonal diffraction spots in the FFT patterns.
Figures 21, 22:
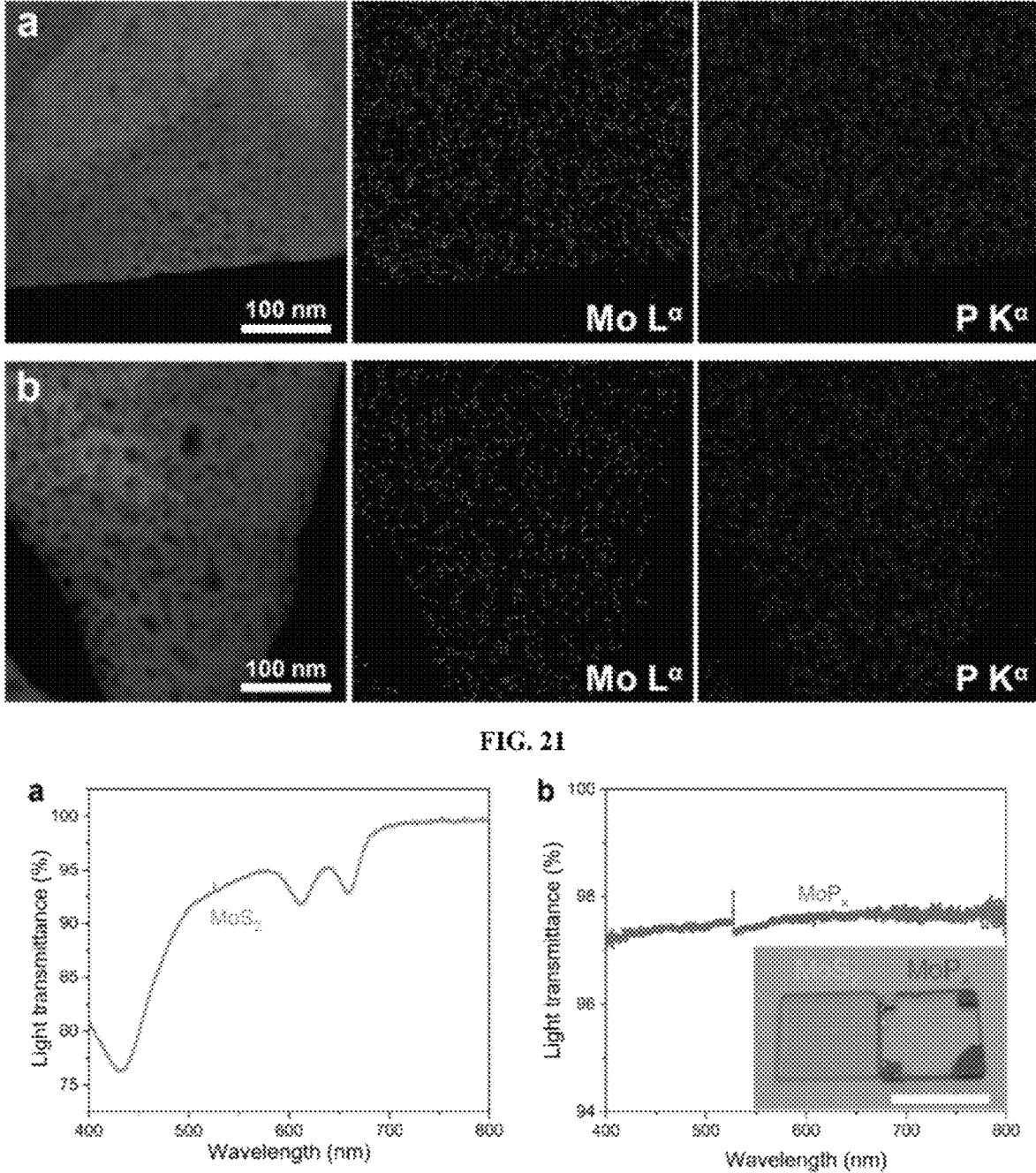
FIG. 21 depicts (a) (Scanning transmission electron microscopy) STEM image of a MoP nanosheet converted from a thick $MoS_2$ nanosheet (~30 nm) and the energy-dispersive X-ray spectroscopy (EDS) elemental mappings of Mo and P. (b) STEM image of a MoP nanosheet converted from a thick $MoSe_2$ nanosheet (~25 nm) and the EDS elemental mappings of Mo and P. Mo and P are uniformly distributed on the nanosheets converted from both $MoS_2$ and $MoSe_2$, indicating the successful preparation of MoP. Thick $MoS_2$ and $MoSe_2$ nanosheets were used for EDS characterization to ensure strong EDS signals.
FIG. 22 depicts (a) light transmittance spectrum of a CVD-$MoS_2$ thin film on a quartz substrate. (b) Light transmittance spectrum of $MoP_x$ converted from (a). Insert picture in (b) is the optical photo of a 10×10 mm CVD-$MoS_2$ film before and after conversion (scale bar: 1 cm).

On the other hand, MoP converted from thicker $MoS_2$ nanosheets are highly distorted (FIG. 20$a$,$b$) due to the weaker surface confinement from substrate during the conversion processes. As shown in the HRTEM images in FIG. 20$c$,$e$, the lattice orientations of different areas show small variation, confirming the lattice distortion, which is also consistent with the corresponding FFT patterns that show sets of slightly rotated hexagonal diffraction spots (FIG. 20$d$,$f$). We further performed energy-dispersive X-ray spectroscopy (EDS) elemental mapping on MoP nanosheets converted from both $MoS_2$ and $MoSe_2$ (FIG. 21). The EDS elemental maps of Mo L$\alpha$ peak and P K$\alpha$ peak demonstrate that Mo and P elements are distributed uniformly in the MoP nanosheets converted from both $MoS_2$ and $MoSe_2$, manifesting the successful chemical conversion.

Figure 4:
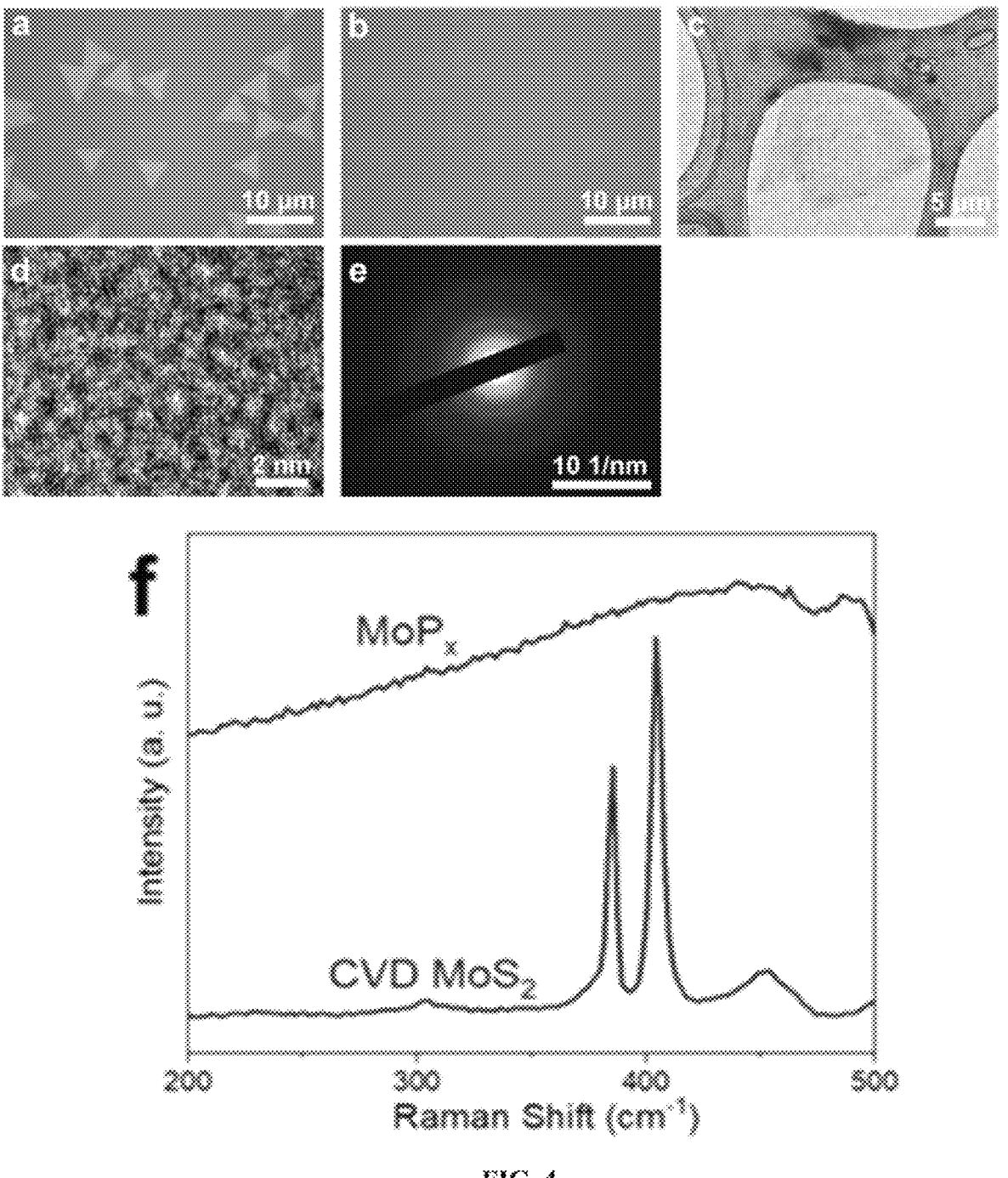
FIG. 4 depicts characterization of $MoP_x$ converted from CVD $MoS_2$. (a) Optical image of CVD $MoS_2$ nanosheets on quartz substrate. (b) Optical image of $MoP_x$ nanosheets converted from CVD $MoS_2$ on quartz substrate. (c) TEM image of $MoP_x$ nanosheet converted from CVD $MoS_2$. (d) The magnified HRTEM image from (c), indicating the amorphous structure of $MoP_x$. (e) SAED pattern of $MoP_x$ obtained from FIG. 23. (f) Raman spectra of CVD $MoS_2$ and converted $MoP_x$. (g) AFM image of a typical CVD $MoS_2$ nanosheet. (h) AFM image of a typical $MoP_x$ nanosheet converted from CVD $MoS_2$. (i) AFM height profiles of CVD $MoS_2$ nanosheet in (g) and $MoP_x$ nanosheet in (h).
Figure 4:
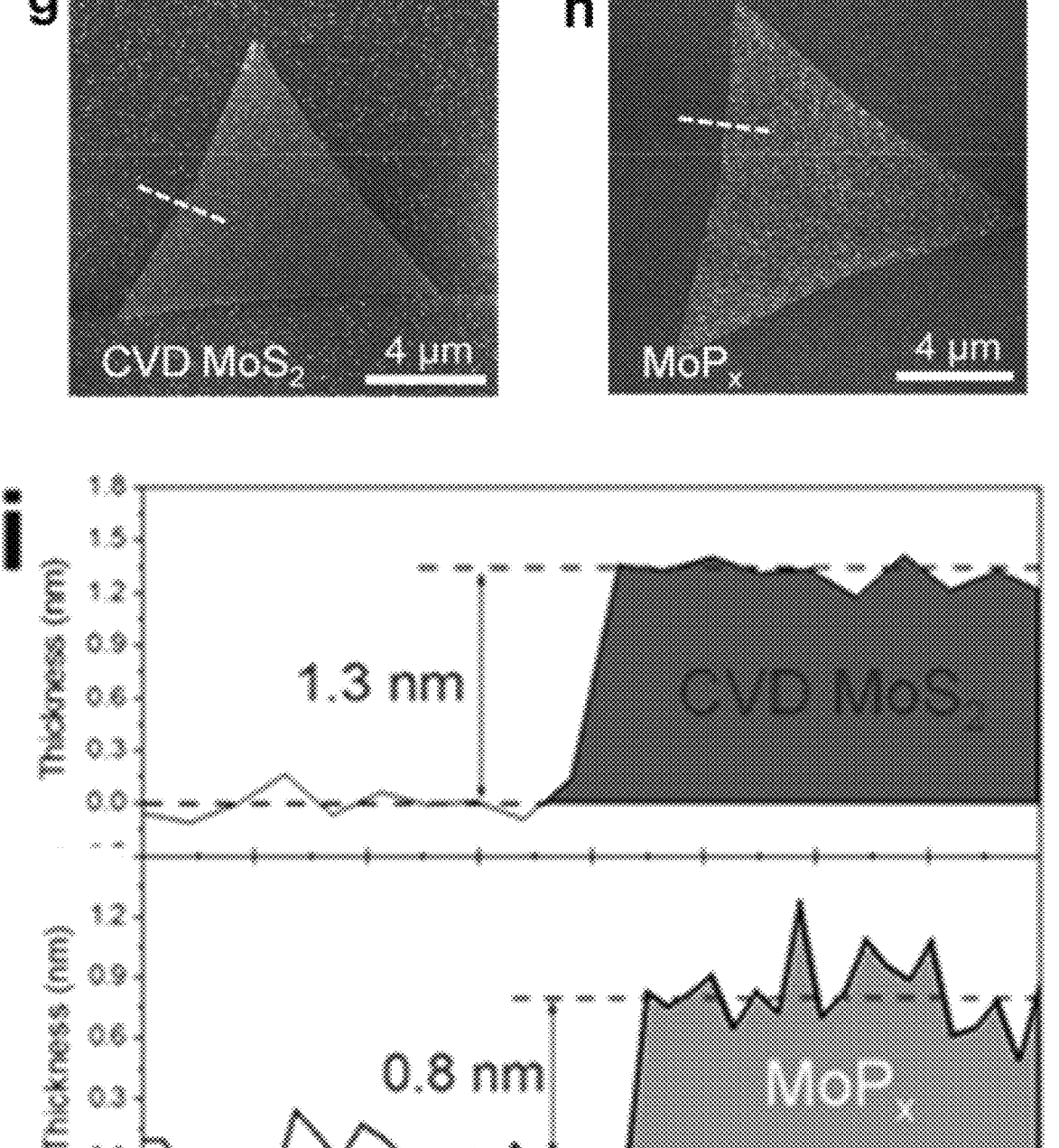
Figure 23:
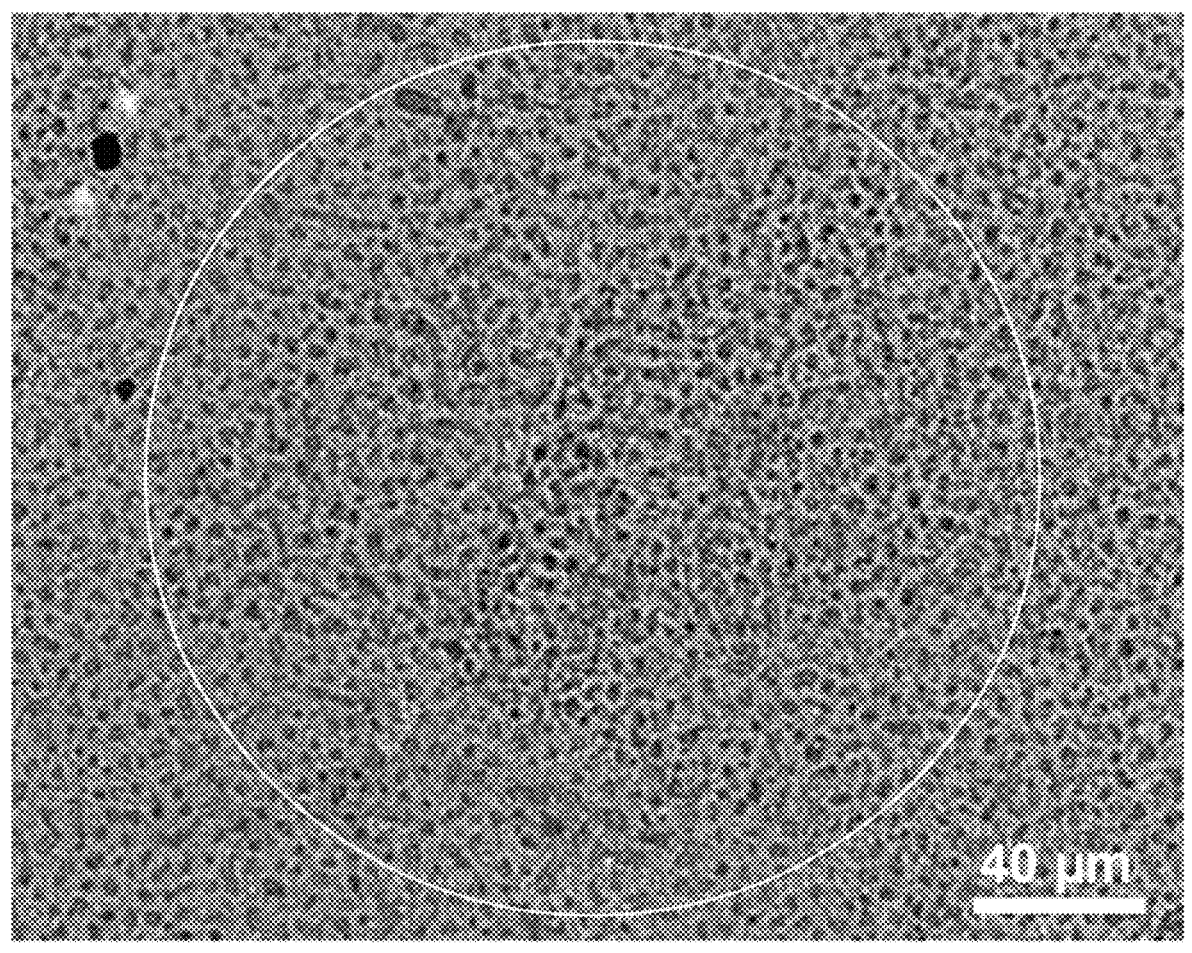
FIG. 23 depicts TEM image of $MoP_x$ converted from CVD $MoS_2$. The selected circular area was used for electron diffraction.
Figure 24:
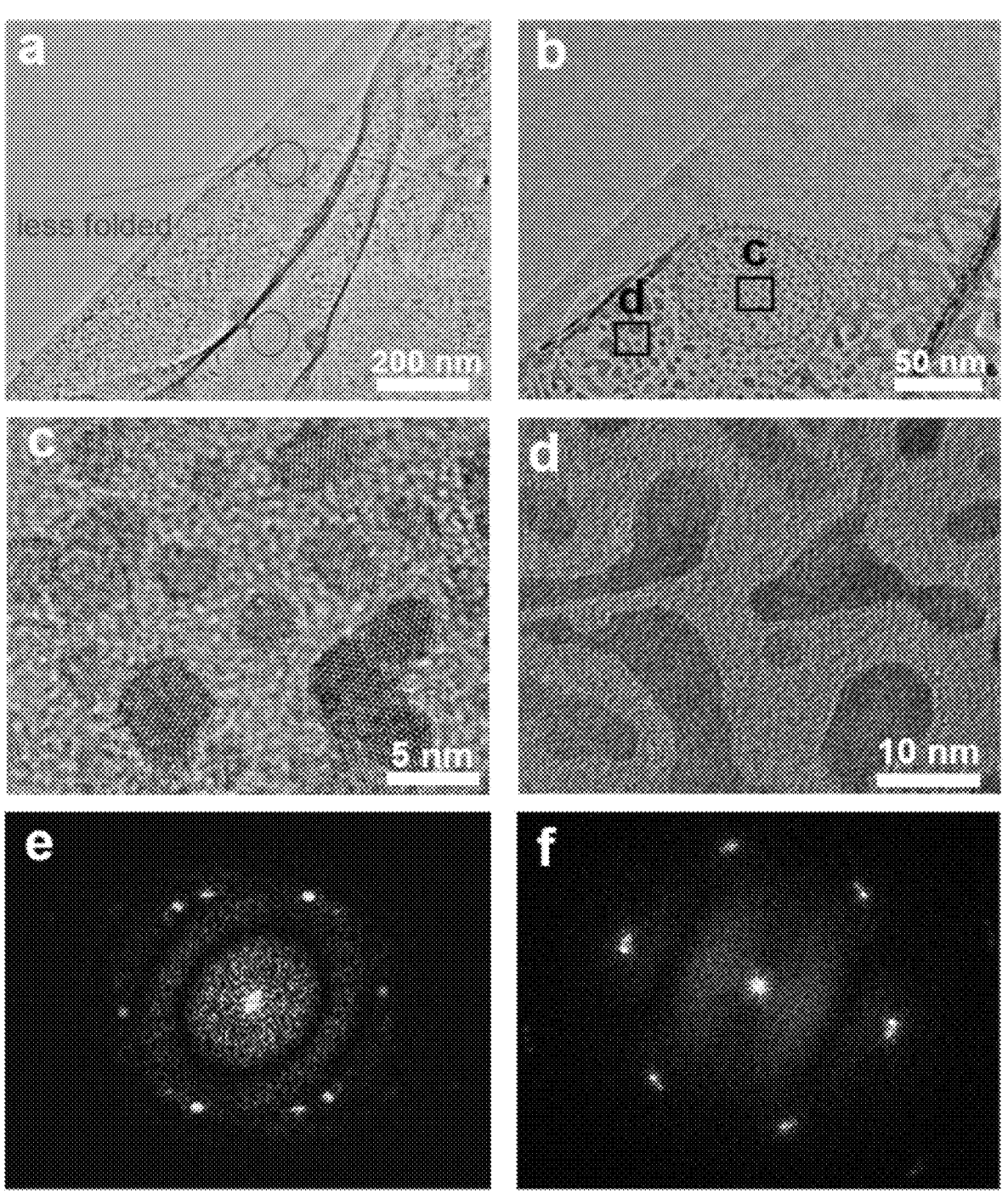
FIG. 24 depicts (a,b) TEM images under various magnifications of $MoP_x$ converted from folded CVD $MoS_2$. (c,d) HRTEM images of the folded parts with different folded layers in (b). With the thickness increase of folded CVD $MoS_2$, the converted $MoP_x$ shows larger crystalline MoP domains. (e,f) FFT patterns corresponding to (c) and (d), respectively. Both the characteristic diffraction of MoP crystal in hexagonal symmetry and diffuse halo of amorphous $MoP_x$ appeared in the FFT patterns of (c) and (d). The hexagonal diffraction spots are twisted due to the variations in crystal orientations of different crystal domains. The diffuse halo is more ambiguous in (f), indicating higher crystallinity.
Figure 25:
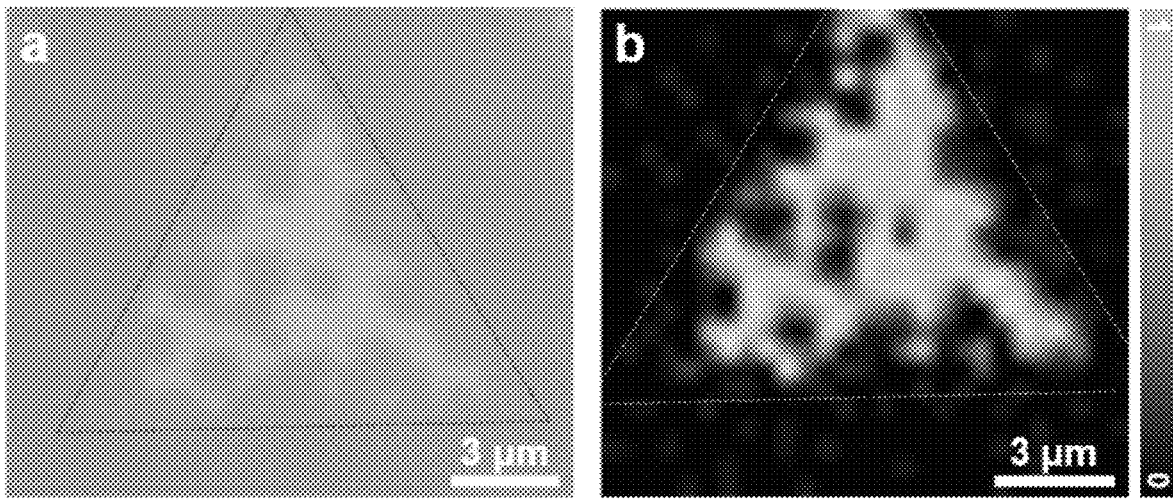
FIG. 25 depicts (a) optical image of a partially converted monolayer CVD $MoS_2$. (b) Raman intensity map image of the nanosheet in (a) at the $A_{1g}$ mode of $MoS_2$.
Figure 26:
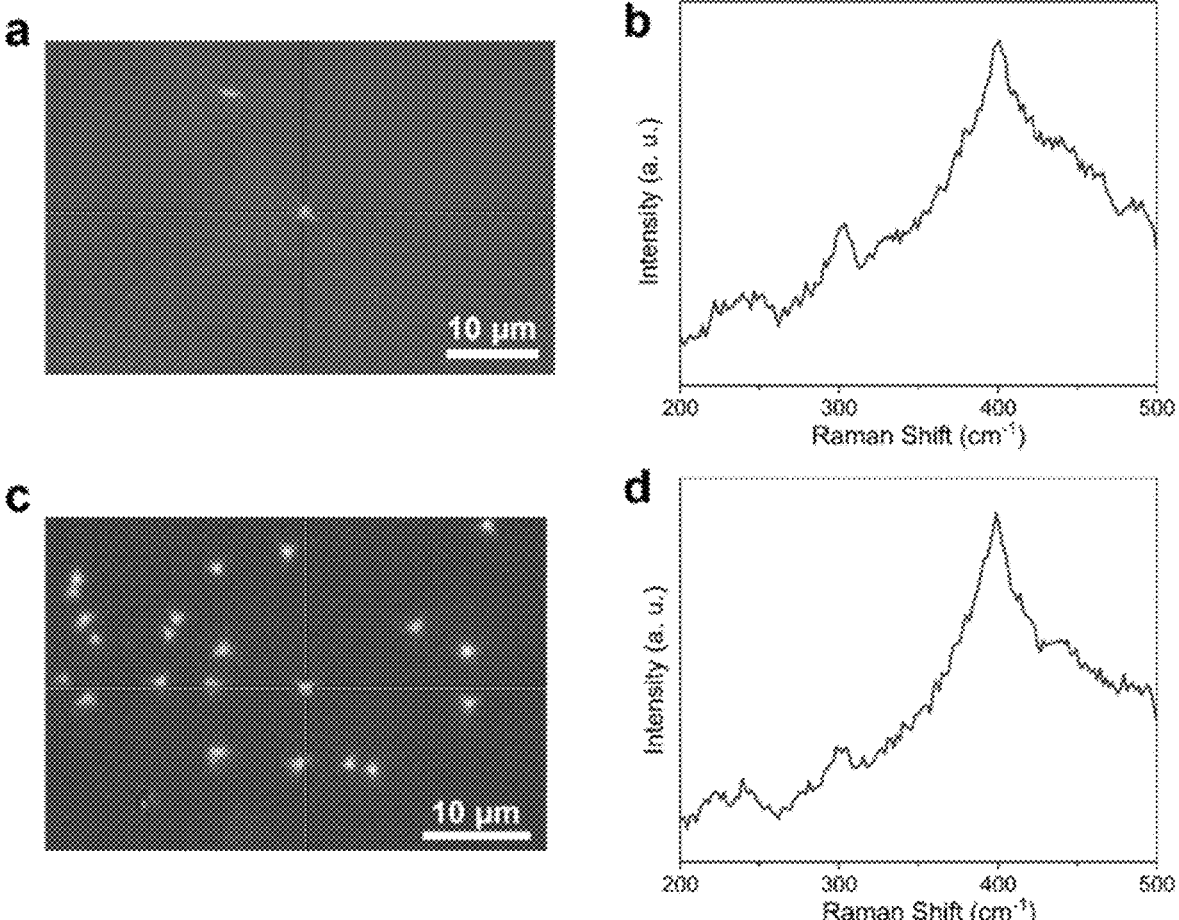
FIG. 26 depicts (a) optical images of $MoP_x$ converted from rolled-up CVD $MoS_2$. (b) The Raman spectra of the MoP converted from rolled-up CVD $MoS_2$ in (a). (c) Optical images of MoP converted from multilayer CVD $MoS_2$. (d) The Raman spectra of the MoP converted from multilayer CVD $MoS_2$ in (c).

In addition, monolayer CVD grown $MoS_2$ (CVD $MoS_2$) was utilized to investigate the surface-confined atomic substitution at the 2D limit. FIG. 4$a$,$b$ are the optical images of CVD $MoS_2$ nanosheets before and after the conversion reaction, respectively, where the converted $MoP_x$ nanosheets displayed identical morphologies to CVD $MoS_2$. The converted $MoP_x$ nanosheets appear to be extremely transparent on quartz substrate under the optical microscope, which is further confirmed by the transmittance spectra of a CVD $MoS_2$ thin film before and after conversion (FIG. 22). CVD $MoS_2$ thin film exhibits absorption spectrum consistent with semiconducting $MoS_2$ monolayer, while the converted $MoP_x$ achieved a visible light transmittance as high as 97%, approaching monolayer graphene. The significantly enhanced transparency of $MoP_x$ is consistent with its semimetallic characteristics. TEM images of $MoP_x$ converted from monolayer CVD $MoS_2$ with different magnifications are displayed in FIG. 4$c$,$d$. The converted product retains the 2D morphology (FIG. 4$c$), but shows no crystalline structure in the HRTEM image (FIG. 4$d$). The SAED patterns (FIG. 4$c$) obtained from $MoP_x$ (FIG. 23) present a characteristic diffuse halo instead of sharp hexagonal diffraction spots of crystalline MoP. Therefore, it was concluded that the $MoP_x$ converted from monolayer CVD $MoS_2$ is amorphous. Furthermore, we found that small crystalline MoP domains could form from folded CVD $MoS_2$ nanosheet, as shown in FIG. 24$a$,$b$. The lattice orientations are constant inside each domain while randomly distributed among different domains, which indicates that these crystalline domains were formed independently during the conversion reaction process. Noteworthy, the area of crystal domains increases with the increase of folded layers (FIG. 24$c$,$d$). The corresponding FFT patterns are presented in FIG. 24$e$,$f$, where the diffraction spots become sharper and diffraction rings become vaguer, indicating the increased proportion of crystalline MoP. The Raman spectra of CVD $MoS_2$ before and after conversion is shown in FIG. 4$f$. CVD $MoS_2$ has $$E^1_{2g}$$

and $A_{1g}$ modes located at 385.5 and 404.5 $cm^{-1}$ with a separation of ~19 $cm^{-1}$, consistent with monolayer morphology. However, no Raman peak was detected after the conversion, which could result from the amorphous nature and uncertain stoichiometry of $MoP_x$. Similar to exfoliated multilayer $MoS_2$, the substitution process initiates at the edge and propagates towards the center on monolayer CVD $MoS_2$, as evident in the optical image and Raman mapping of partially converted CVD $MoS_2$ (FIG. 7). As shown in FIG. 26, characteristic Raman peak at ~406 $cm^{-1}$ was observed in the products converted from rolled-up monolayer CVD $MoS_2$ and multilayer CVD $MoS_2$, which indicates the formation of crystalline MoP due to the presence of multiple layers of Mo frameworks. The AFM images of monolayer CVD $MoS_2$ nanosheets before and after conversion are presented in FIG. 4$g$,$h$, where the $MoP_x$ maintains the triangular shape with the thickness decreases from 1.3 nm to 0.8 nm (FIG. 4*i*). The amorphous MoP$_x$ not only retains the 2D morphology of CVD MoS$_2$ but also possesses an even and smooth surface, which indicates that the substrate helps to stabilize the 2D morphology of the monolayer amorphous MoP$_x$ during the conversion. These experiments suggest that the amorphization on monolayer MoS$_2$ after the atomic substitution is attributed to the fact that the existence of only one layer of Mo framework is not sufficient in forming MoP crystalline structures (see Example 4).

Figure 5:
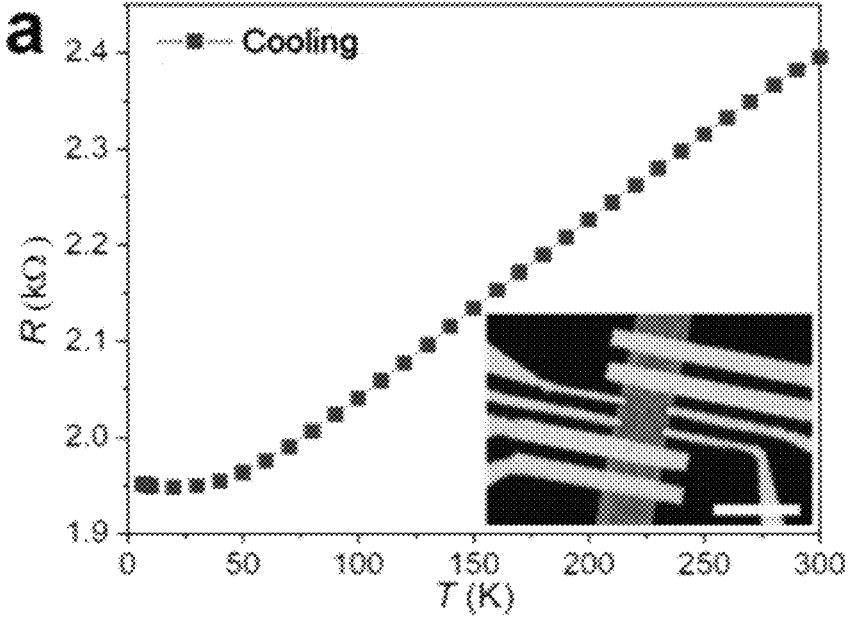
FIG. 5 depicts electrical and electrocatalytic performance of MoP. (a) Temperature-dependent resistance of MoP converted from $MoS_2$. Insert picture is the device used. Scale bar: 10 µm. (b) Schematic diagram of the OCEM, in which the electrical transport and electrochemical signals could be collected simultaneously. (c,d) Polarization curves (c) and the corresponding Tafel slopes (d) of the edge and basal plane of a typical single-crystalline MoP nanosheet. (e,f) Polarization curves (e) and the corresponding Tafel slopes (f) of the edge and basal plane of a typical single-crystalline $MoS_2$ nanosheet.
Figure 5:
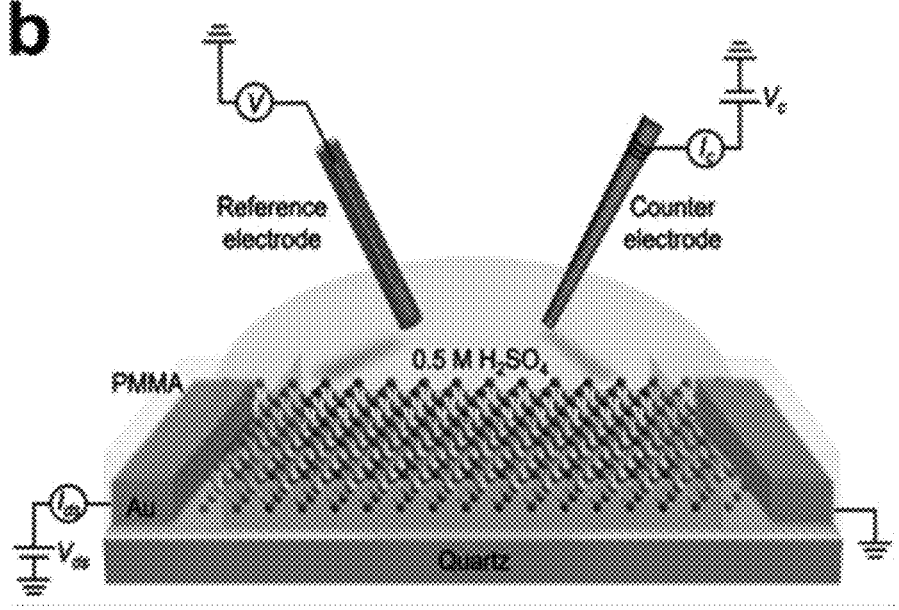
Figure 5:
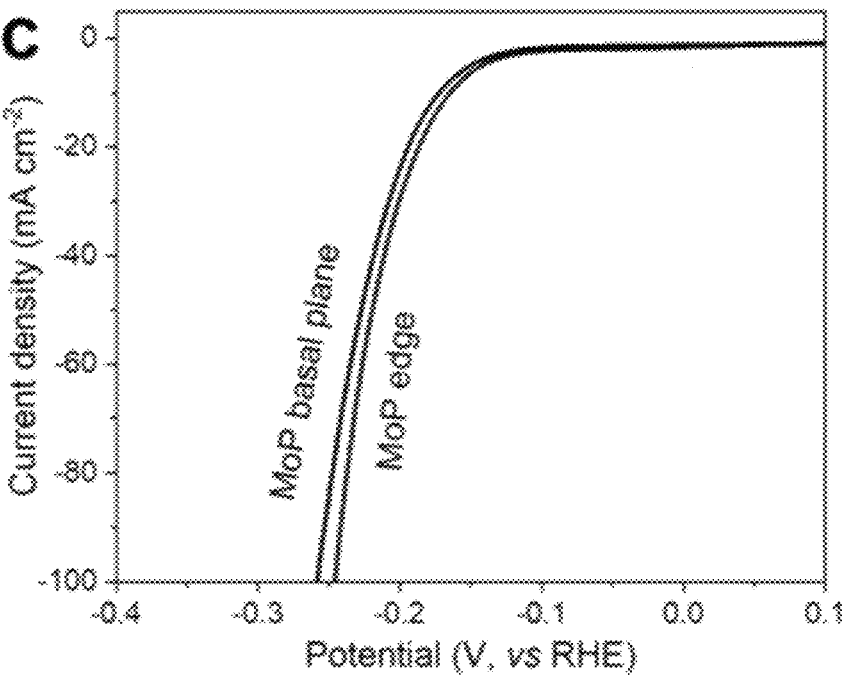
Figure 5:
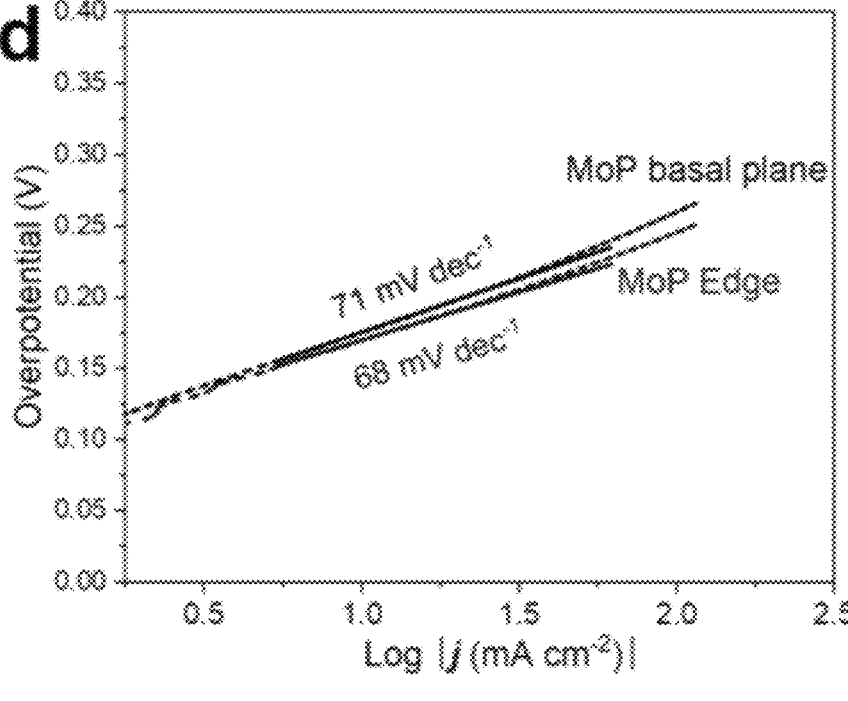
Figure 5:
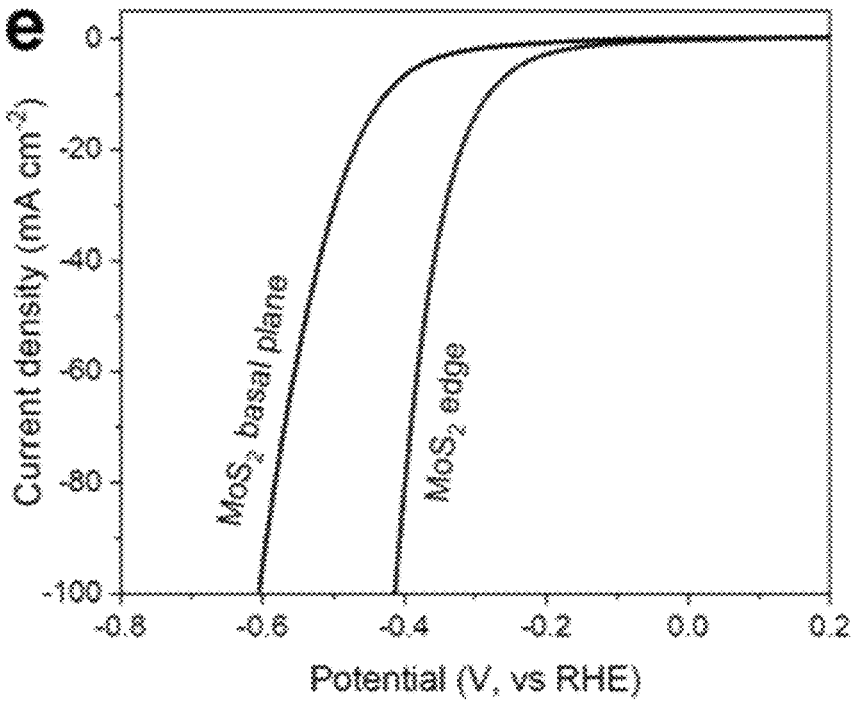
Figure 5:
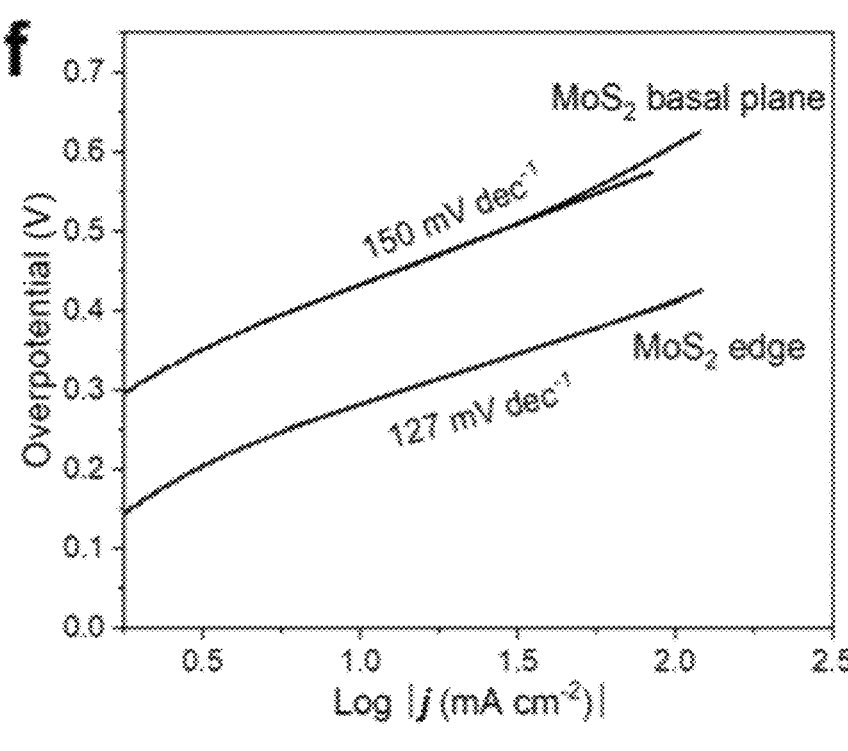
Figure 27:
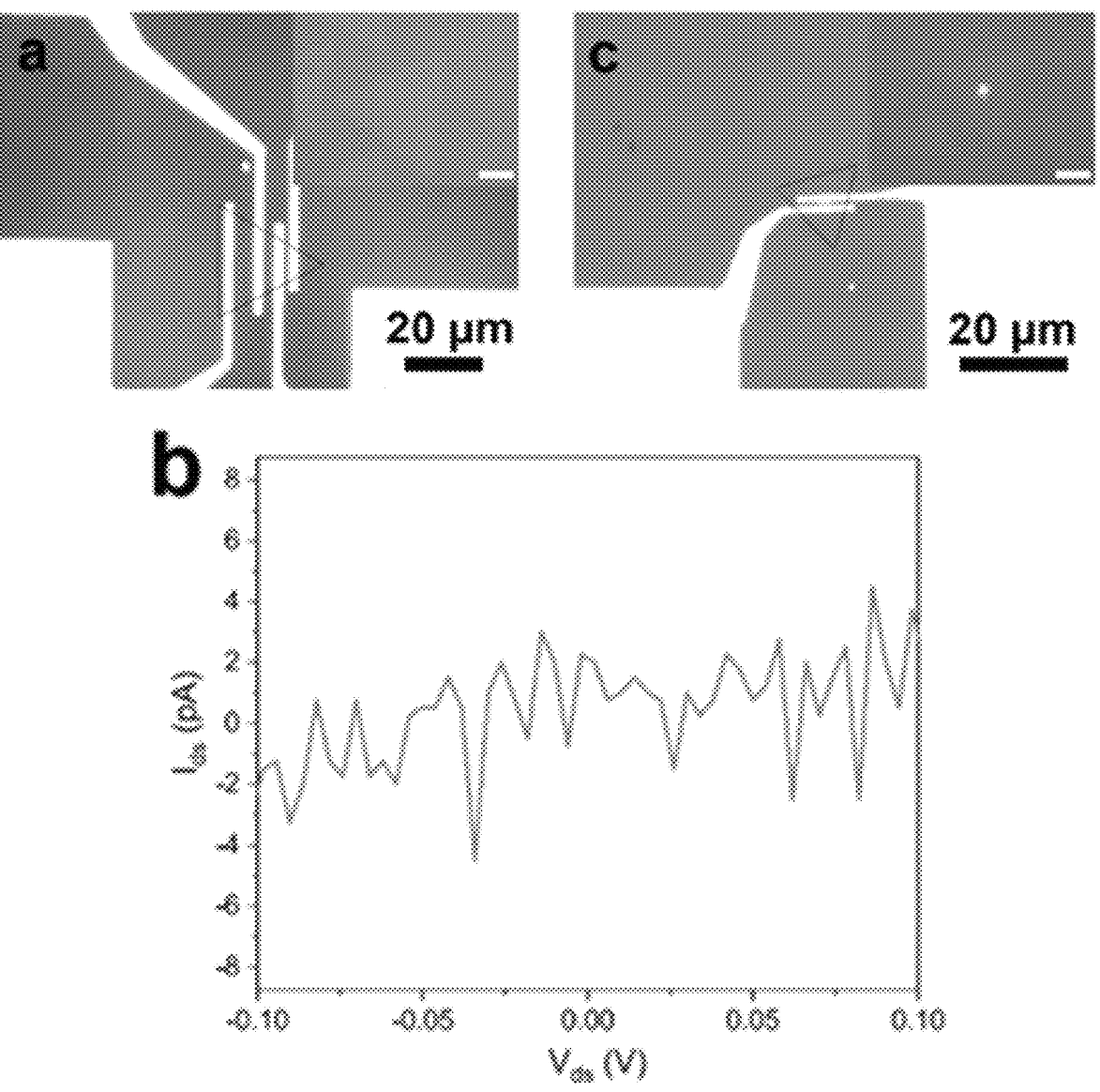
FIG. 27 depicts (a) The optical image of the $MoP_x$ converted from monolayer CVD $MoS_2$ device for las-Vas test. Insert: optical image of the $MoP_x$ before device fabrication. (b) $I_{ds}$-$V_{ds}$ curve of $MoP_x$ converted from monolayer CVD $MoS_2$. (c) The optical image of the MoP converted from multilayer CVD $MoS_2$ device for las-Vas test. Insert: optical image of the MoP before device fabrication. (d) las-Vas curve of MoP converted from multilayer CVD $MoS_2$. (e) The optical image of MoP converted from rolled-up CVD $MoS_2$ device for las-Vas test. Insert: optical image of the MoP before device fabrication. (f) las-Vas curve of MoP converted from rolled-up CVD $MoS_2$. (g) The optical image of MoP converted from stacked bilayer CVD $MoS_2$ device for las-Vas test. Insert: optical image of the stacked bilayer CVD $MoS_2$. (h) las-Vas curve of MoP converted from stacked bilayer CVD $MoS_2$. (i) The optical image of MoP converted from stacked trilayer CVD $MoS_2$ device for las-Vas test. Insert: optical image of the stacked trilayer CVD $MoS_2$. (j) las-Vas curve of MoP converted from stacked trilayer CVD $MoS_2$.
Figure 27:
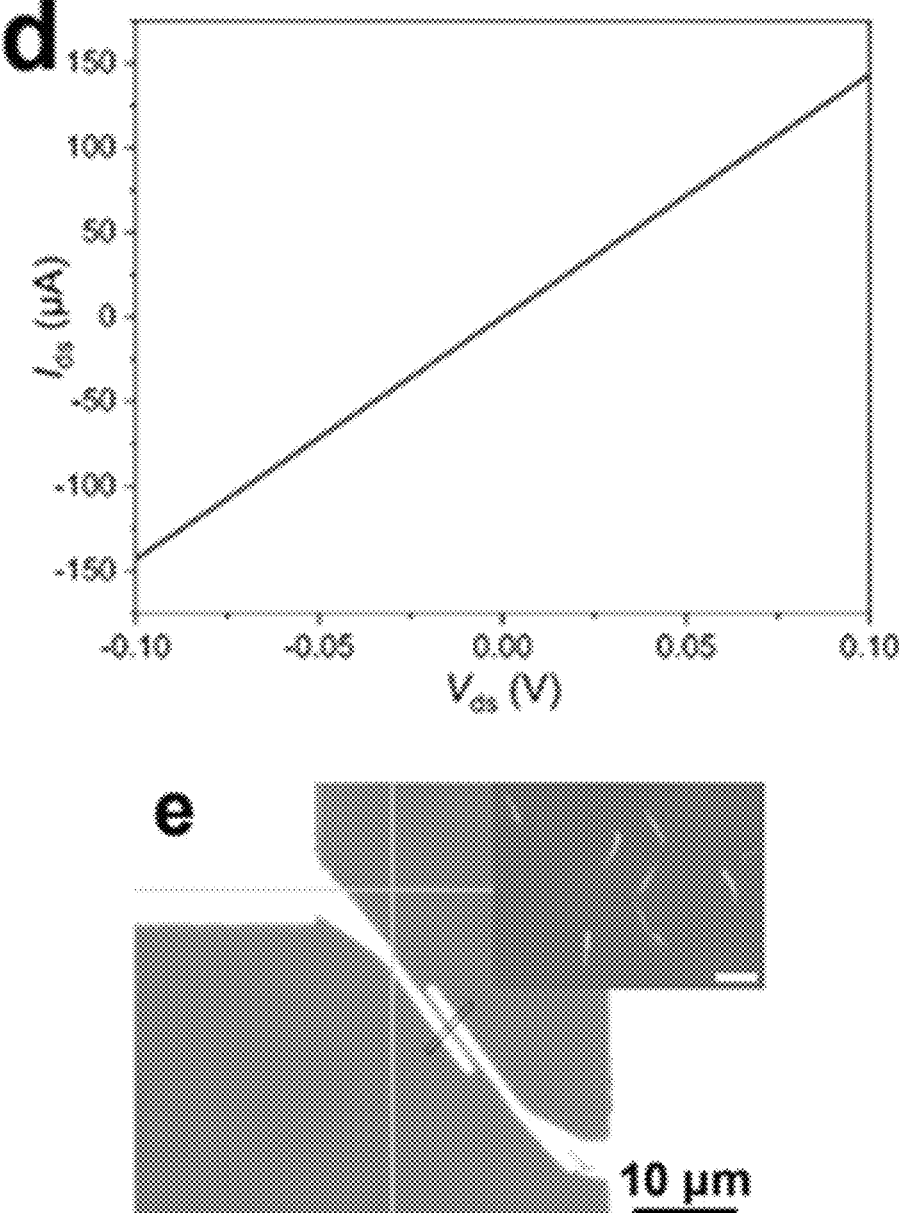
Figure 27:
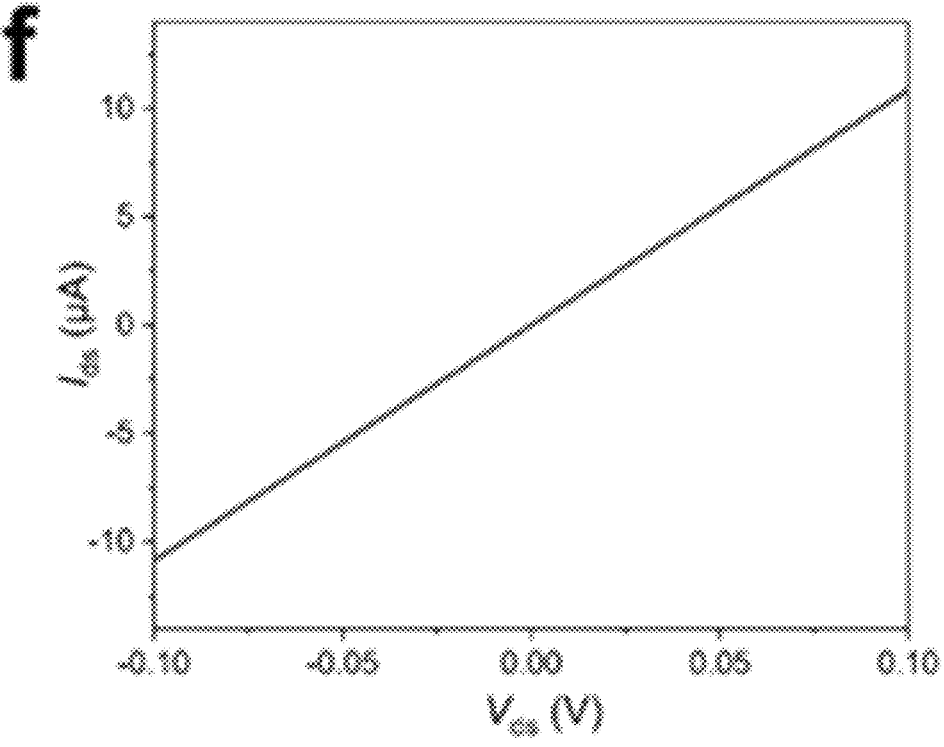
Figure 27:
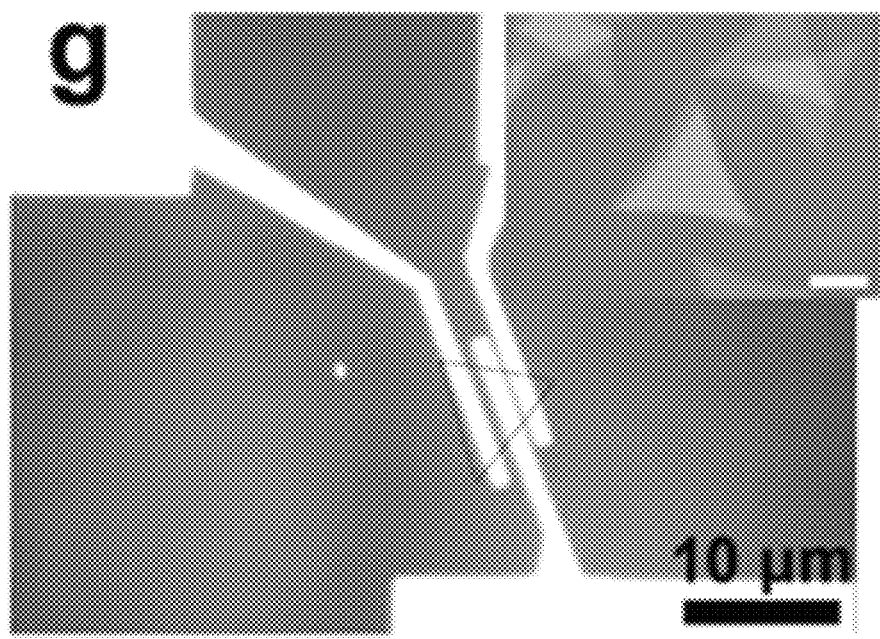
Figure 27:
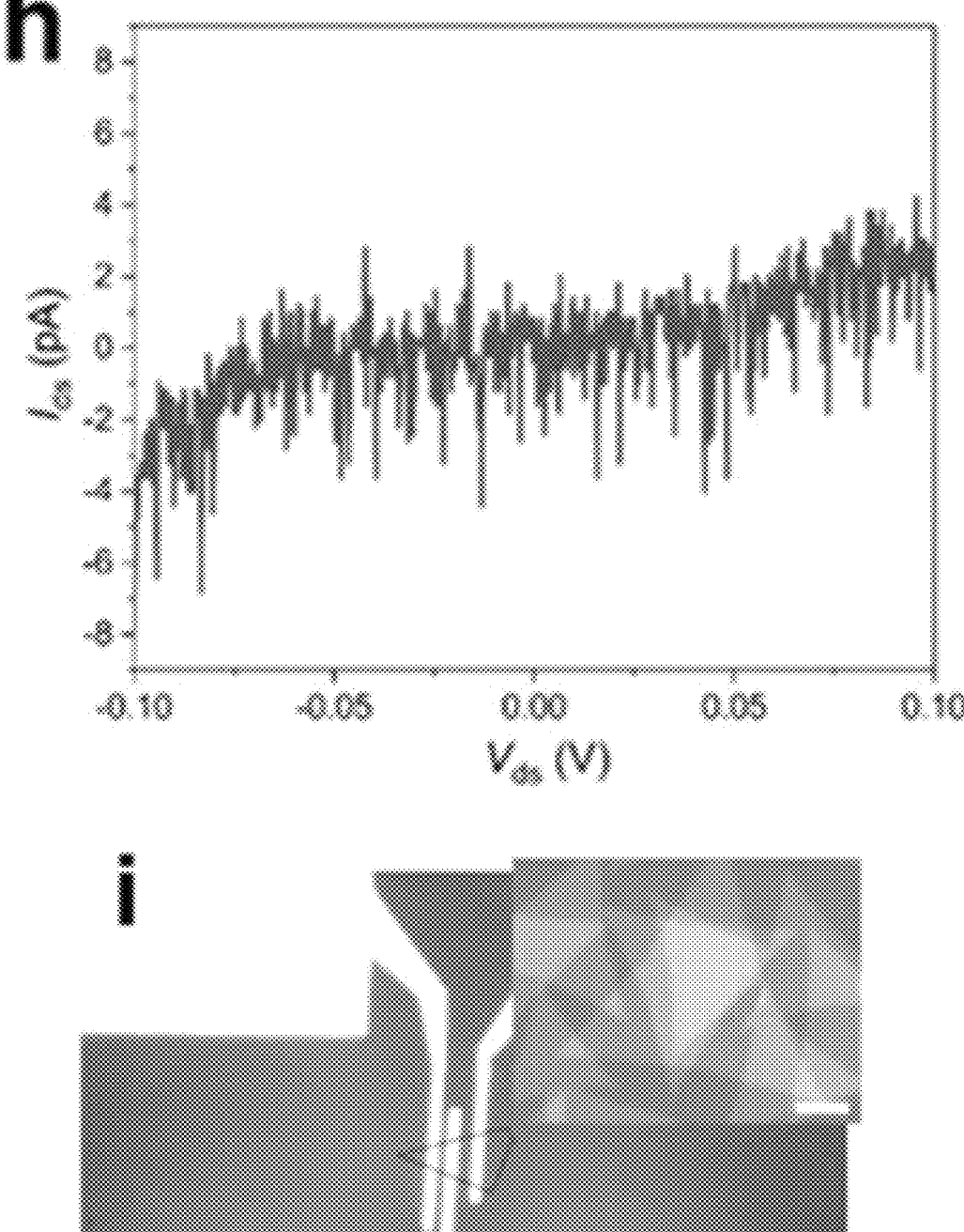
Figure 27:
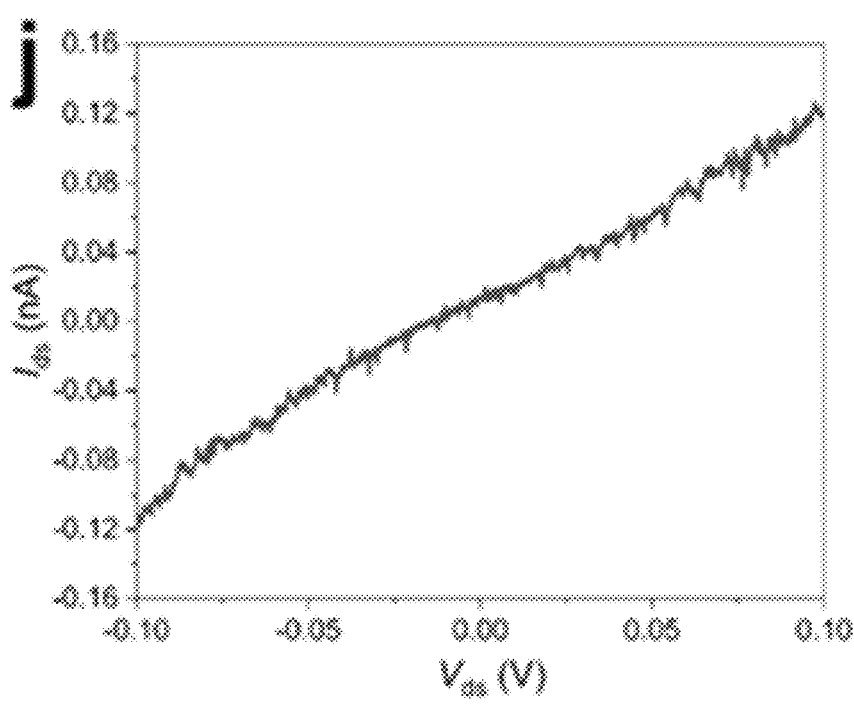
Figure 28:
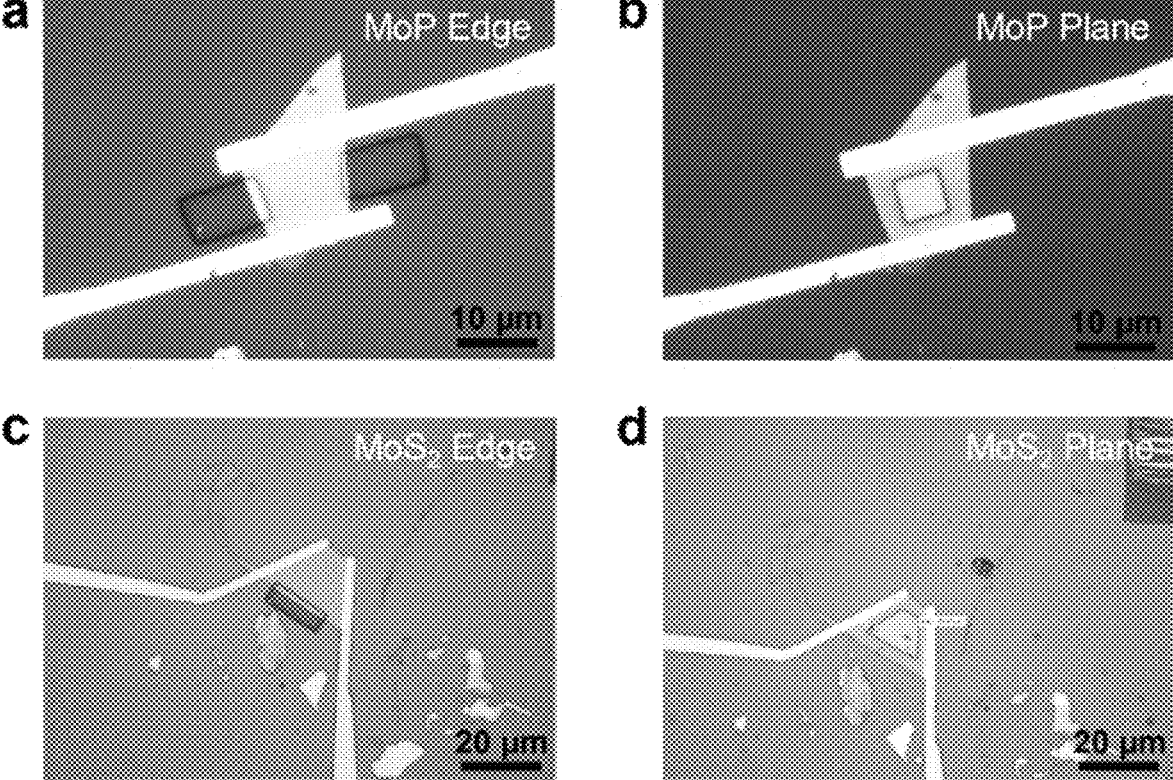
FIG. 28 depicts optical images of the exposed window on MoP and $MoS_2$ devices. (a) Window on MoP edge, (b) window on MoP basal plane, (c) window on $MoS_2$ edge and (d) window on $MoS_2$ basal plane.
Figure 29:
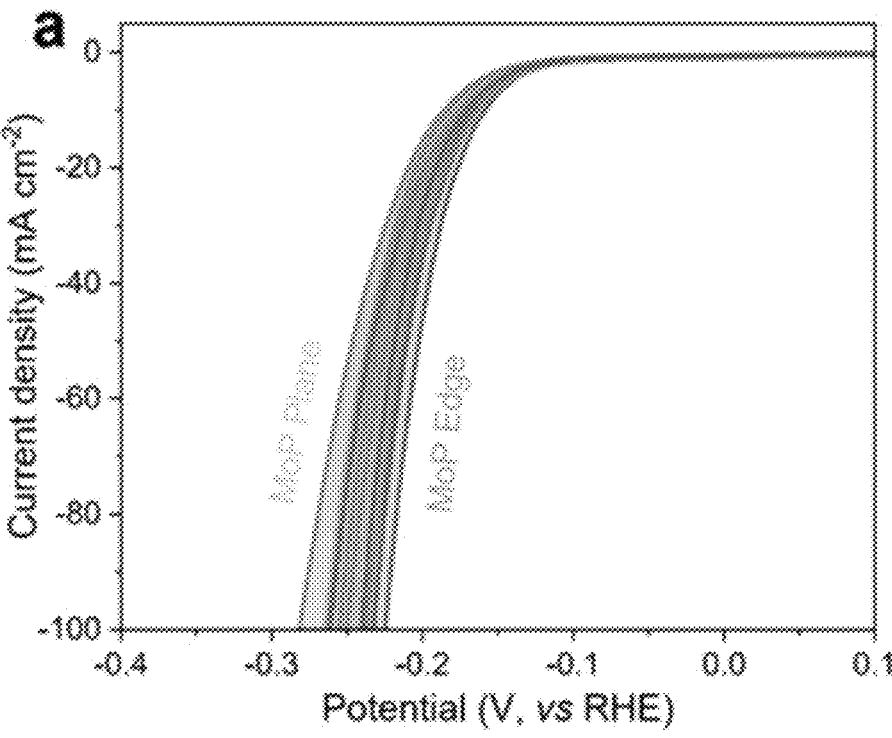
FIG. 29 depicts (a,b) polarization curves (a) and the corresponding Tafel slopes (b) of the edge and basal plane of MoP nanosheets from multiple OCEM devices. (c,d) Polarization curves (c) and the corresponding Tafel slopes (d) of the edge and basal plane of $MoS_2$ nanosheets from multiple OCEM devices.
Figure 29:
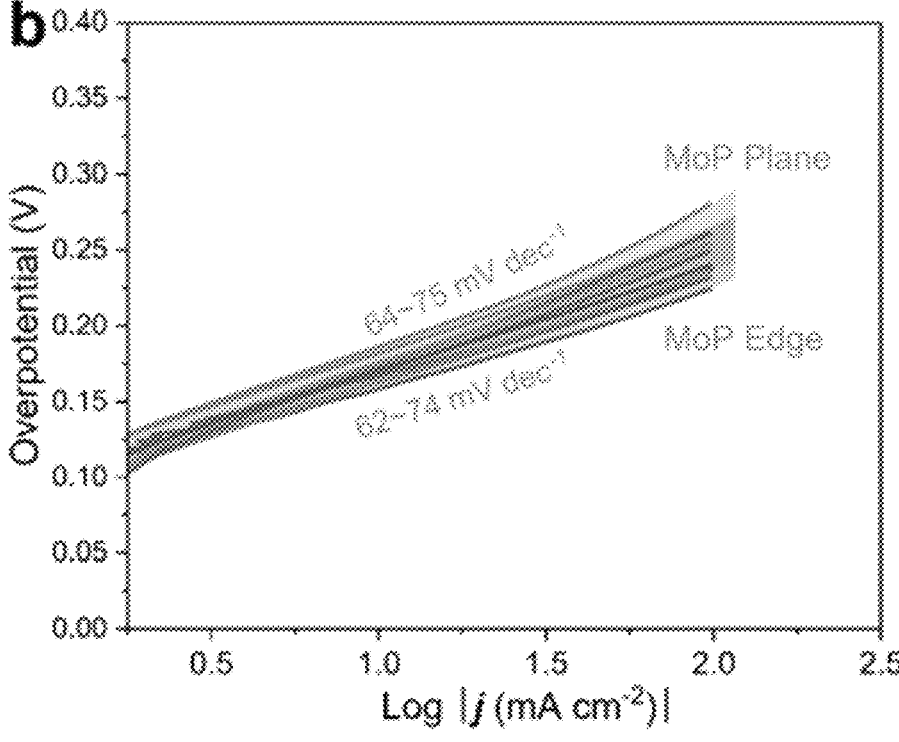
Figure 29:
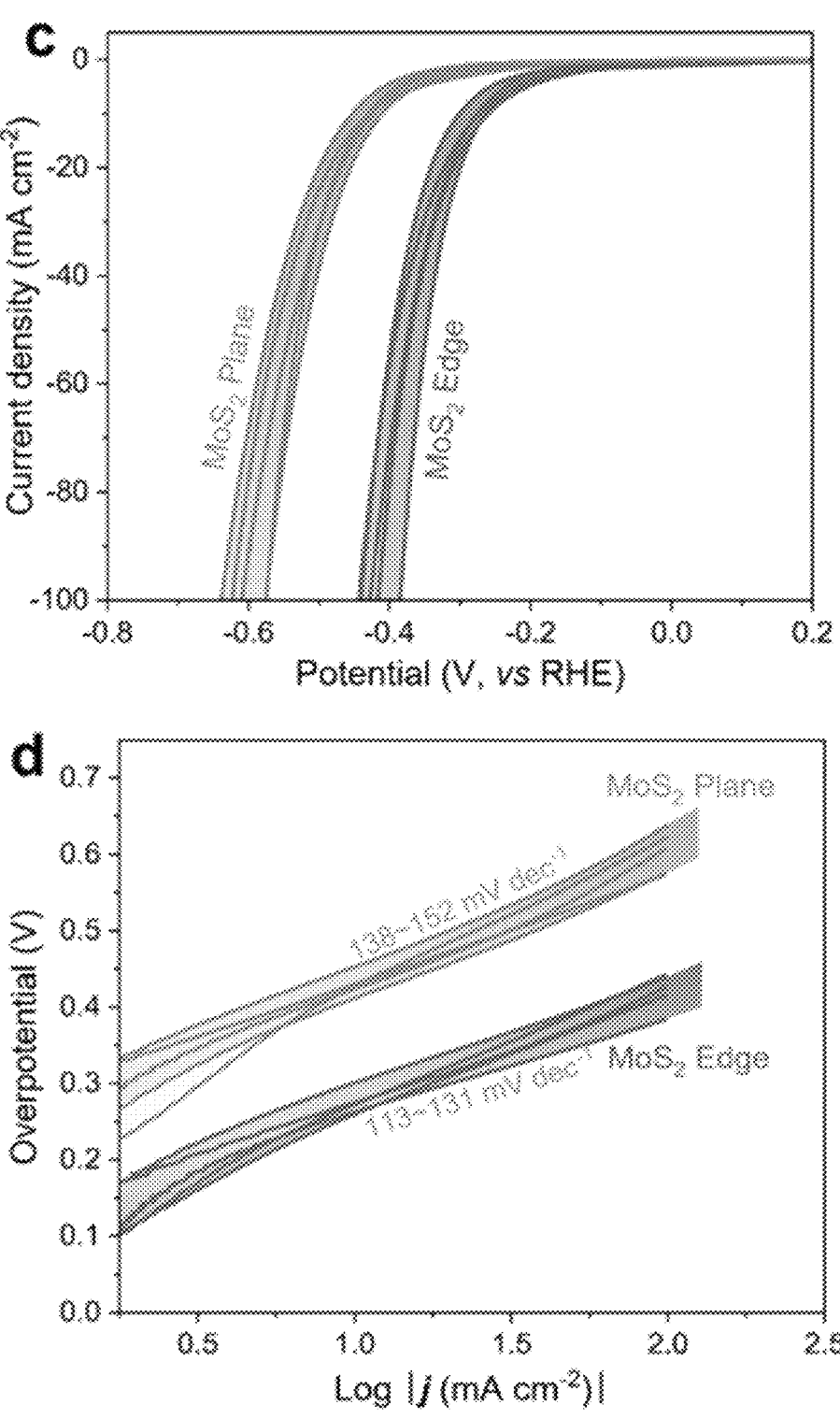
Figure 30:
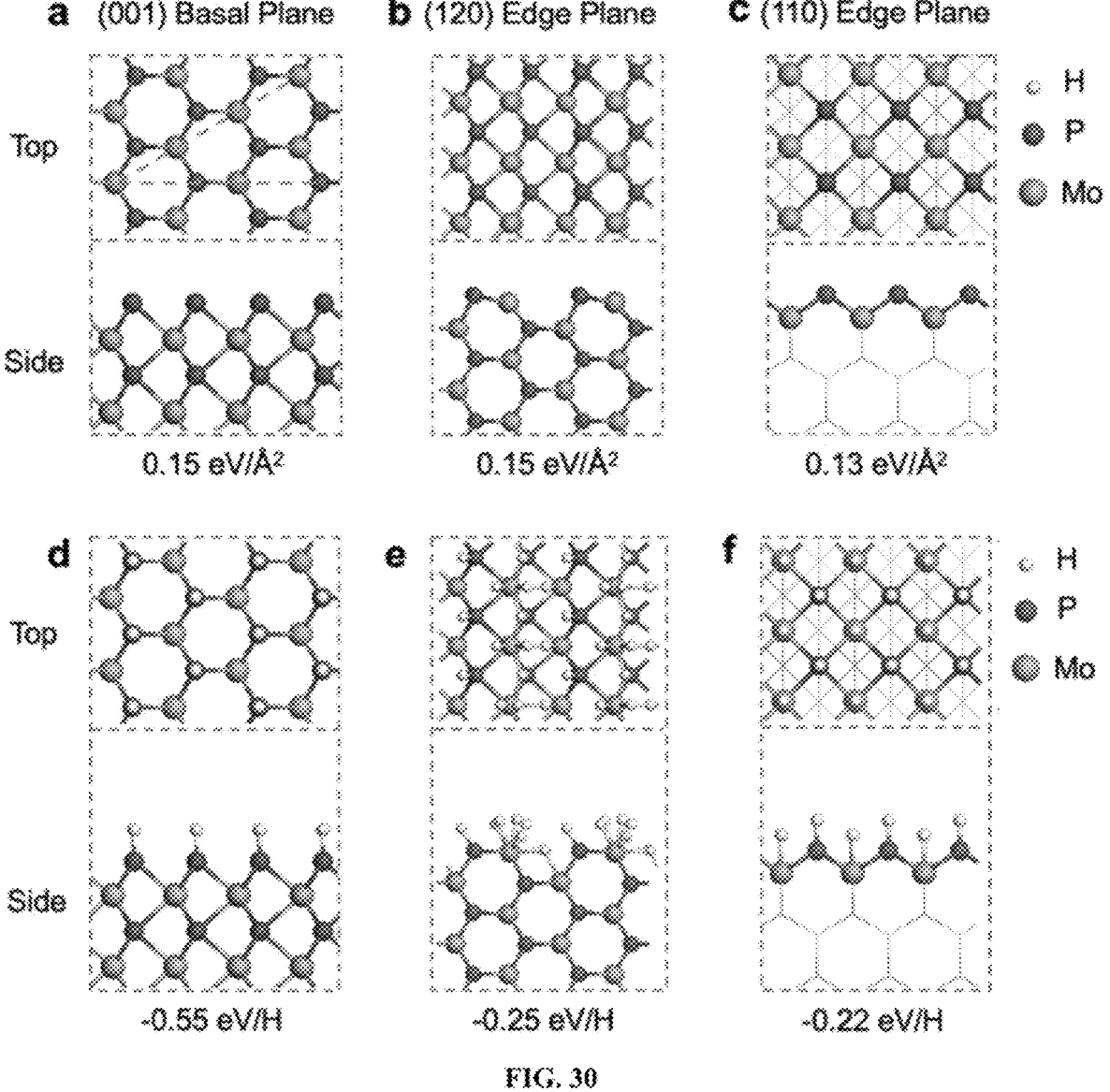
FIG. 30 depicts lattice planes corresponding to the basal plane and edge of MoP examined in our DFT calculations. Structure and surface energy of the (001) (a), the ($\bar{1}$20) (b), and ($\bar{1}$10) (c) lattice planes. Hydrogenated structure and adsorption energy per H for the (001) (d), ($\bar{1}$20) (e), and ($\bar{1}$10) (f) lattice planes. Green dashed lines in (a) indicate the lattice planes corresponding to edge. Certain atoms in (c) and (f) are shown in line modes for better visulization.
Figure 31:
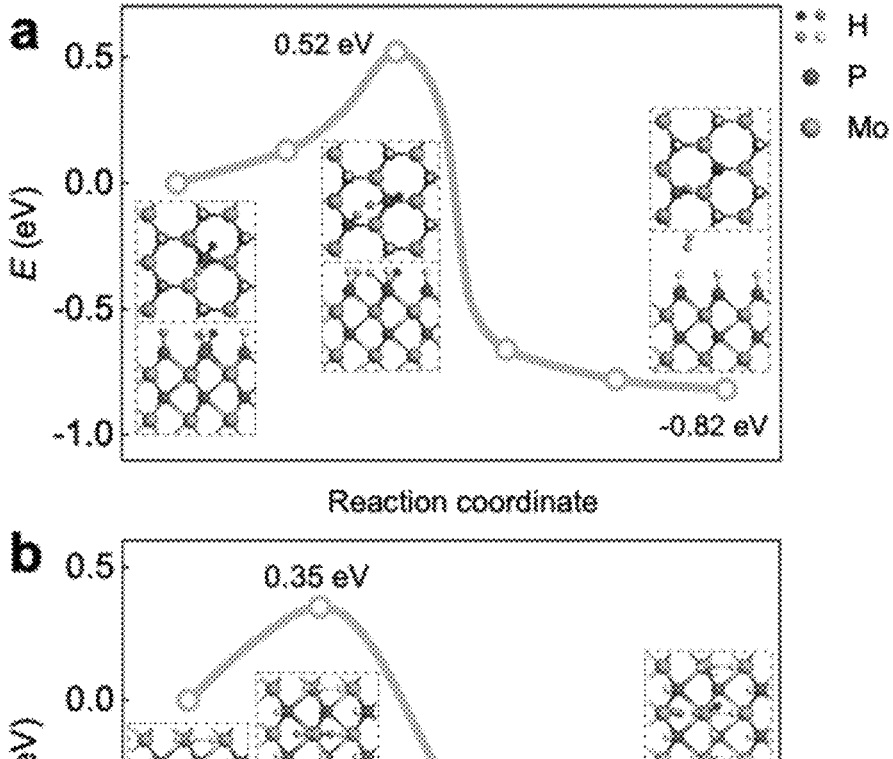
FIG. 31 depicts dynamics study of HER on MoP. Minimum energy paths and critical structures of HER on the (001) (a) lattice plane corresponding to basal plane, the ($\overline{1}20$) (b), and ($\overline{1}10$) (c) lattice planes corresponding to edge. Different colors are used for certain H atoms for better visualization.
Figure 31:
Figure 31:
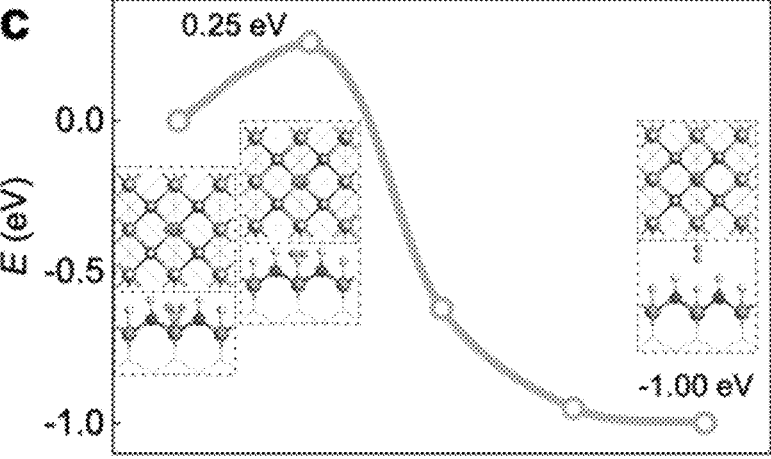
Figure 32:
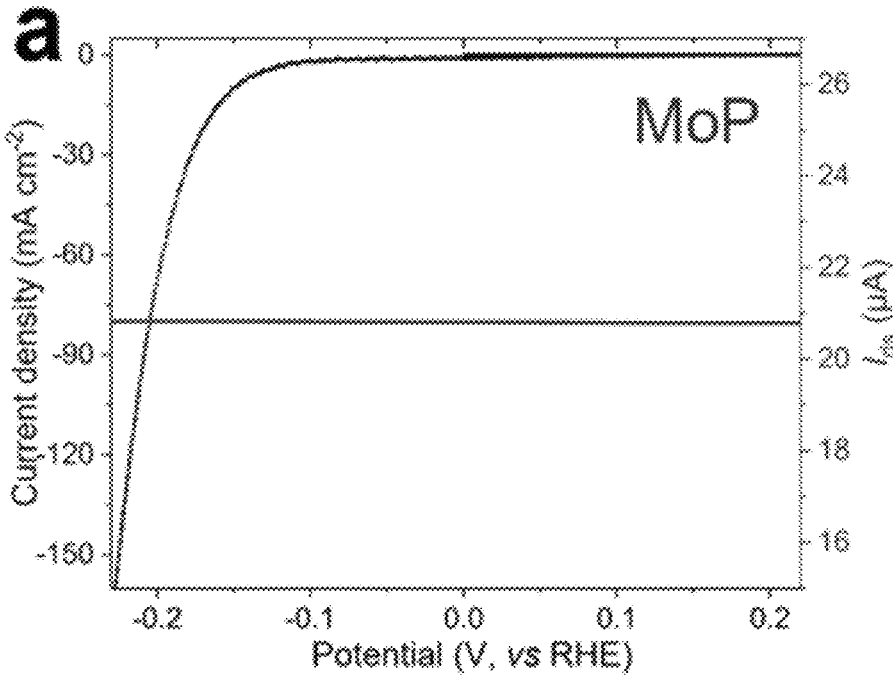
FIG. 32 depicts (a,b) The in situ electrical transport measurements showing the electrochemical (polarization curve, y axis in blue) and electronic ($I_{ds}$-$V_g$, y axis in red) measurements of MoP (a) and $MoS_2$ (b). (c,d) Optical images of the exposed window on MoP (c) and $MoS_2$ (d). The drain-source current (Ias) of MoP device maintains constant with the change of electrochemical (ion-gate) potential, demonstrating metallic charge transport. On the other hand, the mechanically exfoliated $MoS_2$ nanosheet shows a strong self-gating phenomenon and n-type charge transport.
Figure 32:
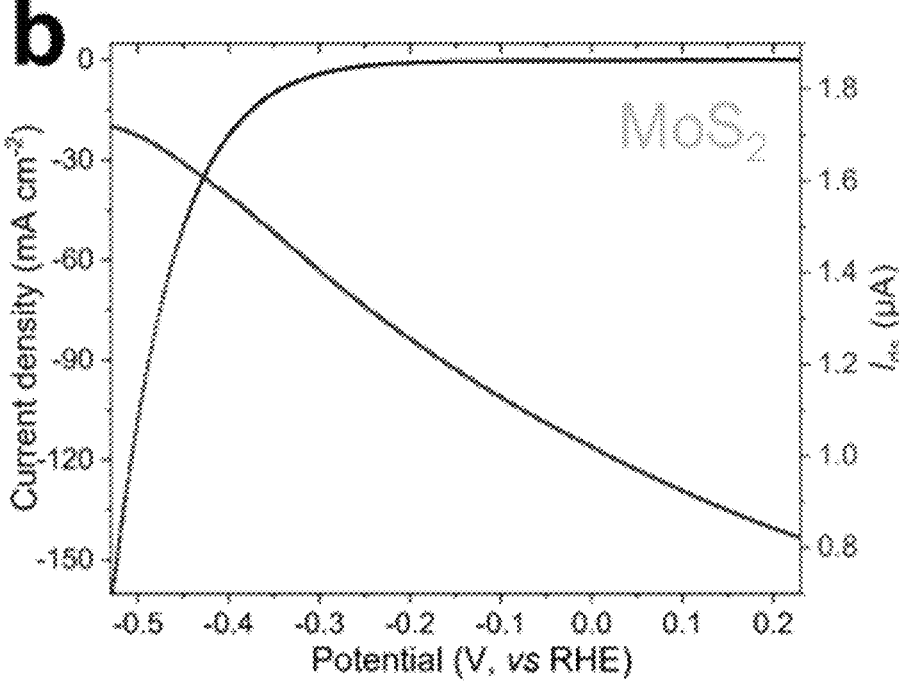
Figure 32:
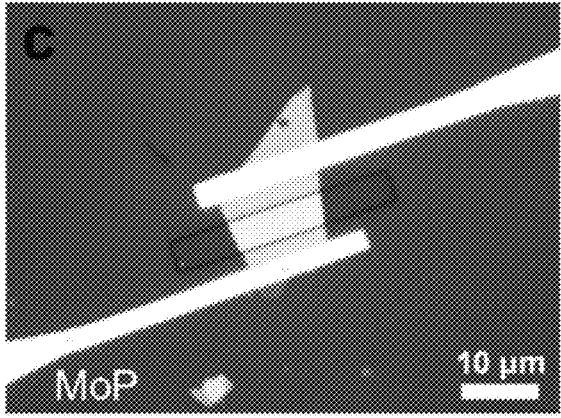
Figure 32:
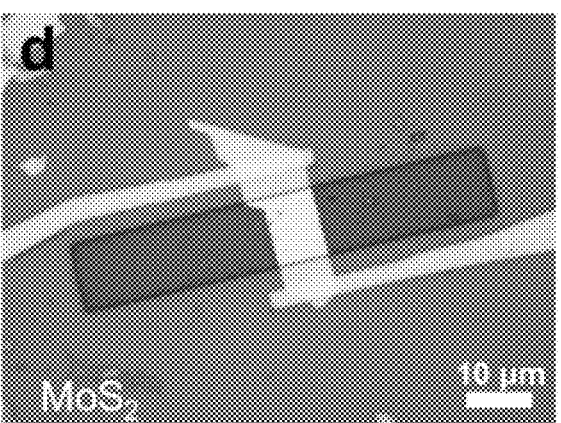
Figure 33:
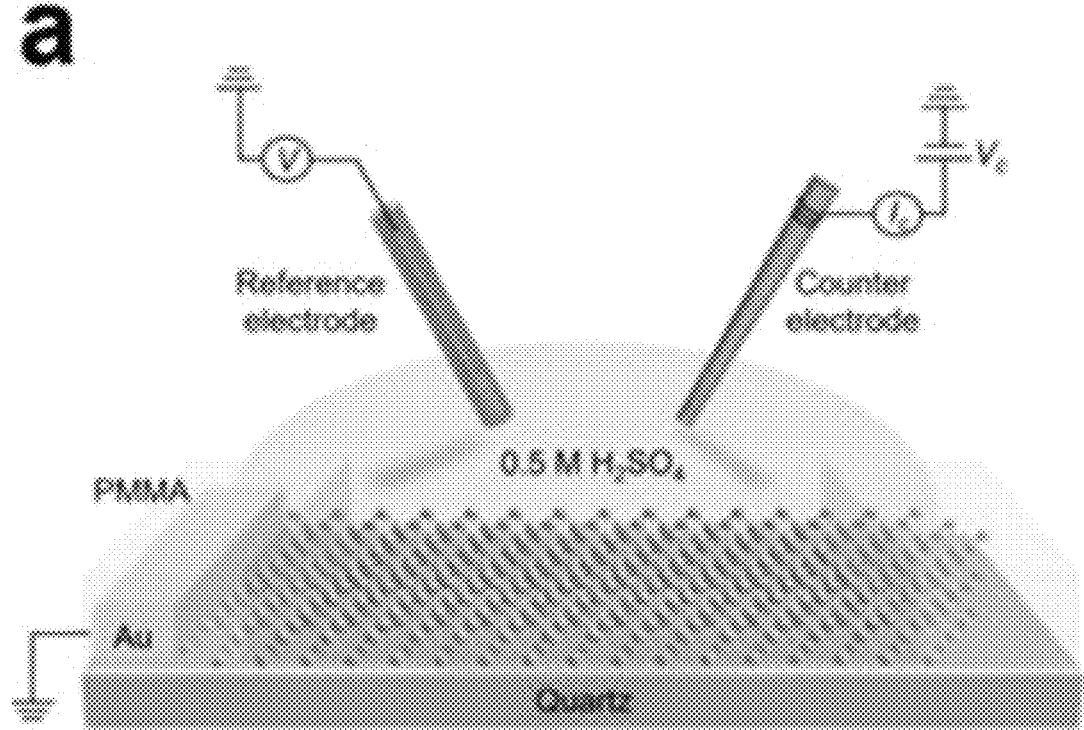
FIG. 33 depicts stability of MoP nanosheets for electrocatalytic HER. (a) Schematic illustration of the three-electrode OCEM based on individual MoP nanosheet for electrocatalytic hydrogen evolution reaction (HER). (b,c) The polarization curves (b) and Tafel slopes (c) of a MoP nanosheet before and after 200 cycles of HER tests. The small changes are likely due to the consumption of protons in the solution after prolonged operation. (d-f) The optical image (d), Raman mapping image of the 406 $cm^{-1}$ mode (e), and the AFM image (f) of the MoP nanosheet before the cycling test. (g-i) The optical image (g), Raman mapping image of the 406 $cm^{-1}$ mode (h), and the AFM image (i) of the MoP nanosheet after the cycling test. The morphology, molecular structure, as well as structural integrity of the MoP nanosheet maintained after 200 cycles of HER test.
Figure 33:
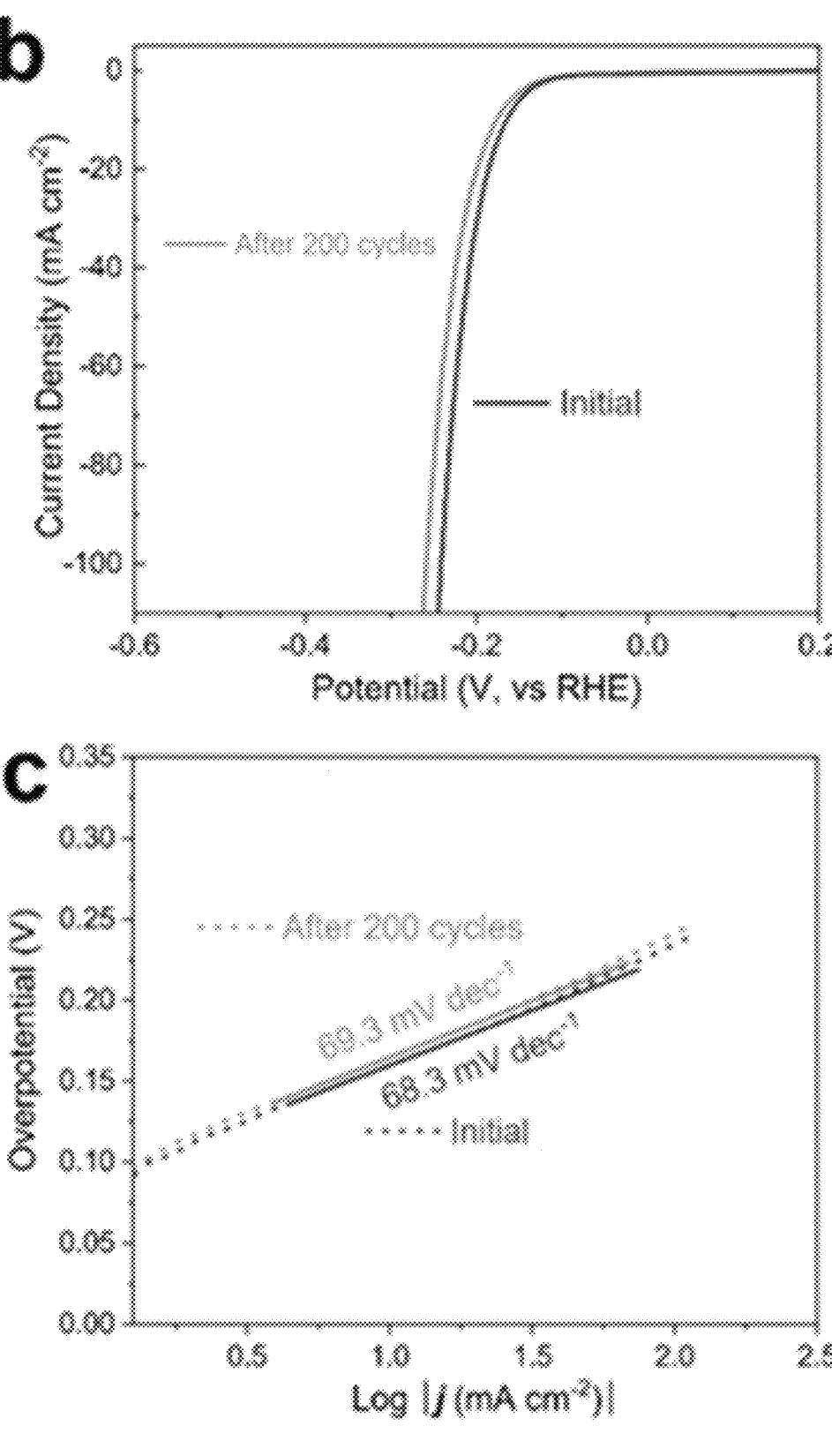
Figure 33:
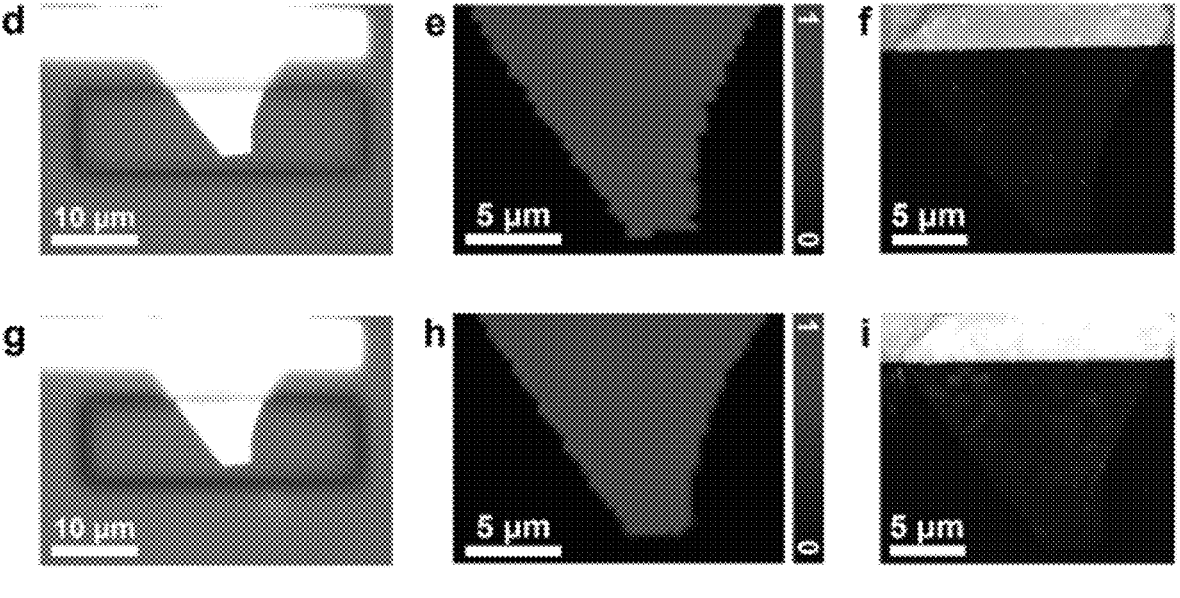

Four-probe electrical measurements were performed to avoid contact resistance. MoP converted from exfoliated MoS$_2$ demonstrates typical metallic charge transport, as shown in the temperature-dependent electrical transport measurements (FIG. 5*a*) down to 25 K. A small increase of resistance below 25 K is observed, which may arise from the presence of vacancy defects and the existence of disorders at the surface. On the other hand, the amorphous MoP$_x$ converted from monolayer CVD MoS$_2$ shows minimal conductivity (see FIG. 27 and Example 5), similar to monolayer amorphous carbon. The inert basal plane of MoS$_2$ without dangling bonds is generally favored in (opto)electronic applications, owing to the minimal charge trapping sites and confined charge carriers. However, additional chemical and physical treatments are required to create defects or structural modification to activate such inert basal plane for catalytic applications. In contrast, the basal plane of non-layered 2D MoP is filled with dangling bonds due to the coordination-unsaturated surface atoms, which is generally favored in catalytic applications. To this end, spatially resolved electrocatalytic measurements were performed on individual nanosheets of MoS$_2$ and MoP via on-chip electrocatalytic microdevices (OCEMs), as illustrated in FIG. 5*b*. OCEM platform enables the high-precision electrochemical measurements of microscopic surfaces, which is ideal in identifying the catalytic performance of edge sites and basal planes. Specifically, in a typical three-electrode electrochemical microcell, 2D nanosheets contacted by Cr/Au electrodes were used as the working electrode, while graphite and Ag/AgCl were used as the counter and reference electrodes, respectively. Optical images of typical devices for the HER measurements of basal planes and edges of MoS$_2$ and MoP are shown in FIG. 28, where only the exposed surface in the poly(methylmethacrylate) (PMMA) windows participated in the electrocatalytic reaction and the rest areas are passivated by PMMA. FIG. 5*c,d* show the HER performance of the edge and basal plane of a single-crystalline MoP nanosheet converted from MoS$_2$ in 0.5 M H$_2$SO$_4$. The polarization curves and corresponding Tafel slopes of MoP edge and basal plane show marginal differences, suggesting similar catalytic activities. In addition, the data collected from multiple devices show significant overlap between MoP edges and basal planes (FIG. 29*a,b*), further confirming their similar catalytic activity. The satisfying HER performance (onset potential: ~150 mV, Tafel slope: ~65 mV dec$^{-1}$) of single-crystalline MoP could be ascribed to both the coordination-unsaturated surface filled with dangling bonds and the efficient charge transfer owing to its intrinsic semi-metallic characteristic. First-principles calculations based on density functional theory (DFT) were conducted to manifest the similar HER performances of basal plane and edge on MoP nanosheets (see Example 6, FIG. 30, and FIG. 31). In contrast to nonlayered MoP, the HER performance of edge and basal plane of MoS$_2$ distantly separates from each other (FIG. 5*e,f*), confirming the inert nature of basal plane in exfoliated MoS$_2$ nanosheets, which is also consistent with previous experimental observations and theoretical calculations. Measurements on multiple devices manifest the significant difference in HER performance between the basal plane and edge of MoS$_2$ (FIG. 29*c,d*). Additionally, we carried out in-situ electrical transport measurement to investigate how the charge transport influence the electrocatalytic performance of MoS$_2$ and MoP. As shown in FIG. 32, the in-situ transport measurements clearly show the metallic and semiconducting (n-type) characteristics of MoP and MoS$_2$, respectively (see Example 7). More importantly, both MoP and MoS$_2$ are at high-conductance states during the entire HER range, indicating that the high performance of MoP is resulting from excellent intrinsic charge transfer kinetics instead of improvement in charge transport. Finally, the converted MoP nanosheet demonstrated excellent stability for electrocatalytic HER, which shows marginal changes in the polarization curves, Tafel slopes, and morphology after 200 testing cycles in OCEM setup (FIG. 33).

In addition, we measured the electrocatalytic HER of the amorphous MoP$_x$ converted from CVD MoS$_2$. Due to the extremely low in-plane conductivity of amorphous MoP$_x$ (FIG. 27), a vertical microelectrode based on van der Waals heterostructure (FIG. 34*a,d*) was used as the working electrode to accurately assess its electrocatalytic HER performance (see Example 8). Both crystalline MoP and amorphous MoP$_x$ exhibit enhanced HER activity than pristine MoS$_2$ (FIG. 5*c-f* and FIG. 34*b,c*), echoing the fact that MoP is an efficient HER electrocatalyst. However, unlike many 2D electrocatalysts whose performance benefits from amorphization, monolayer amorphous MoP$_x$ shows inferior HER performance to crystalline MoP, possibly due to its lower conductivity (FIG. 27*b*).

2D nonlayered MoP were successfully prepared from MoS$_2$/MoSe$_2$ precursors by surface-confined atomic substitution. The resulting MoP nanosheets retain the original 2D morphology of MoS$_2$/MoSe$_2$ precursors owing to the small lattice mismatch and the surface confinement from the substrate. The converted MoP was comprehensively characterized by Raman, TEM, XPS, EDS and AFM, confirming its crystal structure and 2D morphology. Notably, the single crystallinity of the ultrathin MoP nanosheets is confirmed by TEM characterization, which shows consistent hexagonal Mo arrangements across the nanosheet. Additionally, a new monolayer amorphous material, amorphous MoP$_x$, was synthesized by the conversion of monolayer CVD MoS$_2$, which could inspire more exploration on exotic amorphous materials and their applications. More importantly, the entire basal plane of MoP demonstrated satisfying HER performance, owing to its coordination-unsaturated surface atoms with abundant dangling bonds. This work exploits a new synthetic methodology based on surface-confined atomic substitution for the preparation of high-quality NL2DMs, paving the way for future exploration of their exotic properties and practical applications.

EXAMPLES

Example 1—Thermal Decomposition of NaH$_2$PO$_2$·H$_2$O

NaH$_2$PO$_2$·H$_2$O powder was used to produce PH$_3$ gas, which serves as the phosphorus source for the surface-confined atomic substitution. The thermal decomposition products of NaH$_2$PO$_2$·H$_2$O under different temperatures are often complicated. Herein, the reaction temperature is set at higher than 650° C., where the total reaction can be represented as $10NaH_2PO_{2-4}PH_{3+2}Na_5P_3O_{10}+4H_2$.

Example 2—Chemical Mechanism of Replacing Sulfur(S) with Phosphorus (P)

Since P and S have similar atomic radii, it is possible to replace S with P in $MoS_2$ under certain conditions. P is considered a good dopant candidate for $MoS_2$. Under elevated temperature, $PH_3$ serves as P source for the conversion from $MoS_2$ to MoP following the equation:

$$MoS_2 + \frac{4}{3}PH_3 = MoP + 2H_2S + \frac{1}{3}P.$$

The equation is thermodynamically favorable due to the relatively low formation energy under elevated temperature at 650~700° C. For complete conversion, the quartz tube was sealed to ensure a saturated $PH_3$ atmosphere, which is crucial for a complete chemical conversion.

Example 3—Raman Spectra and X-Ray Diffraction (XRD) Pattern of Commercial MoP Commercial MoP was used to correlate the Raman spectra of the as-prepared MoP. As shown in FIG. 7a, the Raman spectrum of commercial MoP shows a dominant peak at 406 $cm^{-1}$, which is consistent with the as-prepared MoP single crystal. FIG. 7b is the optical image of commercial MoP particles used in the Raman test. FIG. 7c presents the XRD pattern of commercial MoP, in which the peaks are well-matched with MoP in JCPDS 24-0771.

Figure 6:
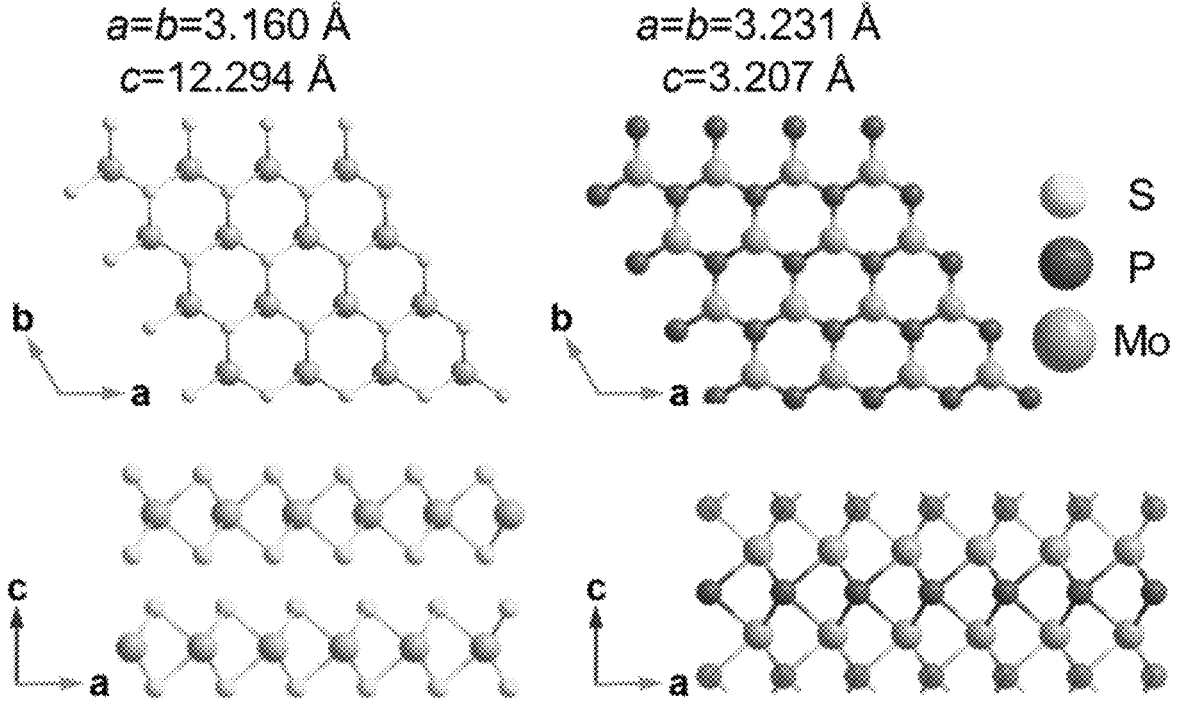
FIG. 6 depicts the top view, side view and the lattice constants of $MoS_2$ and MoP crystals.

Example 4—Conversion of Monolayer CVD $MoS_2$ $MoP_x$ converted from monolayer CVD $MoS_2$ was amorphous according to the Raman and transmission electron microscopy (TEM) characterization. From the perspective of crystal structure, monolayer CVD $MoS_2$ can only provide one layer of Mo atoms, which is not sufficient to form crystalline MoP structures during the conversion. Since MoP was prepared in a saturated $PH_3$ atmosphere, it is theorized that atoms on the top and bottom layer should be P. Specifically, in the case of conversion of monolayer CVD $MoS_2$, while the bottom Player could be stabilized by the $SiO_2$/quartz substrate, the unsaturated top Player could be very active, which could destabilize the Mo—P bonds and distort the crystal lattice. Therefore, the conversion product is determined as amorphous $MoP_x$. As shown in FIG. 6, two Mo layers in bilayer $MoS_2$ are connected by the substituting P layer in the conversion process. Therefore, at least two layers of $MoS_2$ are required to form crystalline MoP theoretically. Based on the Raman spectra of the MoP converted from $MoS_2$ nanosheet with various thicknesses (FIG. 11) and the HRTEM of $MoP_x$ converted from folded CVD $MoS_2$ (FIG. 24), we conclude that the critical thickness of $MoS_2$ to prepare highly crystalline MoP should be ~3 nm.

Example 5—Electrical Conductance of $MoP_x$ Converted from CVD $MoS_2$

Due to the insufficient substance to form fully crystalline MoP nanosheets, $MoP_x$ converted from CVD $MoS_2$ was found to be nearly insulating (FIG. 27a,b), despite the ideal 2D nanosheet morphology (FIG. 4), similar to monolayer amorphous carbon. The electrical properties of MoP converted from multilayer CVD $MoS_2$, rolled-up CVD $MoS_2$, and stacked CVD $MoS_2$ were then investigated. MoP from multilayer CVD $MoS_2$ and rolled-up $MoS_2$ showed excellent electrical conductivity, because the precursors can provide enough layers of Mo framework to form crystalline MoP (FIG. 27c-f). FIG. 27g-j show the optical images of stacked bilayer and trilayer CVD $MoS_2$ and the Ias-Vas curves after conversion. MoP converted from bilayer CVD $MoS_2$ is nearly non-conductive while MoP converted from trilayer CVD $MoS_2$ shows poor electrical conductance. Without wishing to be bound by theory, this effect is ascribed to the quantity of Mo on the formation of crystalline MoP during the surface-confined atomic substitution process, which was discussed in the former section.

Example 6—Theoretical Calculations of the Electrocatalytic HER Activity of Basal Plane and Edge on MoP Nanosheets To further demonstrate the electrocatalytic HER performances of the basal plane and edge of MoP nanosheets, first-principles calculations were carried out based on density functional theory (DFT). According to the honeycomb structure and the spacing of 0.28 nm between Mo planes from the HRTEM images in FIG. 3c, it can be concluded that the basal plane corresponds to the MoP (001) lattice plane, as shown in FIG. 30a. Among lattice planes perpendicular to the basal plane, the ($\bar{1}$20) and ($\bar{1}$10) lattice planes are two close-packing planes (FIG. 30b,c). DFT calculations show that the surface energy of the ($\bar{1}$20) and ($\bar{1}$10) planes is 0.15 and 0.13 $eV/Å^2$, respectively, which are analogous to that of the (001) plane (0.15 $eV/Å^2$). Additionally, the angles between planes of {$\bar{1}$20} and {$\bar{1}$10} are integer times of 60°, which is also consistent with the observation in the optical images of MoP nanosheet in FIG. 9b. Therefore, it was concluded that the basal plane corresponds to (001) lattice plane and the edge corresponds to ($\bar{1}$20) and ($\bar{1}$10) lattice planes. Given the acidic experimental conditions (0.5M $H_2SO_4$), the saturation of these planes with hydrogen was further examined, as shown in FIG. 30d-f. It was found that the hydrogen adsorption energy at pH=0 is −0.55, −0.25, and −0.22 eV/H, respectively, for the (001), ($\bar{1}$20), and ($\bar{1}$10) lattice planes, suggesting that the hydrogen adsorption is energetically favorable on both the basal plane and edge of MoP nanosheets.

To reveal the atomistic mechanisms of HER on these three lattice planes, dynamic calculations on the hydrogenated planes were carried out. Transition state results show that the activation barriers for $H_2$ generation on the (001), ($\bar{1}$20) and ($\bar{1}$10) lattice planes are 0.52, 0.35, and 0.25 eV, respectively (FIG. 31). Because all the energy barriers are comparable to or lower than those (0.5-0.6 eV) of HER on Pt (111), HER is expected to occur quickly on both the basal plane and edge, but with faster rates on the latter, which corroborates the experimental observations in FIG. 5c-d.

DFT calculation details: All calculations were performed using DFT as implemented in the Vienna Ab-initio Simulation Package. The exchange-correlation functional was in the form of generalized gradient approximation, as parameterized by Perdew, Burke, and Ernzerhof. The projector augmented wave pseudopotentials of Mo ($5s^14d^5$) for W, P_GW ($3s^23p^3$) for P, H_GW ($1s^1$) for H were used, together with a plane wave cutoff of 360 eV. The slab size was 3×3 of the primitive cells with a=b=9.72 Å for the (001) basal plane, 3×2 of the primitive cells with a=9.58 Å and b=11.22 Å for the ($\bar{1}$20) plane, and 3×3 of the primitive cells with a=9.58 Å and b=9.72 Å for the ($\bar{1}$10) plane. For surface energy calculations, the slab thickness was about 20.7 Å. 24.0 Å, and 26.3 Å for the (001), ($\bar{1}$20), and ($\bar{1}$10) planes, respectively. For other calculations, the slab thickness was about 12.8 Å, 13.1 Å, and 12.3 Å for the (001), ($\bar{1}$20), and ($\bar{1}$10) planes, respectively. A vacuum layer about 10 Å was added for all slabs. Two middle layers were fixed to their bulk positions for the surface energy calculations, while three bottom layers were fixed to their bulk positions for the rest calculations. The Brillouin zone was sampled with a 3×3×1 Gamma-centered mesh. The surface energy, $E_{surf}$, was determined by Equation 1.

$$E_{surf} = \frac{E_{slab} - E_{bulk}}{S_{slab}} \quad (1)$$

Here, $E_{slab}$ is the total internal energy of slab, $E_{bulk}$ is the total internal energy of bulk, and $S_{slab}$ is the total surface area of slab. The hydrogen adsorption energy, $\Delta E$, was determined by Equation 2.

$$\Delta E = (E_{nH-slab} - E_{slab} - nE_H)/n \quad (2)$$

Here, $E_{nH-slab}$ is the total energy of slab with n adsorbed H atoms, $E_{slab}$ is the energy of slab without H, and E is the free energy per atom of $H_2$ gas at 1 atm and 300 K, a condition equilibrating with the pH=0 condition in experiment. The transition state theory calculation was realized using the climbing nudged-elastic-band method.

Example 7—In Situ Electrical Transport Measurement of MoP During Electrocatalytic HER FIG. 32 shows the electrochemical (polarization curves) and in situ electronic transport (transfer curves) signals as well as optical images of corresponding devices of $MoS_2$ and the converted MoP, during electrocatalytic hydrogen evolution reaction (HER). The in situ transport measurement of exfoliated $MoS_2$ demonstrates the self-gating phenomenon of typical n-type semiconductors. In contrast, the las of MoP remain constant throughout the whole electrochemical potential range, consistent with the semimetallic nature of MoP. Both materials demonstrate high electrical conductance during the entire HER range.

Figure 34:
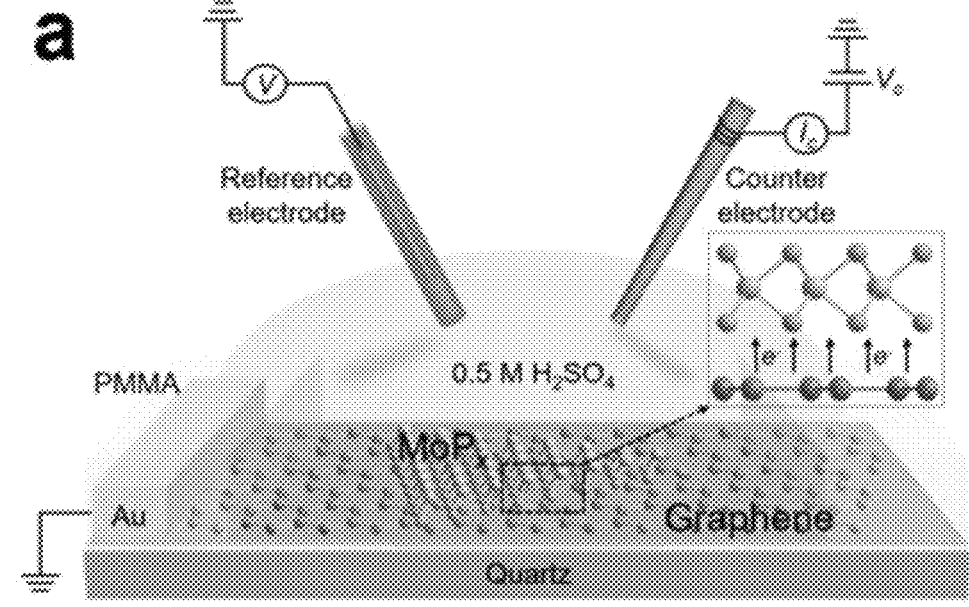
FIG. 34 depicts (a) schematic illustration of the OCEM based on van der Waals heterostructures for HER tests of $MoP_x$ converted from CVD $MoS_2$, where van der Waals heterostructure of $MoP_x$/graphene was constructed to maximize the vertical charge transport. (b,c) Polarization curves (b) and the corresponding Tafel slopes (c) of $MoP_x$ and CVD $MoS_2$. (d,e) Optical images of the exposed window for HER measurement on $MoP_x$ (d) and CVD $MoS_2$ (e).
Figure 34:
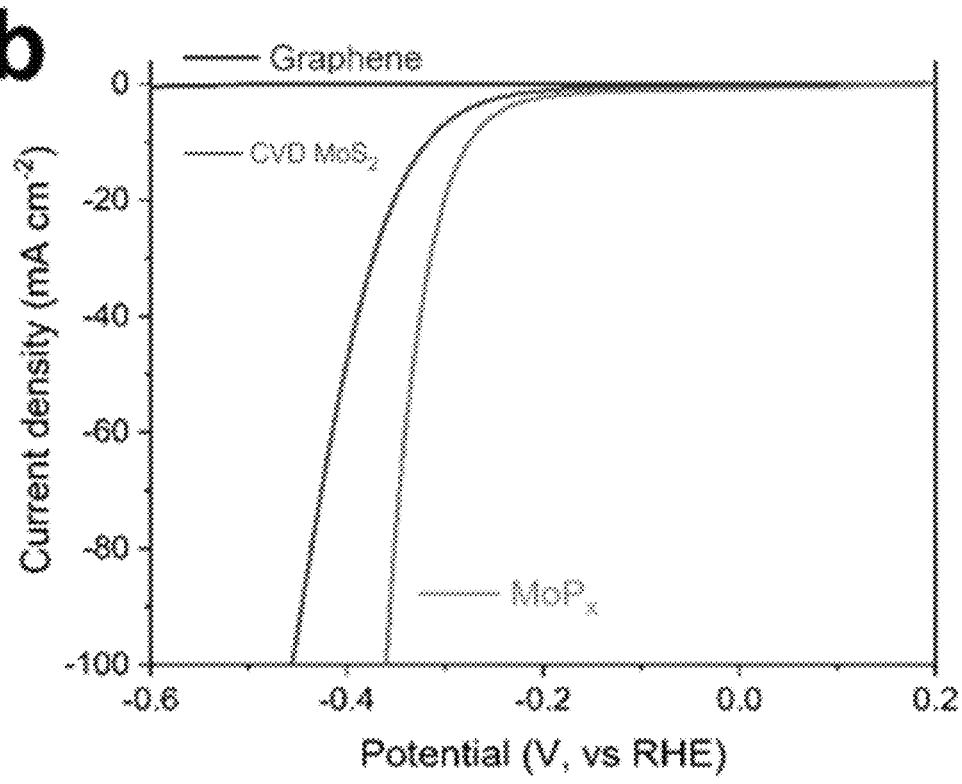
Figure 34:
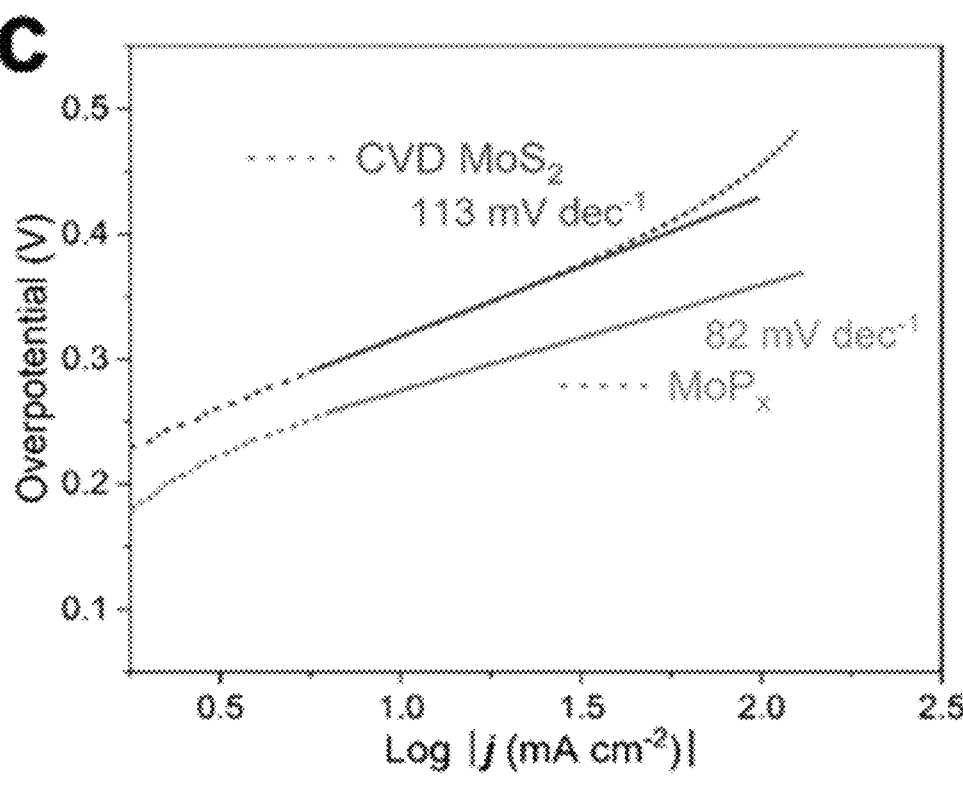
Figure 34:
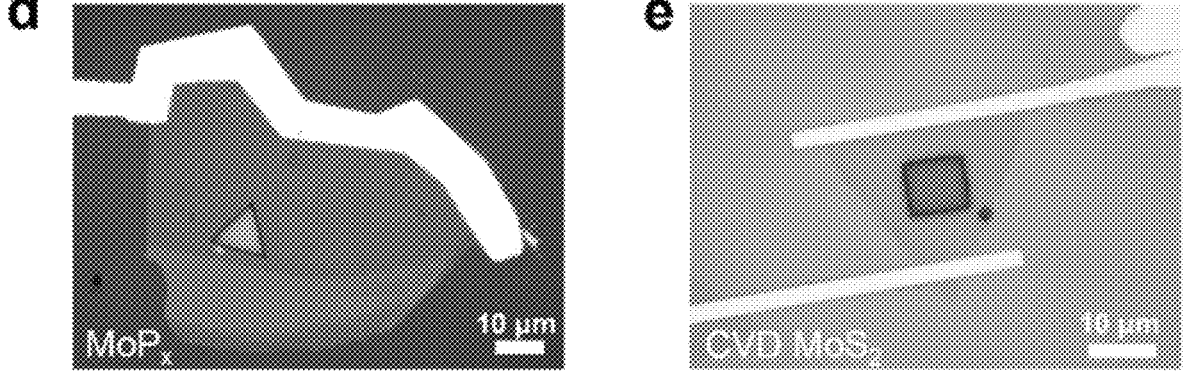

Example 8-Electrochemical Performance of Amorphous $MoP_x$ Converted from CVD $MoS_2$ Due to the extremely low in-plane charge transport of amorphous $MoP_x$ nanosheet (FIG. 27a,b), van der Waals heterostructures based on monolayer amorphous $MoP_x$ and few-layer graphene flake were fabricated to facilitate charge injection to the amorphous $MoP_x$ (FIG. 34a). FIG. 34b,c present the polarization curves and Tafel slopes of $MoP_x$ converted from CVD $MoS_2$ and CVD $MoS_2$. $MoP_x$ converted from CVD $MoS_2$ demonstrates an onset potential of 275 mV and a Tafel slope of 82 mV $dec^{-1}$ for HER in 0.5 M $H_2SO_4$ solution. We ascribe the relatively poor HER performance of $MoP_x$ to the inefficient charge transport during catalytic reaction. FIG. 34d,e are the optical images of the exposed windows of on $MoP_x$ and CVD $MoS_2$ devices.

Example 9—Preparation of Exfoliated $MoS_2$ and CVD $MoS_2$

Mechanically exfoliated $MoS_2$/$MoSe_2$ nanosheets with various thicknesses were prepared by Scotch tape method.

Single-crystalline monolayer $MoS_2$ was grown on $SiO_2$/Si substrates using the oxygen-assisted CVD method following a previous work (X. Zhang, et al., Adv. Mater. 2021, 33, 2007051). A wet-transfer method was used to transfer CVD $MoS_2$ grown on $SiO_2$/Si wafer to the target substrate before the chemical conversion. First, PMMA was spin-coated on the as-grown CVD $MoS_2$ and heated on a hot plate at 100° C. for 3 min. Then the $SiO_2$/Si wafer was etched in 1 M potassium hydroxide solution to separate CVD $MoS_2$ embedded in PMMA film from the $SiO_2$/Si wafer. After cleaning several times with deionized (DI) water, the PMMA film was picked up with the target substrate, followed by heating at 60° C. for 3 min to remove residual water and then at 120° C. for 1 h to improve the adhesion on substrate. Finally, the PMMA film was dissolved with excess acetone.

Example 9—Preparation of MoP $MoS_2$, $MoSe_2$ and CVD $MoS_2$ on $SiO_2$/Si or quartz substrates were placed in the center of a horizontal quartz tube (1 inch in diameter) in a tube furnace (Thermo Fisher #TF55035C-1). A crucible filled with 1 g of $NaH_2PO_2$ (Aladin) serving as $PH_3$ gas source was put on upstream of the tube with a distance of 5~8 cm to the substrate. High purity Ar gas was pre-introduced for 10 min at 500 sccm to eliminate the air inside the tube. Then the tube was scaled and pumped to −0.05 MPa to maintain the atmospheric pressure during the synthetic process. Then the tube was heated to 700° C. (650° C. for CVD $MoS_2$) with a heating rate of 10° C. min-1 and maintained for 2 h. Afterwards, the furnace was left to natural cool down to 300° C. Then, Ar gas was purged into the tube to carry gaseous products to avoid pollution and deposition until the furnace cooled down to room temperature. Finally, the converted MoP on the substrate was cleaned with DI water and dried by $N_2$ flow. MoP nanosheets were transferred to Cu foil for TEM characterization following similar procedures to the transfer of CVD $MoS_2$.

Example 10—Fabrication and Measurement of Electrical Devices

Mechanically exfoliated and CVD-grown $MoS_2$ nanosheets were directly deposited and transferred onto quartz substrates, respectively, and consequently converted to MoP and $MoP_x$ nanosheets. Note that quartz substrates were used instead of commonly used $SiO_2$/Si substrates in the electrical and electrochemistry measurements to avoid the possible leakage from the Si after the synthetic processes. Thereafter, PMMA (PMMA 495, A8, KayakuAM) was spin-coated on the substrates at 4,000 r.p.m. followed by baking on a hotplate at 150° C. for 3 min. Then, the substrate was coated with 5 nm of Au by sputtering to avoid charge accumulation during electron beam lithography (EBL, TESCAN VEGA3). EBL was utilized to selectively expose the areas for electrodes. Then the thin Au coating was removed by Au etchant. Standard thermal deposition (PVD, Kurt J. Lesker NANO 36) of Cr/Au (8/50 nm) and lift-off processes were performed to create the multi-terminal devices. The temperature-dependent electrical resistivity ($\rho$-T) down to 4.0 K was measured using a Physical Property Measurement System (PPMS, Quantum Design). The electrical measurements were performed using a probe station (Lake Shore PS-100) and a source measurement unit (Keysight 2902B).

Example 11—Fabrication and Measurement of
On-Chip Electrocatalytic Microdevices (OCEMs)

A 16 mm×16 mm quartz chip with a pre-patterned set of 32 Au contact pads was fabricated via conventional photolithography (Y. He, et al., Nat. Commun. 2020, 11, 57; Y. He, et al., Nat. Mater. 2019, 18, 1098). Then, similar fabrication procedures used in the electrical devices were carried out to fabricate two-terminal devices based on mechanically exfoliated $MoS_2$ and the converted MoP nanosheets for the OCEM measurement. Due to the low in-plane conductivity of the amorphous $MoP_x$ nanosheets converted from CVD $MoS_2$, OCEM devices based on van der Waals heterostructures were fabricated to measure the electrocatalytic performance of $MoP_x$. The CVD $MoS_2$ nanosheet was transferred onto a graphene flake (~10 nm) which was previously mechanically exfoliated on the quartz chip. The $MoS_2$ nanosheet on graphene was converted to $MoP_x$ nanosheet following the same surface-confined atomic substitution. One electrode was deposited on the graphene flake as the current collector to realize vertical charge transport in the OCEM measurements. OCEMs measurements were performed following our previously developed protocols (Y. He, et al., Nat. Mater. 2019, 18, 1098). The 2D nanosheets were used as the working electrode, while graphite and Ag/AgCl were used as counter and reference electrodes, respectively. In the in-situ electrical transport measurement, the conductance of the nanosheets was continuously monitored by using Keysight 2902B during the electrocatalytic HER measurements in 0.5 M $H_2SO_4$. Before each measurement, the Ag/AgCl electrode was calibrated by a hydrogen reference electrode (ET070, eDAQ). Graphite, instead of commonly used Pt was used as the counter electrode to avoid influences from Pt deposition on the nanosheet. The leakage electrochemical currents are generally within $5\times10^{-11}$ A (tested on PMMA without exposed window), which is negligible in our measurement. The electrochemical current density was calculated by normalizing the current to the area of exposed windows, which was determined using the optical microscope images.

Example 12—Materials Characterization

The microstructures and morphologies of nanosheets were observed by optical microscopy (Nikon LV150N, Japan). Raman spectra and mapping were performed using Reinshaw in Via Raman microscope (UK) with a 532 nm laser (power of 100 mW, spot size of ~1 μm in diameter). The laser power was set to 1 mW and 10 mW to characterize $MoS_2$/$MoSe_2$ and MoP, respectively. TEM characterization was conducted with Tecnai F20 (FEI) microscope and JEOL JEM-2011F (Japan) operating at 200 kV. EDS mapping was carried out with an EDAX EDS detector under the darkfield of scanning transmission electron microscopy of JEOL JEM-2011F. X-ray diffraction (XRD) was performed by Smartlab 9KW (Rigaku, Japan) with a Cu Kα ($\lambda$=1.5406 Å) radiation source. The optical transmittance was characterized by PerkinElmer Lambda 1050+UV/Vis/NIR spectrophotometers with lab sphere. XPS was performed using Thermo Scientific K-Alpha. The AFM characterization was carried out on Brucker Icon.

What is claimed is:
1. A method of preparing a nonlayered 2D MoP nanosheet, the method comprising:

contacting a multi-layered $MoX_2$ nanosheet with $PH_3$ thereby forming the nonlayered 2D MoP nanosheet, wherein X is S or Se.

2. The method of claim 1, wherein the nonlayered 2D MoP nanosheet is substantially crystalline.

3. The method of claim 1, wherein the nonlayered 2D MoP nanosheet is single-crystalline.

4. The method of claim 1, wherein the step of contacting the multi-layered $MoX_2$ nanosheet with $PH_3$ is conducted at a temperature greater than 650° C.

5. The method of claim 1, wherein the step of contacting the multi-layered $MoX_2$ nanosheet with $PH_3$ is conducted at a temperature between 650-700° C.

6. The method of claim 1 further comprising the step of heating $NaH_2PO_2$ thereby generating $PH_3$.

7. The method of claim 6, wherein the $NaH_2PO_2$ is heated at a temperature of at least 650° C.

8. The method of claim 6, wherein the $NaH_2PO_2$ is heated in the presence of the multi-layered $MoX_2$ nanosheet in a sealed container at a temperature between 650-700° C.

9. The method of claim 1 further comprising the step of depositing $MoX_2$ on a substrate by chemical vapor deposition or mechanical exfoliation thereby forming the multi-layered $MoX_2$ nanosheet.

10. The method of claim 1, wherein the multi-layered $MoX_2$ nanosheet is at least 3 nm thick.

11. The method of claim 1, wherein the multi-layered $MoX_2$ nanosheet is about 3 to about 10 nm thick.

12. The method of claim 1, wherein the multi-layered $MoX_2$ nanosheet comprises at least four layers.

13. The method of claim 1, wherein the multi-layered $MoX_2$ nanosheet consists of 4-15 layers.

14. The method of claim 1, wherein the method comprises contacting a multi-layered $MoX_2$ nanosheet having a thickness between about 3 nm to about 10 nm with $PH_3$ thereby forming the nonlayered 2D MoP nanosheet, wherein the nonlayered 2D MoP nanosheet is single-crystalline.

15. The method of claim 14, wherein the step of contacting the multi-layered $MoX_2$ nanosheet with $PH_3$ is conducted at a temperature between 650-700° C.

16. The method of claim 15 further comprising the step of heating $NaH_2PO_2$ at a temperature between 650-700° C. thereby generating $PH_3$.

17. The method of claim 14 further comprising the step of depositing $MoX_2$ on a substrate by chemical vapor deposition or mechanical exfoliation thereby forming the multi-layered $MoX_2$ nanosheet.

18. The method of claim 14, wherein X is S.

19. A method of preparing a nonlayered 2D MoP nanosheet, wherein the method comprises:

depositing $MoX_2$ on a substrate by chemical vapor deposition or mechanical exfoliation thereby forming a multi-layered $MoX_2$ nanosheet, wherein X is S or Se;

heating $NaH_2PO_2$ at a temperature between 650-700° C. thereby generating $PH_3$; and contacting the multi-layered $MoX_2$ nanosheet having a thickness between about 3 nm to about 10 nm with $PH_3$ at a temperature between 650-700° C. thereby forming the nonlayered 2D MoP nanosheet, wherein the nonlayered 2D MoP nanosheet is single-crystalline.

20. The method of claim 19, wherein X is S.

* * * * *